US011366405B2

(12) United States Patent
Otoguro et al.

(10) Patent No.: US 11,366,405 B2
(45) Date of Patent: Jun. 21, 2022

(54) OPTICAL PRINT HEAD, IMAGE FORMING APPARATUS AND MANUFACTURING METHOD OF THE OPTICAL PRINT HEAD

(71) Applicant: CANON KABUSHIKI KAISHA, Tokyo (JP)

(72) Inventors: Yasuaki Otoguro, Abiko (JP); Yuta Okada, Moriya (JP); Daisuke Aruga, Abiko (JP); Hitoshi Iwai, Abiko (JP); Shinichiro Hosoi, Tokyo (JP); Yuichiro Imai, Tokyo (JP); Toshiki Momoka, Tokyo (JP); Yoshitaka Otsubo, Tokyo (JP); Saimon Gokyu, Tokyo (JP); Takehiro Ishidate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/713,883

(22) Filed: Dec. 13, 2019

(65) Prior Publication Data

US 2020/0192236 A1    Jun. 18, 2020

Related U.S. Application Data

(63) Continuation of application No. PCT/JP2018/023715, filed on Jun. 15, 2018.

(30) Foreign Application Priority Data

Jun. 16, 2017   (JP) .............................. JP2017-119008

(51) Int. Cl.
*G03G 15/043* (2006.01)

(52) U.S. Cl.
CPC ................. *G03G 15/0435* (2013.01)

(58) Field of Classification Search
CPC .................................................. G03G 15/0435
See application file for complete search history.

(56) References Cited

U.S. PATENT DOCUMENTS

| 4,875,057 A | 10/1989 | Hediger et al. |
| 7,042,599 B2 | 5/2006 | Yokota et al. |
| 7,061,518 B2 | 6/2006 | Ueda et al. |

(Continued)

FOREIGN PATENT DOCUMENTS

| CN | 1338665 A | 3/2002 |
| CN | 1469152 A | 1/2004 |

(Continued)

OTHER PUBLICATIONS

Office Action dated Oct. 10, 2020, in Chinese Patent Application No. 201880040124.9.

(Continued)

*Primary Examiner* — Clayton E. LaBalle
*Assistant Examiner* — Michael A Harrison
(74) *Attorney, Agent, or Firm* — Venable LLP

(57) ABSTRACT

A holding member includes a first opposing portion (first inner wall surface) and a second opposing portion (second inner wall surface) which oppose side wall surfaces of a lens array. Side wall surfaces of the lens array on opposite end sides with respect to a longitudinal direction of the lens array are exposed from opposite ends of the first opposing portion and opposite ends of the second opposing portion.

10 Claims, 27 Drawing Sheets

(56) References Cited

U.S. PATENT DOCUMENTS

| | | |
|---|---|---|
| 7,154,525 B2 | 12/2006 | Oda et al. |
| 8,743,481 B2 | 6/2014 | Yamamura |
| 9,041,760 B2 | 5/2015 | Tajima et al. |
| 9,146,473 B2 | 9/2015 | Mikami et al. |
| 9,482,982 B2 | 11/2016 | Imai |
| 10,353,337 B2 | 7/2019 | Momoka et al. |
| 10,503,115 B2 | 12/2019 | Hosoi et al. |
| 10,551,786 B2 | 2/2020 | Iwai et al. |
| 10,564,589 B2 | 2/2020 | Hosoi et al. |
| 2010/0202800 A1 | 8/2010 | Sowa et al. |
| 2011/0235011 A1 | 9/2011 | Hatori |
| 2014/0002571 A1 | 1/2014 | Aruga |
| 2014/0160218 A1* | 6/2014 | Tajima .............. G03G 15/0435 347/118 |
| 2015/0234307 A1* | 8/2015 | Matsuo .............. G03G 15/0435 347/118 |
| 2019/0129327 A1 | 5/2019 | Aruga et al. |
| 2019/0346804 A1 | 11/2019 | Tamura et al. |

FOREIGN PATENT DOCUMENTS

| | | |
|---|---|---|
| CN | 1509236 A | 6/2004 |
| CN | 101799650 A | 8/2010 |
| CN | 102200717 A | 9/2011 |
| CN | 102759762 A | 10/2012 |
| CN | 103072385 A | 5/2013 |
| CN | 104122771 A | 10/2014 |
| JP | 58-203071 A | 11/1983 |
| JP | 2001-080110 A | 3/2001 |
| JP | 2001-277586 A | 10/2001 |
| JP | 2004-148748 A | 5/2004 |
| JP | 2005-059298 A | 3/2005 |
| JP | 2005-059300 A | 3/2005 |
| JP | 2007-055060 A | 3/2007 |
| JP | 2012-051250 A | 3/2012 |
| JP | 2016-182681 A | 10/2016 |
| WO | 02/092349 A1 | 11/2002 |

OTHER PUBLICATIONS

Office Action dated Feb. 8, 2021, in Indian Patent Application No. 202047000796.

International Search Report and Written Opinion dated Aug. 7, 2018, in International Patent Application No. PCT/JP2018/023715.

Extended European Search Report dated May 11, 2021, in European Patent Application No. 18818011.1.

Office Action dated Apr. 30, 2021, in Korean Patent Application No. 10-2020-7000519.

Office Action dated Mar. 15, 2022, in Japanese Patent Application No. 2019-525696.

Notice of Allowance dated Mar. 24, 2022, in Korean Patent Application No. 10-2020-7000519.

* cited by examiner

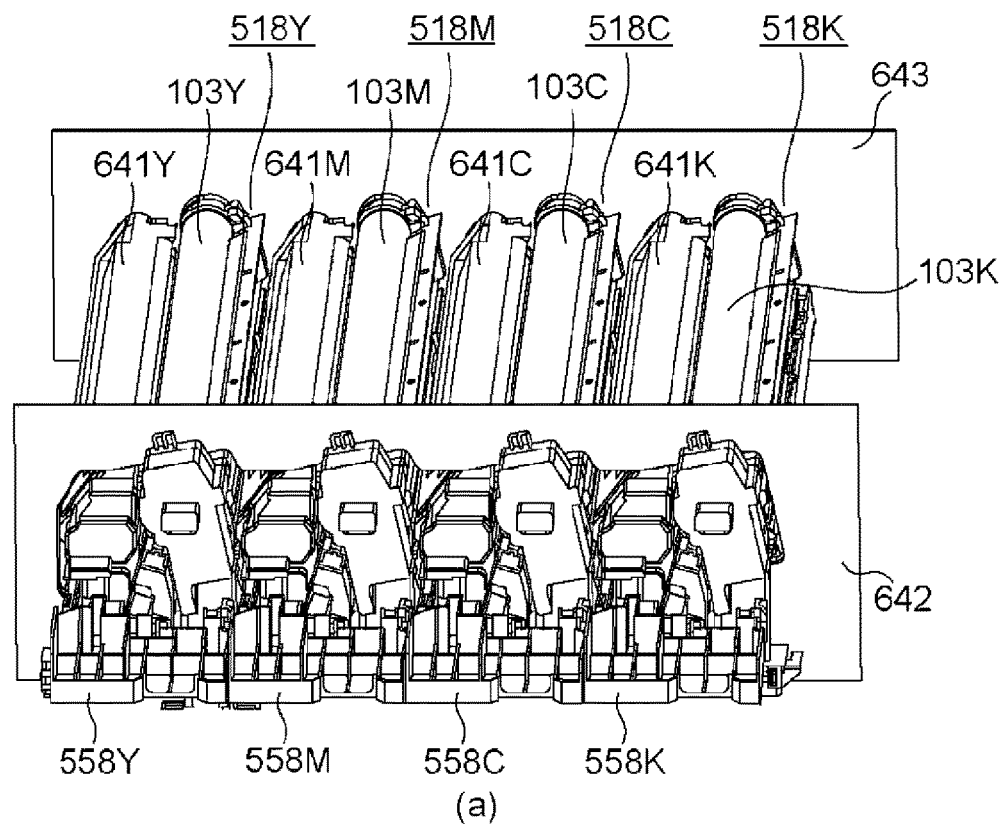
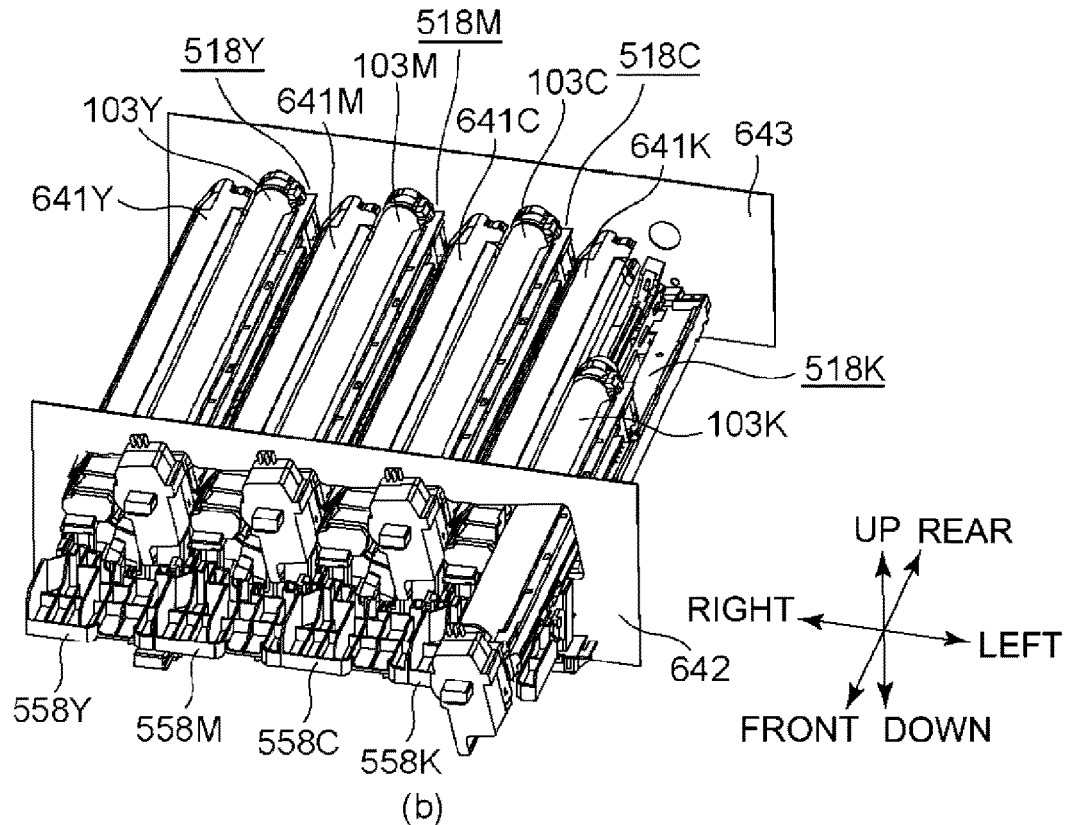
Fig. 2

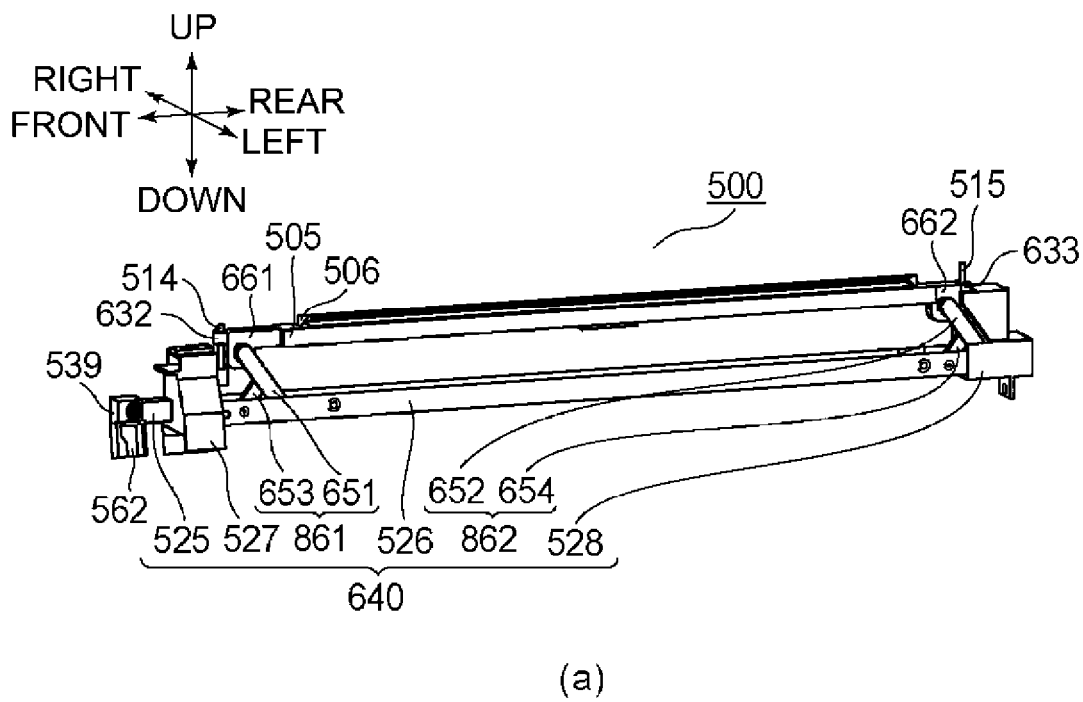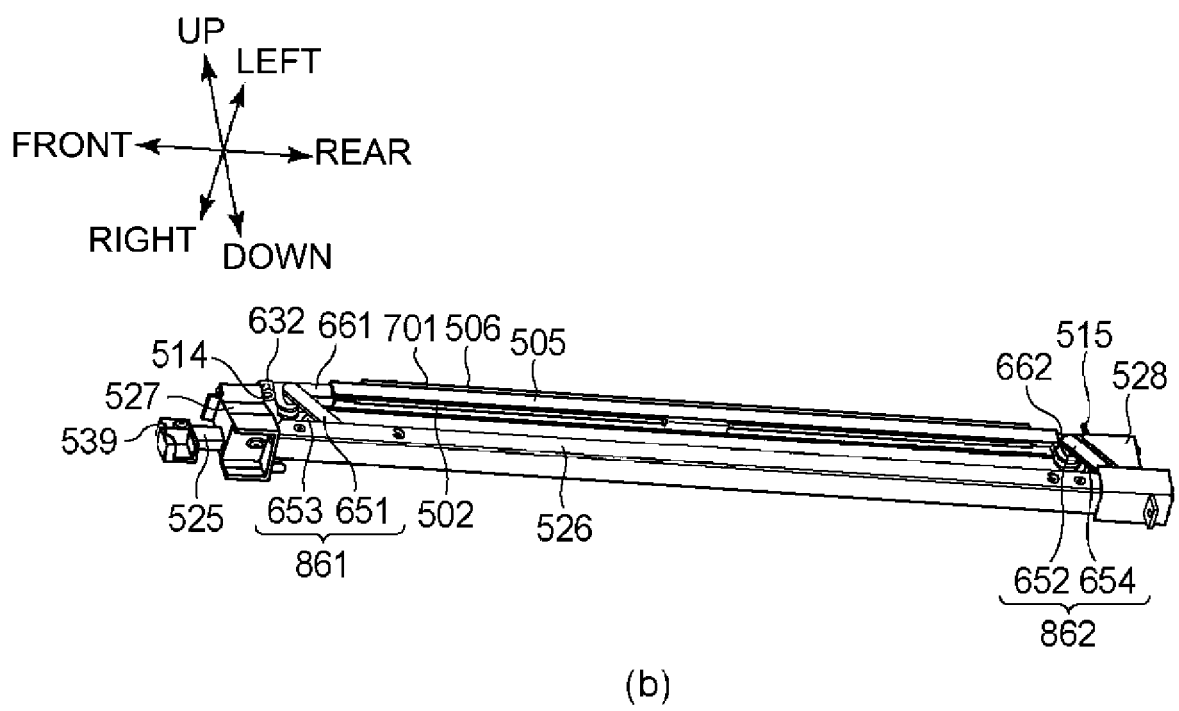
Fig. 3

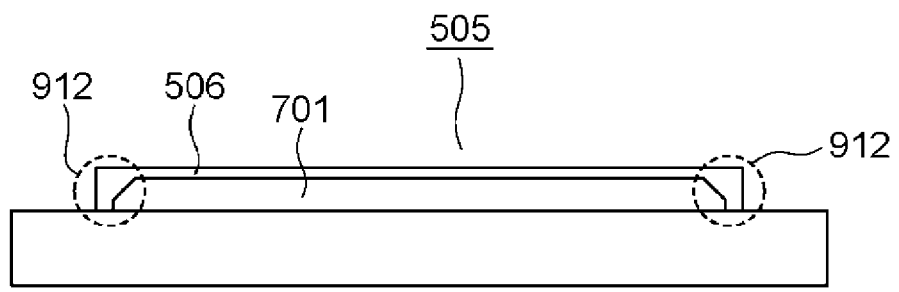
(a)
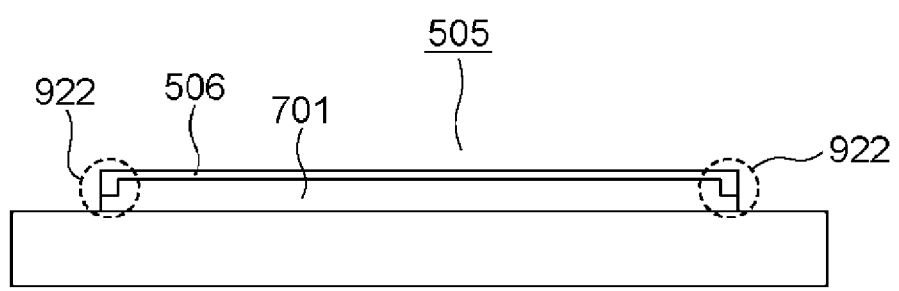
(b)
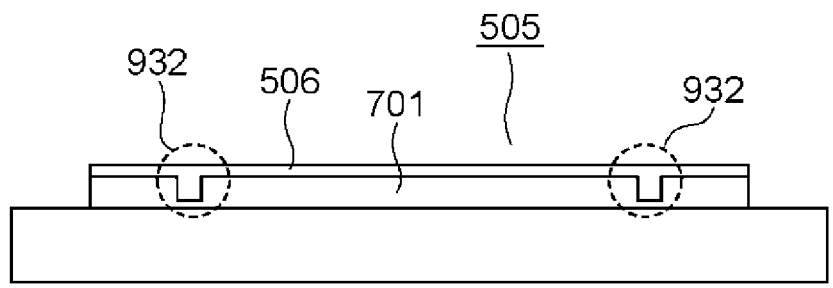
(c)
Fig. 6

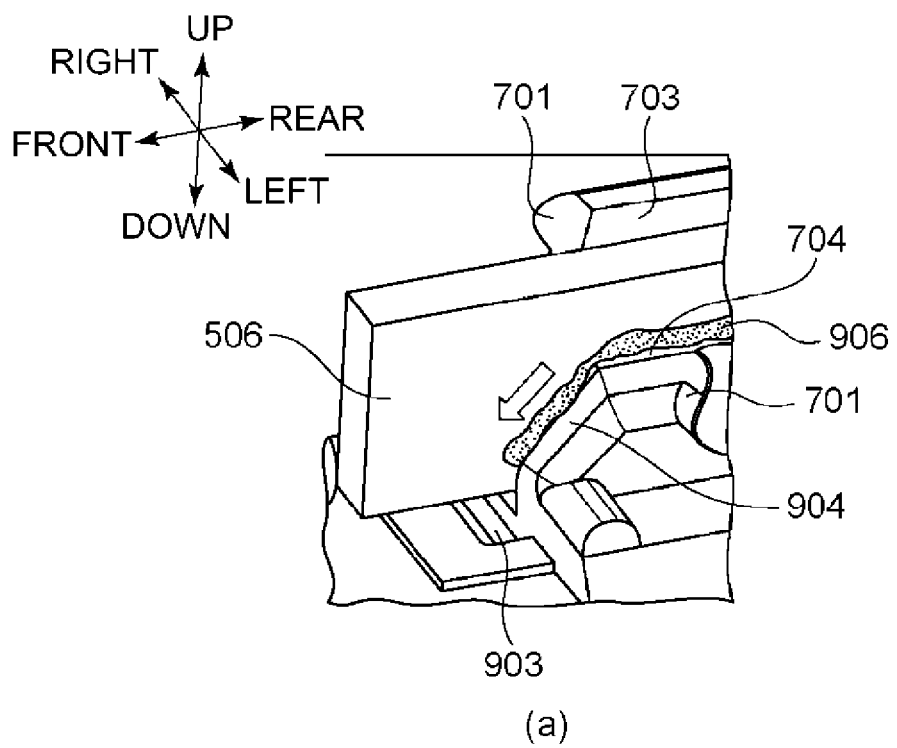
(a)
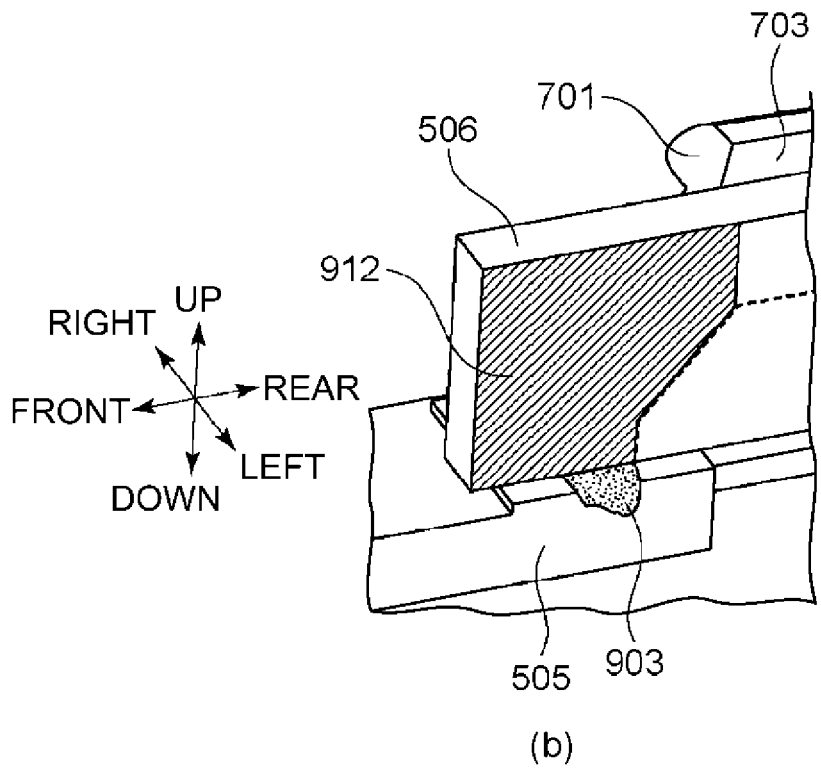
(b)
Fig. 8

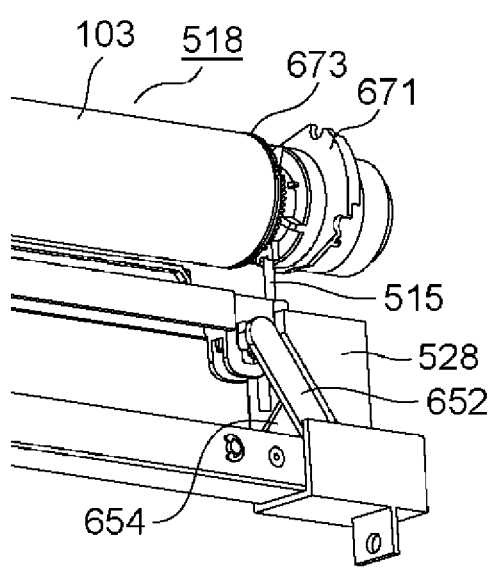 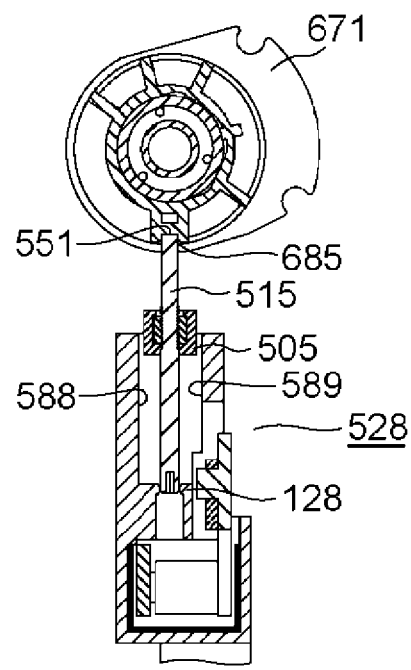
(a1) (a2)
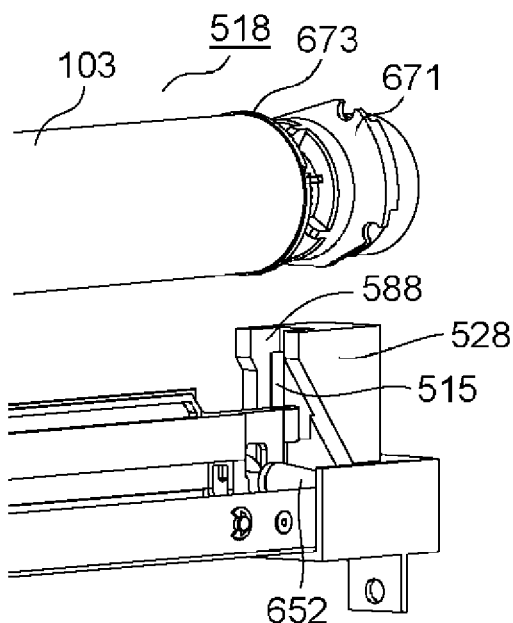 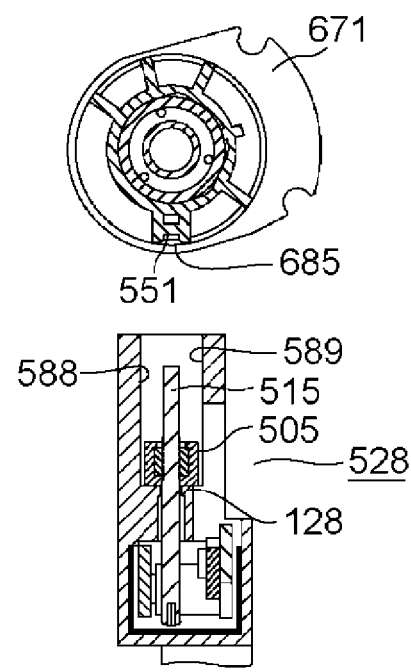
(b1) (b2)
Fig. 11

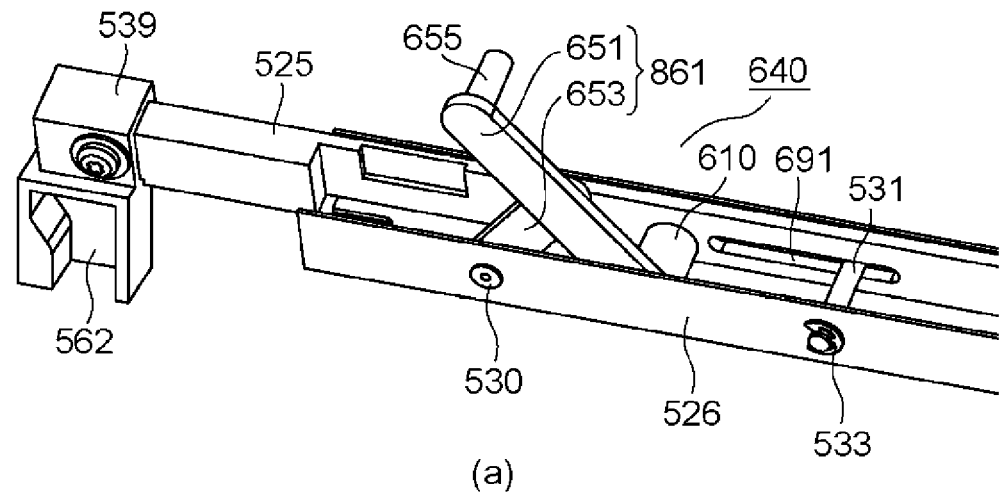
(a)
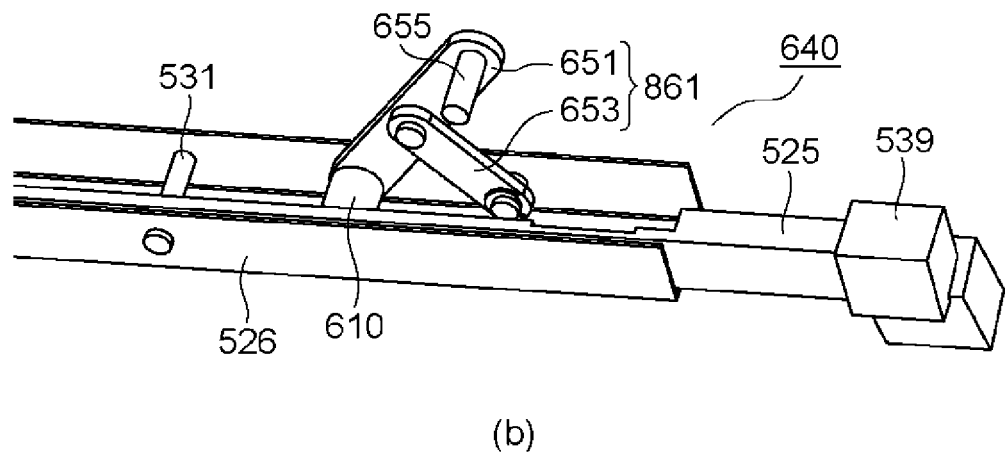
(b)
Fig. 15

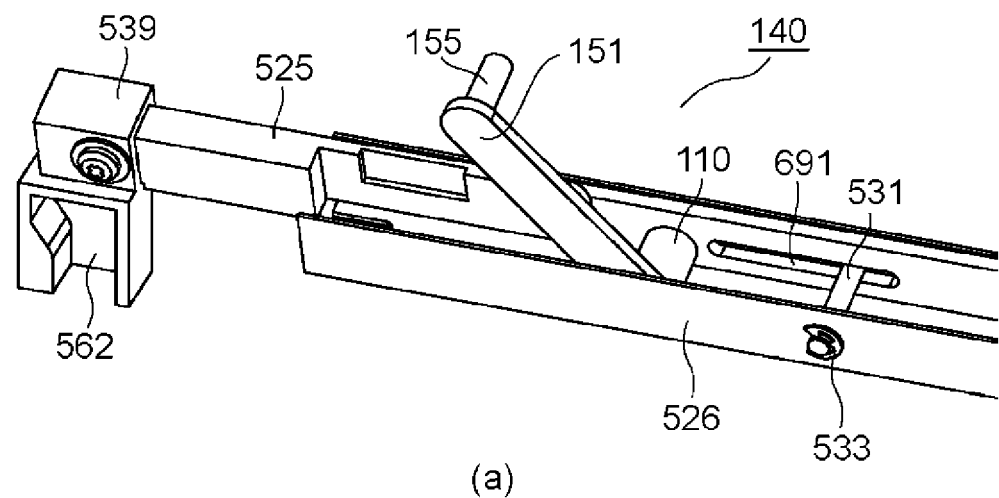
(a)
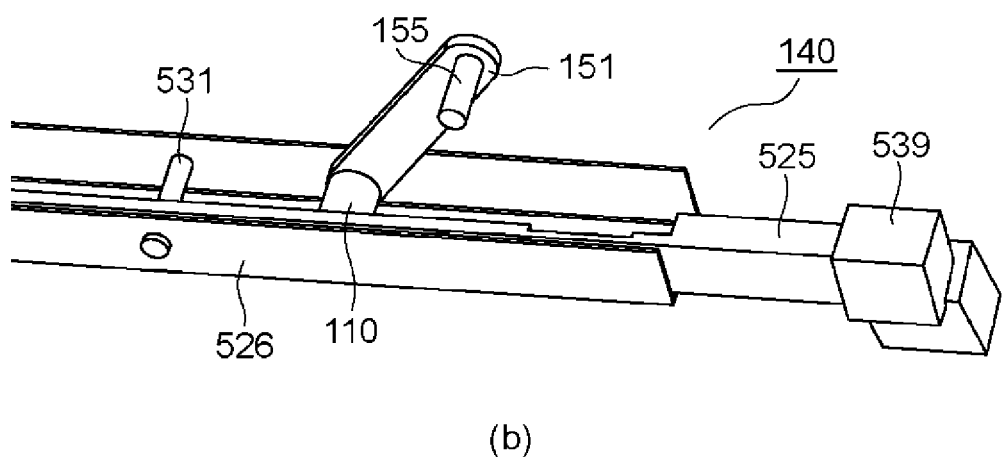
(b)
Fig. 17

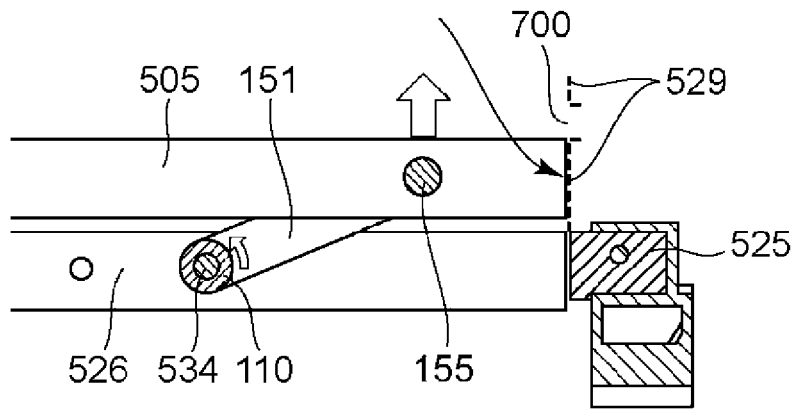
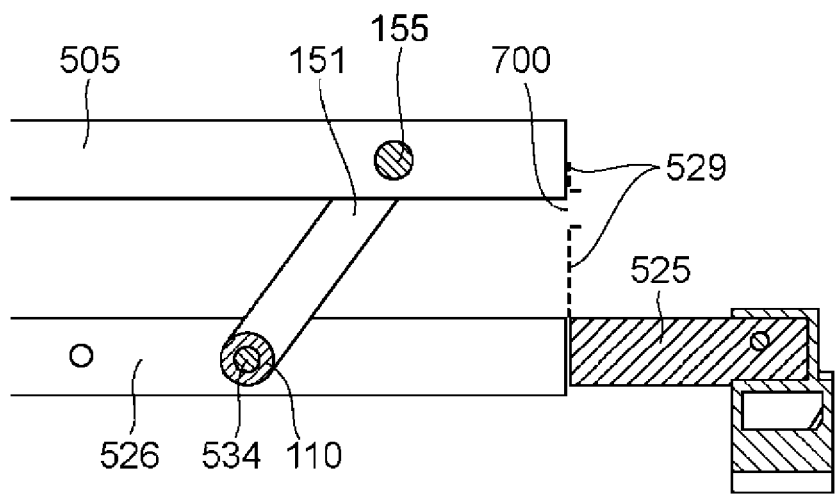
Fig. 18

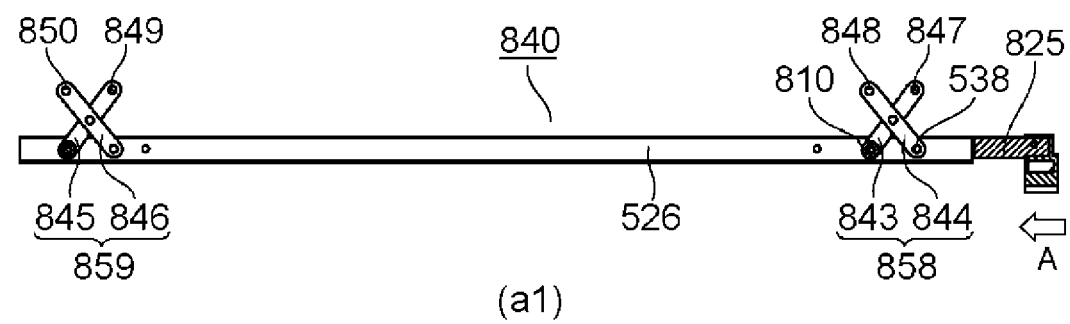
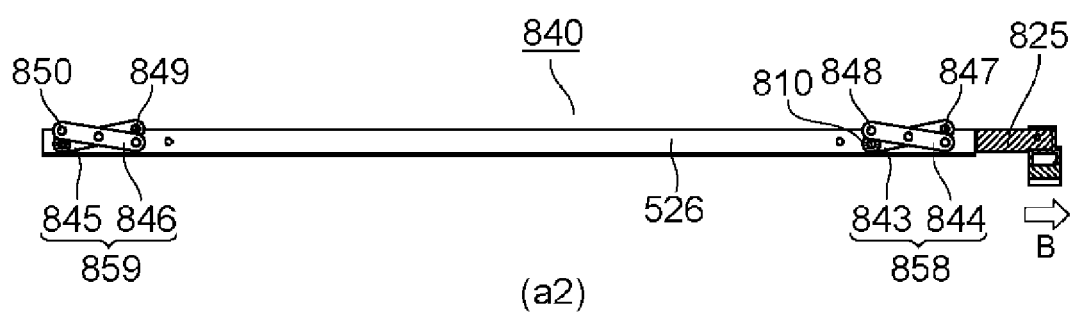
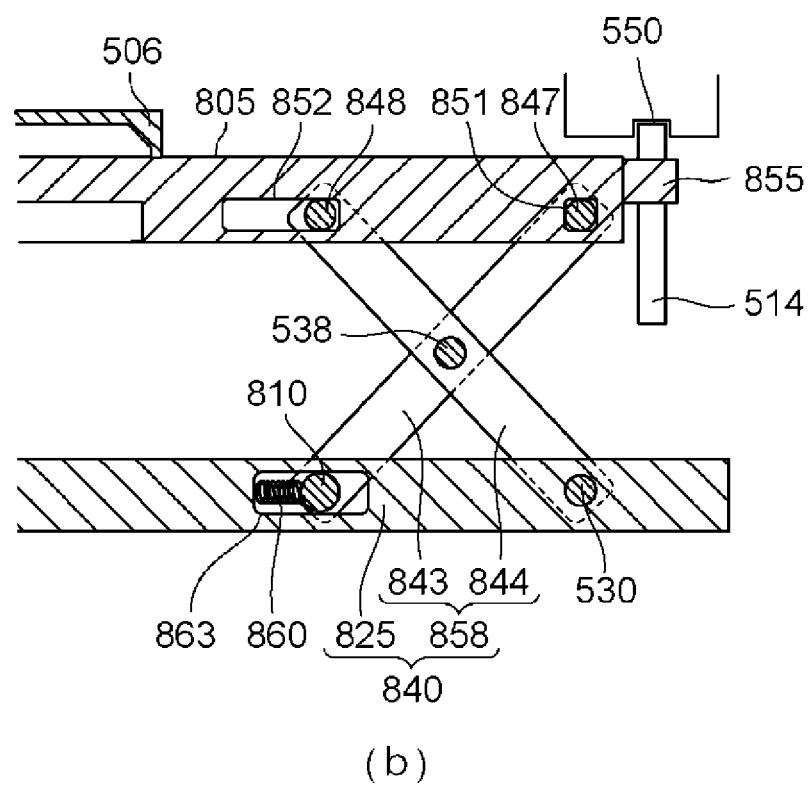
Fig. 19

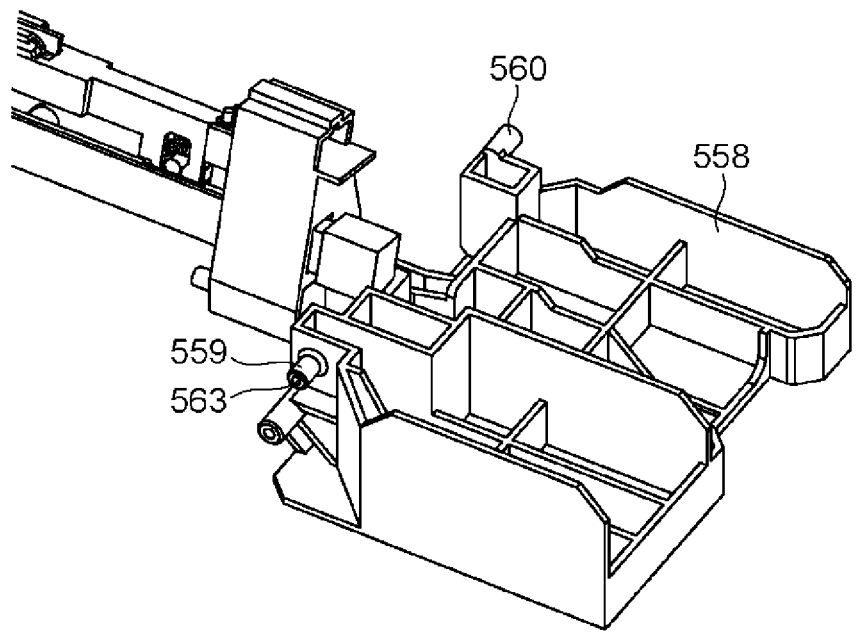
(a)
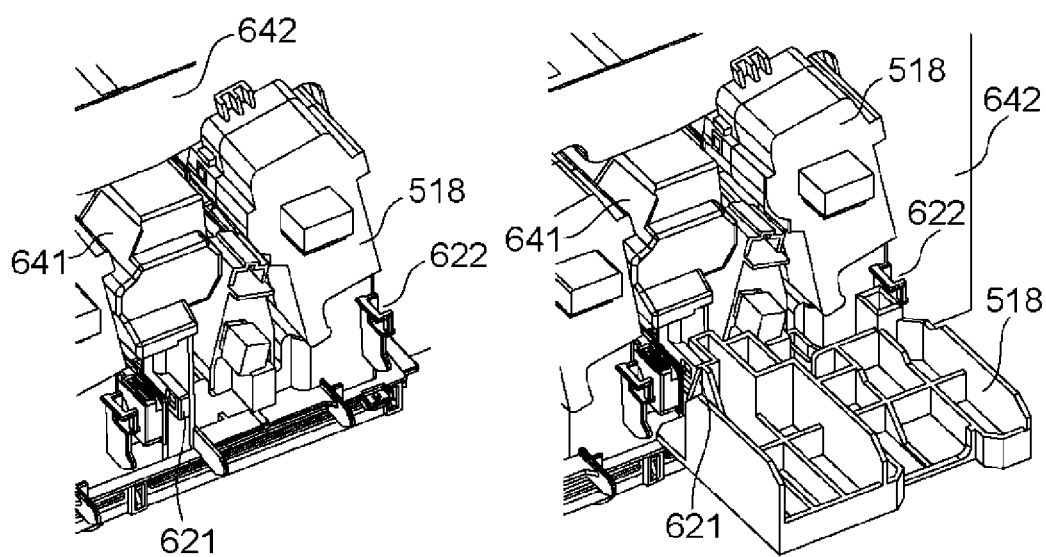
(b)         (c)
Fig. 21

OPTICAL PRINT HEAD, IMAGE FORMING APPARATUS AND MANUFACTURING METHOD OF THE OPTICAL PRINT HEAD

TECHNICAL FIELD

The present invention relates to an optical print head, an image forming apparatus including the optical print head, and a manufacturing method of the optical print head.

BACKGROUND ART

An image forming apparatus such as a printer or a copying machine includes an optical print head provided with a plurality of light emitting elements for exposing a photosensitive drum to light. As the optical print head, there are optical print heads including an LED (light emitting diode), an organic EL (electro-luminescence) device and the like as an example of a light emitting element (device), and optical print heads in which the light emitting elements are arranged in plurality along a rotational axis direction of the photosensitive drum in a row (line) or in two rows (lines) with a staggered pattern have been known. Further, the optical print head can include a plurality of lenses for concentrating light beams, emitted from the plurality of light emitting elements, onto the photosensitive drum. The plurality of lenses are disposed opposed to the surface of the photosensitive drum so as to extend along an arrangement direction of the light emitting elements between the light emitting elements and the photosensitive drum. The light beams emitted from the plurality of light emitting elements are concentrated on the surface of the photosensitive drum through the lenses. As a result, an electrostatic latent image is formed on the surface of the photosensitive drum.

The photosensitive drum is one of consumables, and therefore is exchanged periodically. An operator such as a user or maintenance person can perform maintenance of the image forming apparatus by exchanging the exchange unit including a photosensitive drum. The exchange unit is mountable in and dismountable from an image forming apparatus main assembly by being extracted from and inserted into the image forming apparatus main assembly. When the optical print head exposes the photosensitive drum to light, an interval between the lenses and the photosensitive drum surface is only about 3 mm. Therefore, during exchange of the exchange unit, there is a possibility of contact between the optical print head and the photosensitive drum if the optical print head is moved in a direction away from the photosensitive drum. Therefore, the image forming apparatus employs a constitution in which the optical print head is reciprocated between an exposure position during exposure of the photosensitive drum to light and a separated position where the optical print head is separated from the photosensitive drum, for mounting and dismounting of the exchange unit, more than the exposure position is, in some cases.

Here, in the image forming apparatus, an exposure means such as the optical print head is provided between a charging device and a developing device in some instances. In order to realize downsizing of the image forming apparatus, it is effective to minimize distances among the photosensitive drum, the optical print head, the charging device, the developing device and the like. However, at a periphery of the optical print head, toner scatters from the photosensitive drum and the developing device. For that reason, when the scattered toner or the like enters an inside of the optical print head, the light emitting elements are contaminated, so that there is a possibility that the light emitted from the light emitting elements is partially blocked. This is one of causes leading to a lowering in image quality of an output image. Accordingly, it is ideal that the lenses are mounted on an optical print head body with no gap. As a mounting method between the lenses and the optical print head body, for example, there is a constitution as disclosed in Japanese Laid-Open Patent Application (JP-A) 2012-51250.

As shown by FIG. 3 of JP-A 2012-51250, a lens array 56 is held by a casing 58 so as to oppose a light emitting diode array 62. As shown in FIG. 3, the lens array 56 and the casing 58 are adhesively bonded by a sealing agent 70. By this, the toner or the like scattering in the periphery is prevented from entering the inside of the optical print head through a gap between the lens array 56 and the casing 58. In a state in which the lens array 56 is inserted into a frame, the sealing agent 70 is applied along contact portions 78A and 78B, so that the lens array 56 is mounted into the casing 58.

SUMMARY OF THE INVENTION

Problems to be Solved by the Invention

However, in the constitution shown in JP-A 2012-51250, a problem as described below exists. When the lens array 56 is mounted to a holding member (casing 58), there is a need to adjust a locating (arrangement) position of the lens array 56 between a light emergent surface of the light emitting elements and a photosensitive drum surface. For that reason, in a state in which the lens array 56 is held by some holding mechanism, a mounting position of the lens array 56 to the holding member is finely adjusted, and thereafter, the lens array 56 and the holding member are mounted by an adhesive or the like. When the lens array 56 is held, if the lens array 56 is held with respect to a longitudinal direction of the lens array 56, there is a possibility that the lens array 56 is broken. Further, in a method in which the lens array 56 is held with respect to an optical axis direction of the lenses, when the lens array 56 is mounted to the holding member, a portion holding a lower surface of the lens array 56 interferes with an upper surface of the holding member. There is a need to hold a part of both side wall surfaces (surfaces crossing a direction perpendicular to a rotational axis direction of the photosensitive drum and the optical axis direction of the lenses) of the lens array by some holding mechanism, but in the constitution (see FIG. 1) disclosed in JP-A 2012-51250, it is difficult to say that of the side wall surfaces of the lens array, an area of a portion exposed from the holding member is sufficient.

Accordingly, when the lens array and the holding member are mounted, in a state in which a part of the lens array 56 is held, it is not easy to finely adjust a mounting position thereof.

Means for Solving the Problem

Against the above-described problem, an optical print head of the present invention is an optical print head included in an image forming apparatus, comprising: a light emitting portion in which a plurality of light emitting elements for emitting light for exposing thereto a photosensitive drum included in the image forming apparatus are arranged in a longitudinal direction of the optical print head; a lens array in which a plurality of lenses for concentrating the light, emitted from the plurality of light emitting elements, on a surface of the photosensitive drum are arranged in the longitudinal direction; a holding member for holding the light-emitting portion and the lens array; a first opposing portion which is formed by being projected from the holding member toward an emergent direction of the light with respect to an optical axis direction of the lenses and which opposes a first side wall surface which is a side wall surface of the lens array on one side with respect to a perpendicular direction perpendicular to both the longitudinal direction and the optical axis direction, wherein the first side wall surface is adhesively fixed to the first opposing portion; and a second opposing portion which is formed by being projected from the holding member toward the emergent direction and which opposes a second side wall surface which is a side wall surface of the lens array on the other side with respect to the perpendicular direction, wherein the second side wall surface is adhesively fixed to the second opposing portion, wherein of one end side and the other end side of the lens array with respect to the longitudinal direction, the first side wall surface at least on the one end side is exposed from an end portion of the first opposing portion with respect to the longitudinal direction, and of one end side and the other end side of the lens array with respect to the longitudinal direction, the second side wall surface at least on the other end side is exposed from an end portion of the second opposing portion with respect to the longitudinal direction.

Further, the optical print head of the present invention is an optical print head included in an image forming apparatus, comprising: a light emitting portion in which a plurality of light emitting elements for emitting light for exposing thereto a photosensitive drum included in the image forming apparatus are arranged in a longitudinal direction of the optical print head; a lens array in which a plurality of lenses for concentrating the light, emitted from the plurality of light emitting elements, on a surface of the photosensitive drum are arranged in the longitudinal direction; a holding member for holding the light-emitting portion and the lens array; a first opposing portion which is formed by being projected from the holding member toward an emergent direction of the light with respect to an optical axis direction of the lenses and to which a side wall surface of the lens array on one side with respect to a perpendicular direction perpendicular to both the longitudinal direction and the optical axis direction is adhesively fixed; and a second opposing portion which is formed by being projected from the holding member toward the emergent direction and to which a side wall surface of the lens array on the other side with respect to the perpendicular direction is adhesively fixed, wherein the side wall surfaces of the lens array with respect to the perpendicular direction are exposed from either of opposite ends of the first opposing portion with respect to the longitudinal direction and opposite ends of the second opposing portion with respect to the longitudinal direction.

Further, the optical print head of the present invention is an optical print head included in an image forming apparatus, comprising: a light emitting portion in which a plurality of light emitting elements for emitting light for exposing thereto a photosensitive drum included in the image forming apparatus are arranged in a longitudinal direction of the optical print head; a lens array in which a plurality of lenses for concentrating the light, emitted from the plurality of light emitting elements, on a surface of the photosensitive drum are arranged in the longitudinal direction; and a holding member for holding the light-emitting portion and the lens array, wherein the holding member includes, a first opposing portion which opposes a side wall surface of the lens array on one side with respect to a perpendicular direction perpendicular to both the longitudinal direction and an optical axis direction of the lenses and to which the side wall surface is adhesively fixed; and a second opposing portion which opposes a side wall surface of the lens array on the other side with respect to the perpendicular direction and to which the side wall surface is adhesively fixed, wherein in at least one opposing portion of the first opposing portion and the second opposing portion, at least a part of the opposing portion is provided with a recessed portion along the perpendicular direction, and a part of the side wall surface of the lens array with respect to the perpendicular direction is exposed from the recessed portion.

Further, an image forming apparatus of the present invention is an image forming apparatus comprising: a photosensitive drum; and an optical print head, wherein the optical print head comprises, a light emitting portion in which a plurality of light emitting elements for emitting light for exposing thereto a photosensitive drum included in the image forming apparatus are arranged in a longitudinal direction of the optical print head, a lens array in which a plurality of lenses for concentrating the light, emitted from the plurality of light emitting elements, on a surface of the photosensitive drum are arranged in the longitudinal direction, a holding member for holding the light-emitting portion and the lens array, a first opposing portion which is formed by being projected from the holding member toward an emergent direction of the light with respect to an optical axis direction of the lenses and which opposes a first side wall surface which is a side wall surface of the lens array on one side with respect to a perpendicular direction perpendicular to both the longitudinal direction and the optical axis direction, wherein the first side wall surface is adhesively fixed to the first opposing portion, and a second opposing portion which is formed by being projected from the holding member toward the emergent direction and which opposes a second side wall surface which is a side wall surface of the lens array on the other side with respect to the perpendicular direction, wherein the second side wall surface is adhesively fixed to the second opposing portion, wherein of one end side and the other end side of the lens array with respect to the longitudinal direction, the first side wall surface at least on the one end side is exposed from an end portion of the first opposing portion with respect to the longitudinal direction, and of one end side and the other end side of the lens array with respect to the longitudinal direction, the second side wall surface at least on the other end side is exposed from an end portion of the second opposing portion with respect to the longitudinal direction.

Further, the image forming apparatus of the present invention is an image forming apparatus comprising: a photosensitive drum; and an optical print head, wherein the optical print head comprises, a light emitting portion in which a plurality of light emitting elements for emitting light for exposing thereto a photosensitive drum included in the image forming apparatus are arranged in a longitudinal direction of the optical print head, a lens array in which a plurality of lenses for concentrating the light, emitted from the plurality of light emitting elements, on a surface of the photosensitive drum are arranged in the longitudinal direction, a holding member for holding the light-emitting portion and the lens array, a first opposing portion which is formed by being projected from the holding member toward an emergent direction of the light with respect to an optical axis direction of the lenses and to which a side wall surface of the lens array on one side with respect to a perpendicular direction perpendicular to both the longitudinal direction and the optical axis direction is adhesively fixed, and a second opposing portion which is formed by being projected from the holding member toward the emergent direction and to which a side wall surface of the lens array on the other side with respect to the perpendicular direction is adhesively fixed, wherein the side wall surfaces of the lens array with respect to the perpendicular direction are exposed from either of opposite ends of the first opposing portion with respect to the longitudinal direction and opposite ends of the second opposing portion with respect to the longitudinal direction.

Further, the image forming apparatus of the present invention is an image forming apparatus comprising: a photosensitive drum; and an optical print head, wherein the optical print head comprises, a light emitting portion in which a plurality of light emitting elements for emitting light for exposing thereto a photosensitive drum included in the image forming apparatus are arranged in a longitudinal direction of the optical print head, a lens array in which a plurality of lenses for concentrating the light, emitted from the plurality of light emitting elements, on a surface of the photosensitive drum are arranged in the longitudinal direction, and a holding member for holding the light-emitting portion and the lens array, wherein the holding member includes, a first opposing portion which opposes a side wall surface of the lens array on one side with respect to a perpendicular direction perpendicular to both the longitudinal direction and an optical axis direction of the lenses and to which the side wall surface is adhesively fixed; and a second opposing portion which opposes a side wall surface of the lens array on the other side with respect to the perpendicular direction and to which the side wall surface is adhesively fixed, wherein in at least one opposing portion of the first opposing portion and the second opposing portion, at least a part of the opposing portion is provided with a recessed portion along the perpendicular direction, and a part of the side wall surface of the lens array with respect to the perpendicular direction is exposed from the recessed portion.

Further, a manufacturing method of an optical print head of the present invention is a manufacturing method of an optical print head included in an image forming apparatus, including: a light emitting portion in which a plurality of light emitting elements for emitting light for exposing thereto a photosensitive drum included in the image forming apparatus are arranged in a longitudinal direction of the optical print head, a lens array in which a plurality of lenses each having an incident surface permitting incidence of the light emitted from the plurality of light emitting elements and having an emergent surface permitting emission of the light incident from the incident surface and each concentrating the light on a surface of the photosensitive drum are arranged in the longitudinal direction, a holding member for holding the light-emitting portion and the lens array, a first opposing portion which is formed by being projected from the holding member toward an emergent direction of the light with respect to an optical axis direction of the lenses and which opposes a first side wall surface which is a side wall surface of the lens array on one side with respect to a perpendicular direction perpendicular to both the longitudinal direction and the optical axis direction, wherein the first side wall surface is adhesively fixed to the first opposing portion; and a second opposing portion which is formed by being projected from the holding member toward the emergent direction and which opposes a second side wall surface which is a side wall surface of the lens array on the other side with respect to the perpendicular direction, wherein the second side wall surface is adhesively fixed to the second opposing portion, wherein opposite end sides of the first side wall surface with respect to the longitudinal direction are exposed from end portions of the first opposing portion of the longitudinal direction, respectively, and opposite end sides of the second side wall surface with respect to the longitudinal direction are exposed from end portions of the second opposing portion of the longitudinal direction, respectively, the manufacturing method of the optical print head comprising: a holding step in which the side wall surfaces on opposite end sides of the lens array with respect to the longitudinal direction are held with respect to the perpendicular direction by the holding mechanism; an arranging step in which the lens array held by the holding mechanism is inserted between the first opposing portion and the second opposing portion so that the incident surface and the light emitting portion oppose each other, and is arranged relative to the holding member so that a portion held by the holding mechanism is in a state in which the portion is exposed from the end portions of the first opposing portion with respect to the longitudinal direction and from the end portions of the second opposing portion with respect to the longitudinal direction; a light receiving step in which the light emitting elements are caused to emit the light, and the light entering the incident surface and emitted from the emergent surface is received by a light receiving device; an adjusting step in which the lens array in a state in which the lens array is held by the holding mechanism is moved on the basis of a light receiving result in the light receiving step; and a bonding step in which the lens array adjusted in an interval between the incident surface and the light emitting portion is adhesively fixed to the first opposing portion and the second opposing portion.

Further, the manufacturing method of the optical print head of the present invention is a manufacturing method of an optical print head included in an image forming apparatus, including: a light emitting portion in which a plurality of light emitting elements for emitting light for exposing thereto a photosensitive drum included in the image forming apparatus are arranged in a longitudinal direction of the optical print head, a lens array in which a plurality of lenses each having an incident surface permitting incidence of the light emitted from the plurality of light emitting elements and having an emergent surface permitting emission of the light incident from the incident surface and each concentrating the light on a surface of the photosensitive drum are arranged in the longitudinal direction, a holding member for holding the light-emitting portion and the lens array, a first opposing portion which is formed by being projected from the holding member toward an emergent direction of the light with respect to an optical axis direction of the lenses and which opposes a first side wall surface which is a side wall surface of the lens array on one side with respect to a perpendicular direction perpendicular to both the longitudinal direction and the optical axis direction, wherein the first side wall surface is adhesively fixed to the first opposing portion; and a second opposing portion which is formed by being projected from the holding member toward the emergent direction and which opposes a second side wall surface which is a side wall surface of the lens array on the other side with respect to the perpendicular direction, wherein the second side wall surface is adhesively fixed to the second opposing portion, wherein of one end side and the other end side of the lens array with respect to the longitudinal direction, the first side wall surface at least on the one end side is exposed from an end portion of the first opposing portion of the longitudinal direction, and of one end side and the other end side of the lens array with respect to the longitudinal direction, the second side wall surface at least on the other end side is exposed from an end portion of the second opposing portion of the longitudinal direction, a holding step in which the side wall surface of the lens array with respect to the longitudinal direction is held by the holding mechanism; an arranging step in which the lens array held by the holding mechanism is inserted between the first opposing portion and the second opposing portion so that the incident surface and the light emitting portion oppose each other, and is arranged relative to the holding member so that a portion held by the holding mechanism is in a state in which the portion is exposed from the end portions of the first opposing portion with respect to the longitudinal direction and from the end portions of the second opposing portion with respect to the longitudinal direction; a light receiving step in which the light emitting elements are caused to emit the light, and the light entering the incident surface and emitted from the emergent surface is received by a light receiving device; an adjusting step in which the lens array in a state in which the lens array is held by the holding mechanism is moved on the basis of a light receiving result in the light receiving step; and a bonding step in which the lens array adjusted in an interval between the incident surface and the light emitting portion is adhesively fixed to the first opposing portion and the second opposing portion.

Further, the manufacturing method of the optical print head of the present invention is a manufacturing method of an optical print head included in an image forming apparatus, including: a light emitting portion in which a plurality of light emitting elements for emitting light for exposing thereto a photosensitive drum included in the image forming apparatus are arranged in a longitudinal direction of the optical print head, a lens array in which a plurality of lenses each having an incident surface permitting incidence of the light emitted from the plurality of light emitting elements and having an emergent surface permitting emission of the light incident from the incident surface and each concentrating the light on a surface of the photosensitive drum are arranged in the longitudinal direction, and a holding member for holding the light-emitting portion and the lens array, wherein the holding member includes, a first opposing portion on which a plurality of recessed portions are formed along a perpendicular direction and which opposes a side wall surface of the lens array on one side with respect to the perpendicular direction perpendicular to both the longitudinal direction and an optical axis direction of the lenses, wherein the side wall surface is adhesively fixed to the first opposing portion; and a second opposing portion on which a plurality of perpendicular directions are formed along the perpendicular direction and which opposes a side wall surface of the lens array on the other side with respect to the perpendicular direction, wherein the side wall surface is adhesively fixed to the second opposing portion, wherein a part of the side wall surface of the lens array with respect to the perpendicular direction is exposed from the recessed portions formed on the first opposing portion and the recessed portions formed on the second opposing portion, the manufacturing method of the optical print head comprising: a holding step in which the side wall surface of the lens array with respect to the longitudinal direction is held by the holding mechanism; an arranging step in which the lens array held by the holding mechanism is inserted between the first opposing portion and the second opposing portion so that the incident surface and the light emitting portion oppose each other, and is arranged relative to the holding member so that a portion held by the holding mechanism is in a state in which the portion is exposed from the recessed portions formed on of the first opposing portion and from the recessed portions formed on the second opposing portion; a light receiving step in which the light emitting elements are caused to emit the light, and the light entering the incident surface and emitted from the emergent surface is received by a light receiving device; an adjusting step in which the lens array in a state in which the lens array is held by the holding mechanism is moved on the basis of a light receiving result in the light receiving step; and a bonding step in which the lens array adjusted in an interval between the incident surface and the light emitting portion is adhesively fixed to the holding member.

Further, the manufacturing method of the optical print head of the present invention is a manufacturing method of an optical print head included in an image forming apparatus, including: a light emitting portion in which a plurality of light emitting elements for emitting light for exposing thereto a photosensitive drum included in the image forming apparatus are arranged in a longitudinal direction of the optical print head, a lens array in which a plurality of lenses each having an incident surface permitting incidence of the light emitted from the plurality of light emitting elements and having an emergent surface permitting emission of the light incident from the incident surface and each concentrating the light on a surface of the photosensitive drum are arranged in the longitudinal direction, and a holding member for holding the light-emitting portion and the lens array, wherein the holding member includes, a first opposing portion opposing a side wall surface of the lens array on one side with respect to the perpendicular direction perpendicular to both the longitudinal direction and an optical axis direction of the lenses, wherein the side wall surface is adhesively fixed to the first opposing portion; and a second opposing portion opposing a side wall surface of the lens array on the other side with respect to the perpendicular direction, wherein the side wall surface is adhesively fixed to the second opposing portion, wherein in at least one opposing portion of the first opposing portion and the second opposing portion, at least a part of the opposing portion is provided with a recessed portion along the perpendicular direction, and a part of the side wall surface of the lens array with respect to the perpendicular direction is exposed from the recessed portion, the manufacturing method of the optical print head comprising: a holding step in which the side wall surface of the lens array with respect to the longitudinal direction is held by the holding mechanism; an arranging step in which the lens array held by the holding mechanism is inserted between the first opposing portion and the second opposing portion so that the incident surface and the light emitting portion oppose each other, and is arranged relative to the holding member so that a portion held by the holding mechanism is in a state in which the portion is exposed from the recessed portion; a light receiving step in which the light emitting elements are caused to emit the light, and the light entering the incident surface and emitted from the emergent surface is received by a light receiving device; an adjusting step in which the lens array in a state in which the lens array is held by the holding mechanism is moved on the basis of a light receiving result in the light receiving step; and a bonding step in which the lens array adjusted in an interval between the incident surface and the light emitting portion is adhesively fixed to the holding member.

Effect of the Invention

According to the optical print head and the image forming apparatus in the present invention, in a state in which both side wall surfaces of the lens array on both end sides with respect to a longitudinal direction of the lens array are gripped (held) by a gripping (holding) mechanism, the lens array can be inserted between the first opposing portion and the second opposing portion. Accordingly, in the state in which the lens array is gripped by the gripping mechanism, a mounting position of the lens array relative to the holding member can be arranged.

BRIEF DESCRIPTION OF THE DRAWINGS

FIG. 2 includes perspective views showing a drum unit and a periphery thereof in the image forming apparatus.

FIG. 3 includes schematic perspective views of an exposure unit.

FIG. 6 includes schematic views each for illustrating a feature of a shape of a lens mounting portion.

FIG. 8 includes enlarged views of the lens mounting portion on one end side.

FIG. 11 includes views each showing a state in which the optical print head is contacted to or retracted from a drum unit.

FIG. 15 includes perspective views of a moving mechanism for which the first supporting portion is not shown.

FIG. 17 includes schematic perspective views of the exposure unit.

FIG. 18 includes views for illustrating a moving mechanism.

FIG. 19 includes views for illustrating a moving mechanism of an X type.

FIG. 21 includes perspective views of a cover.

EMBODIMENTS FOR CARRYING OUT THE INVENTION

Embodiment (Image Forming Apparatus)

Figure 1:
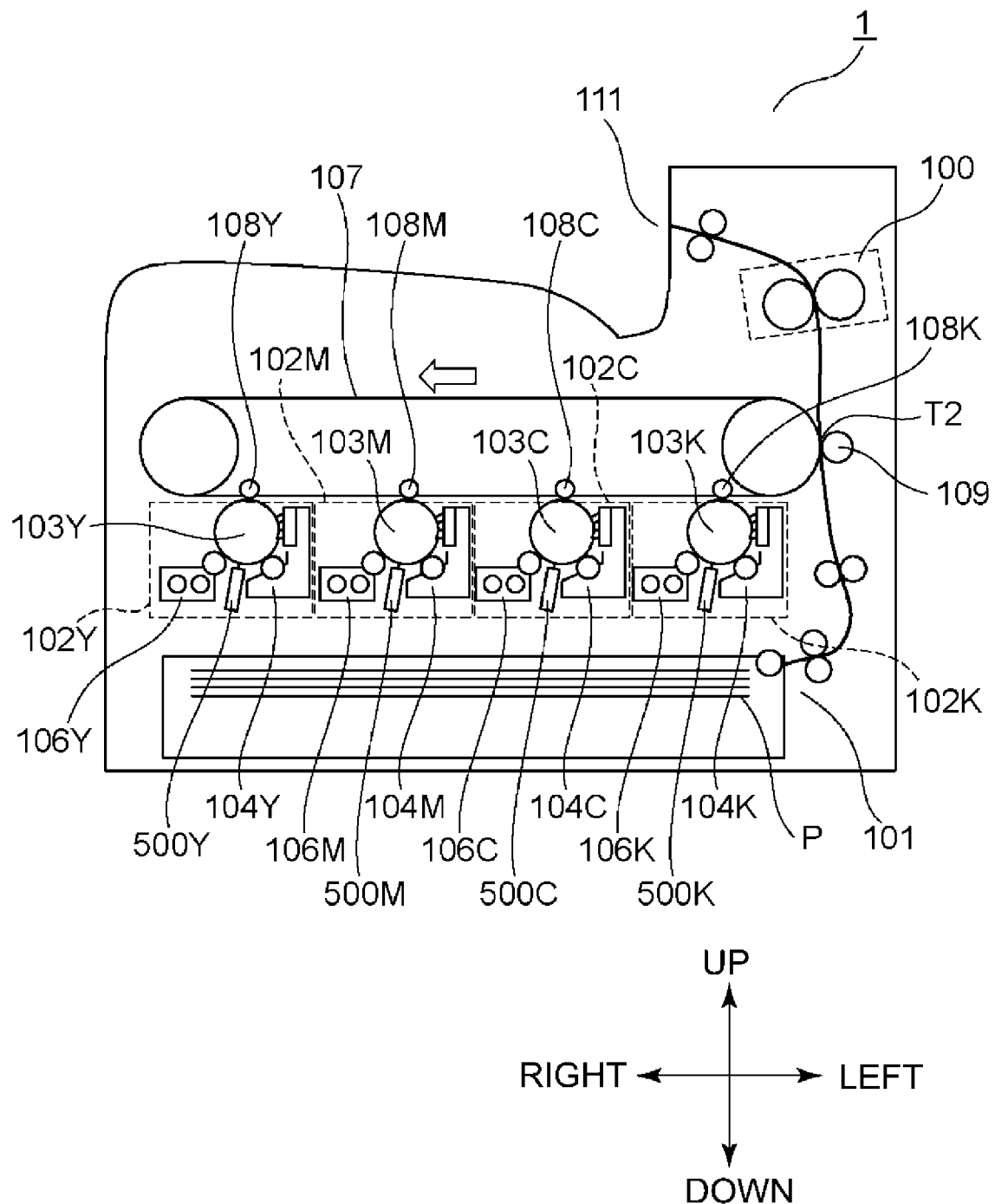
FIG. 1 is a schematic sectional view of an image forming apparatus.

First, a schematic structure of an image forming apparatus 1 will be described. FIG. 1 is a schematic sectional view of the image forming apparatus 1. The image forming apparatus 1 shown in FIG. 1 is a color printer (SFP: small function printer) including no reading device but may also be a copying machine including a reading device. Further, the embodiment is not limited to a color image forming apparatus including a plurality of photosensitive drums 103. The embodiment may also be a color image forming apparatus including a single photosensitive drum 103 or an image forming apparatus for forming a monochromatic image.

The image forming apparatus 1 shown in FIG. 1 includes four image forming portions 102Y, 102M, 102C and 102K (hereinafter collectively referred simply to as also an "image forming portion 102") for forming toner images of yellow, magenta, cyan and black. The image forming portions 102Y, 102M, 102C and 102K include photosensitive drums 103Y, 103M, 103C and 103K (hereinafter collectively referred simply to as also a "photosensitive drum 103"). Further, the image forming portions 102Y, 102M, 102C and 102K include charging devices 104Y, 104M, 104C and 104K (hereinafter collectively referred simply to as also a "charging device 104") for electrically charging the photosensitive drums 103Y, 103M, 103C and 103K. The image forming portions 102Y, 102M, 102C and 102K further include LED (light emitting diode, hereinafter described as LED) exposure units 500Y, 500M, 500C and 500K (hereinafter collectively referred simply to as also an "exposure unit 500") as light sources for emitting light (beams) to which the photosensitive drums 103Y, 103M, 103C and 103K are exposed. Further, the image forming portions 102Y, 102M, 102C and 102K include developing devices 106Y, 106M, 106C and 106K (hereinafter collectively referred simply to as also a "developing device 106") each for developing an electrostatic latent image on the photosensitive drum 103 with toner into a toner image of an associated color on the photosensitive drum 103. Y, M, C and K added to symbols represent colors of the toners.

The image forming apparatus 1 includes an intermediary transfer belt 7 onto which the toner images formed on the photosensitive drums 103 are to be transferred and primary transfer rollers 108 (Y, M, C, K) for successively transferring the toner images, formed on the photosensitive drums 103 of the respective image forming portions 102, onto the intermediary transfer belt 107. The image forming apparatus 1 further includes a secondary transfer roller 109 for transferring the toner images from the intermediary transfer belt 107 onto recording paper P fed from a sheet (paper) feeding portion 101 and includes a fixing device 100 for fixing the secondary-transferred toner images on the recording paper P.

(Drum Unit)

Then, drum units 518 (Y, M, C, K) and developing units 641 (Y, M, C, K), which are examples of an exchange unit mountable in and dismountable from the image forming apparatus 1 according to this embodiment, will be described. Part (a) of FIG. 2 is a schematic perspective view of a periphery of the drum units 518 and the developing units 641. Part (b) of FIG. 2 is a view showing a state in which the drum unit 518 is being inserted from an outside of the apparatus main assembly into the image forming apparatus 1.

As shown in part (a) of FIG. 2, the image forming apparatus 1 includes a front side plate 642 and a rear side plate 643 which are formed with a metal plate. The front side plate 642 is a side wall provided on a front (surface) side of the image forming apparatus 1. On the other hand, the rear side plate 643 is a side wall provided on a rear (surface) side of the image forming apparatus 1. As shown in part (a) of FIG. 2, the front side plate 642 and the rear side plate 643 are disposed opposed to each other, and an unshown metal plate as a beam is bridged between these plates. Each of the front side plate 642, the rear side plate 643 and the unshown beam constitutes a part of a frame of the image forming apparatus 1.

The front side plate 642 is provided with an opening through which the drum unit 518 and the developing unit 641 can be inserted and extracted. The drum unit 518 and the developing unit 641 are mounted at a predetermined position (mounting position) of the main assembly of the image forming apparatus 1 through the opening. Further, the image forming apparatus 1 includes covers 558 (Y, M, C, K) for covering a front side of the drum unit 518 and the developing unit 641 which are mounted in the mounting position. The cover 558 is fixed at one end thereof to the main assembly of the image forming apparatus 1 by a hinge, whereby the cover 518 is rotatable relative to the main assembly of the image forming apparatus 1. The operator for performing maintenance opens the cover 558 and takes the drum unit 518 or the developing unit 641 out of the image forming apparatus 1, and then inserts a new drum unit 518 or a new developing unit 641 into the image forming apparatus 1 and closes the cover 558, whereby an exchanging operation of the unit is completed. The cover 558 will be further specifically described later.

As shown in parts (a) and (b) of FIG. 2, in the following description, the front side plate 642 side and the rear side plate 643 side are defined as a front side and a rear side, respectively. Further, when a position of the photosensitive drum 103K on which the electrostatic latent image relating to the black toner image is formed is taken as a reference (position), a side where the photosensitive drum 103Y on which the electrostatic latent image relating to the yellow toner image is formed is disposed is defined as a right side. Further, when a position of the photosensitive drum 103Y is taken as a reference (position), a side where the photosensitive drum 103K is disposed is defined as a left side. Further, with respect to a direction perpendicular to a front-rear direction and a left-right direction, an upward direction in a vertical direction is defined as an up direction and a downward direction in the vertical direction is defined as a down direction. The front direction, the rear direction, the right direction, the left direction, the up direction and the down direction defined above are shown in part (b) of FIG. 2. Further, in the following description, with respect to a rotational axis direction of the photosensitive drum 103, one end side means the front side and the other end side means the rear side. Further, one end side and the other end side with respect to the front-rear direction also correspond to the front side and the rear side, respectively. Further, with respect to the left-right direction, one end side means the right side and the other end side means the left side.

In the image forming apparatus 1 of this embodiment, the drum unit 518 is mounted. The drum unit 518 is a cartridge to be exchanged. The drum unit 518 of this embodiment includes the photosensitive drum 103 rotatably supported by the casing of the drum unit 518. The drum unit 518 includes the photosensitive drum 103, the charging device 104 and an unshown cleaning device. When the photosensitive drum 103 reaches an end of a lifetime thereof, for example, due to abrasion through cleaning by the cleaning device, the operator for performing maintenance takes the drum unit 518 out of the apparatus main assembly, and exchanges the photosensitive drum 103 as shown in part (b) of FIG. 2. The drum unit 518 may also have a constitution in which the charging device 104 and the cleaning device are not provided and the photosensitive drum 103 was provided.

In the image forming apparatus 1 of this embodiment, the developing unit 641 which is a separate member from the drum unit 518 is mounted. The developing unit 641 includes the developing device 106 shown in FIG. 1. The developing device 106 includes a developing sleeve which is a developer carrying member for carrying the developer. The developing unit 641 is provided with a plurality of gears for rotating a screw for stirring toner and a carrier. When these gears are deteriorated with aging, the operator for performing maintenance takes the developing unit 641 out of the apparatus main assembly of the image forming apparatus 1. The developing unit 641 of this embodiment is a cartridge which is an integrally assembled unit of the developing device 106 including the developing sleeve and a toner accommodating portion provided with the screw. Incidentally, an embodiment of the drum unit 518 and the developing unit 641 may also be a process cartridge which is an integrally assembled unit of the above-described drum unit 518 and developing unit 641.

(Image Forming Process)

Next, an image forming process will be described. An optical print head 105Y described later exposes the surface of the photosensitive drum 103Y, charged by the charging device 104Y, to light. By this, an electrostatic latent image is formed on the photosensitive drum 103Y. Then, the developing device 106Y develops the electrostatic latent image, formed on the photosensitive drum 103Y, with yellow toner. A yellow toner image into which the electrostatic latent image is developed on the photosensitive drum 103Y is transferred onto the intermediary transfer belt 107 by the primary transfer roller 108Y at the primary transfer portion Ty. Magenta, cyan and black toner images are also transferred onto the intermediary transfer belt 107 by a similar image forming process.

The respective color toner images transferred on the intermediary transfer belt 107 are conveyed to a secondary transfer portion T2 by the intermediary transfer belt 107. To a secondary transfer roller 109 provided at the secondary transfer portion T2, a transfer bias for transferring the toner images onto the recording paper P is applied. The toner images conveyed to the secondary transfer portion T2 are transferred onto the recording paper P, fed from the sheet (paper) feeding portion 101, by the transfer bias applied to the secondary transfer roller 109. The recording paper P on which the toner images are transferred is conveyed to the fixing device 100. The fixing device 100 fixes the toner images on the recording paper P by heat and pressure. The recording paper P subjected to a fixing process by the fixing device 100 is discharged onto a sheet (paper) discharge portion 111.

(Exposure Unit)

Figure 4:
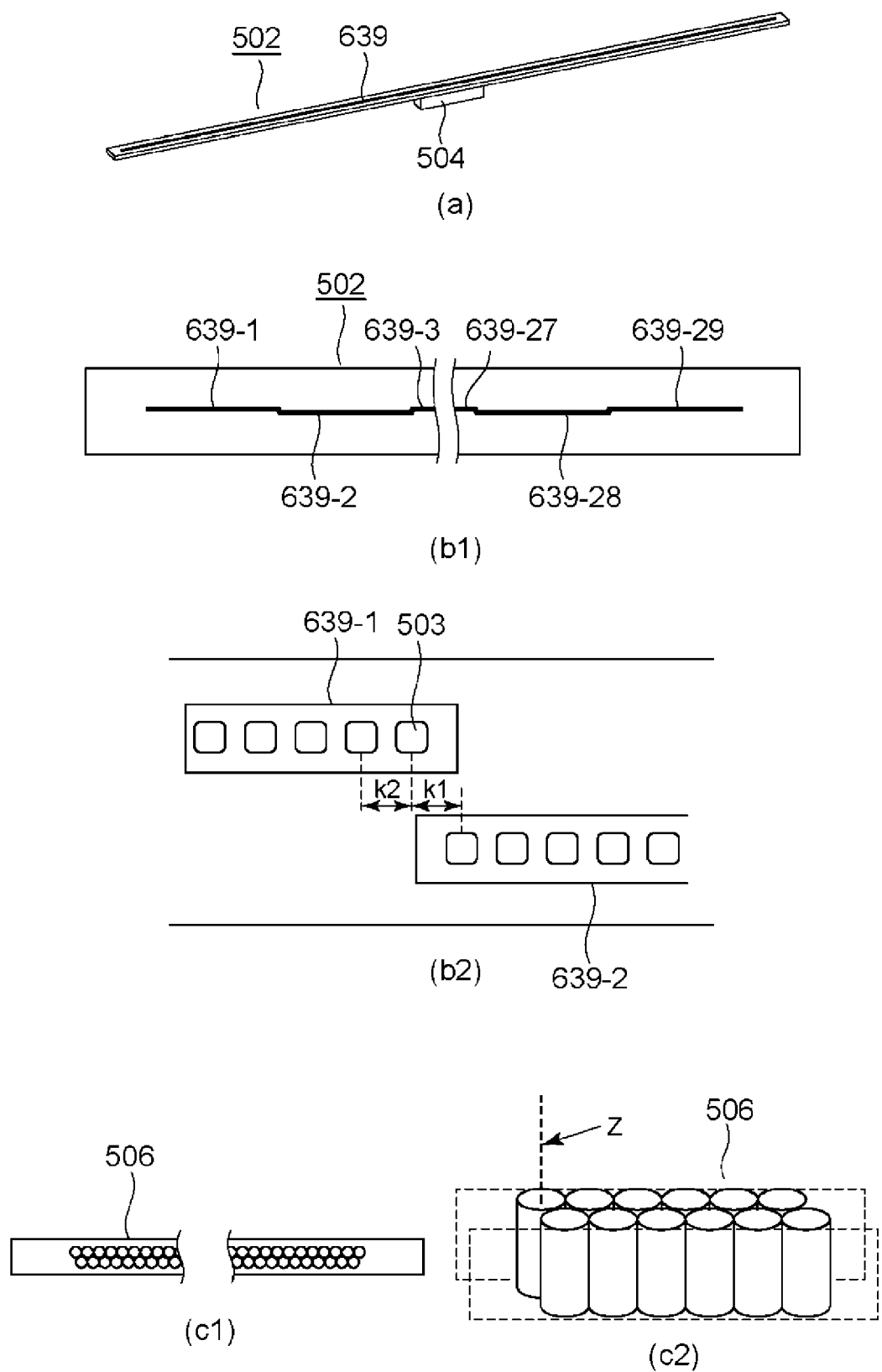
FIG. 4 includes schematic views for illustrating a substrate, an LED chip or a lens array of an optical print head.

Next, the exposure unit 500 including an optical print head 105 will be described. Here, as an example of an exposure type employed in an image forming apparatus of an electrophotographic type, there is a laser beam scanning exposure type in which the photosensitive drum is scanned with a beam emitted from a semiconductor laser by a rotating polygon mirror or the like and the photosensitive drum is exposed to the beam through of f-θ lens or the like. The "optical print head 105" described in this embodiment is used in an LED exposure type in which the photosensitive drum 103 is exposed to light by using light emitting elements such as LEDs or the like arranged along the rotational axis direction of the photosensitive drum 103 and thus is not used in the laser beam scanning exposure type described above. Part (a) of FIG. 3 is a schematic perspective view of the exposure unit 500 provided in the image forming apparatus 1 of this embodiment. Part (b) of FIG. 3 is a view of the exposure unit 500 shown in part (a) of FIG. 3 as seen from a lower side. FIG. 4 includes schematic sectional views in which the exposure unit 500 shown in FIG. 3 and the photosensitive drum 103 disposed on an upper side of the exposure unit 500 are cut along a surface perpendicular to the rotational axis direction of the photosensitive drum 103. The exposure unit 500 includes the optical print head 105 and a moving mechanism 640. The optical print head 105 includes a lens array 506, a substrate 502 (light emitting portion), a holding member 505 for holding the lens array 506, a contact pin 514, and a contact pin 515. The moving mechanism 640 includes a link member 651, a link member 652, a slidable portion 525, a first supporting portion 527, a second supporting portion 528, and a third supporting portion 526. Here, in this embodiment, the contact pin 514 and the contact pin 515 are cylindrical pins, but a shape thereof is not limited to a cylinder and may also be shapes such as a prism and a cone having a diameter narrower toward an end portion thereof. Further, one of the contact pin 514 or the contact pin 515 is not needed to be a pin, but as a member having a similar function thereto, may also be a projection projecting toward an upper side and a lower side of the holding member 505, for example.

First, the holding member 505 will be described. The holding member 505 is a holder holding the substrate 502, the lens array 506, the contact pin 514 and the contact pin 515. In this embodiment, as an example, a length of the contact pin 514 projecting from an upper surface of the holding member 505 is 7 mm, a length of the contact pin 515 projecting from the upper surface of the holding member 505 is 11 mm, a length of the contact pin 514 projecting from a lower surface of the holding member 505 is 22 mm, and a length of the contact pin 515 projecting from the lower surface of the holding member 505 is 22 mm. As shown in FIG. 4, the holding member 505 includes a lens mounting portion 701 where the lens array 506 is mounted and a substrate mounting portion 702 where the substrate 502 is mounted. Further, although described later specifically the holding member 505 includes a spring mounting portion 661 (662) and a pin mounting portion 632 (633). The holding member 505 is a mold, made of a resin, prepared by integrally subjecting the lens mounting portion 701, the substrate mounting portion 702, the spring mounting portion 661 and the spring mounting portion 662 to injection molding. Incidentally, a material of the holding member is not limited to the resin, but may also be made of metal, for example.

As shown in part (b) of FIG. 3, the spring mounting portion 661 where the link member 651 is mounted is provided further on the front side than both of a front side-end portion of the lens array 506 and a front side-end portion of the substrate 502 and further on a rear side than the pin mounting portion 632. Further, the spring mounting portion 662 where the link member 652 is mounted is provided further on the rear side than both of a rear side-end portion of the lens array 506 and a rear side-end portion of the substrate 502 and further on a front side than the pin mounting portion 633. That is, the holding member 505 is supported by the link member 651 between the lens array 506 and the contact pin 514 in a front-rear direction, and is supported by the link member 652 between the lens array 506 and the contact pin 515 in the front-rear direction. Portions where an urging force is imparted to the holding member 505 by the link member 651 and the link member 652 do not overlap with the lens array 506 with respect to an up-down direction, and therefore, flexure of the lens array 506 by the urging force is reduced.

FIG. 4 includes schematic sectional views in which the exposure unit 500 shown in FIG. 3 and the photosensitive drum 103 disposed on the upper side of the exposure unit 500 are cut along the surface perpendicular to the rotational axis direction of the photosensitive drum 103.

The lens mounting portion 701 is formed so as to project upwardly from the holding member 505. In other words, the lens mounting portion 701 is formed so as to project from the holding member 505 toward an emergent direction of light emitted from the light emitting elements in an optical axis direction of lenses. The lens mounting portion 701 includes a first inner wall surface 507 (first opposing portion) and a second inner wall surface 508 (second opposing portion). The first inner wall surface 507 extends in a longitudinal direction of the holding member 505, and the second inner wall surface 508 extends in the longitudinal direction of the holding member 505. The first inner wall surface 507 is provided on one side with respect to a perpendicular direction (direction perpendicular to both of the longitudinal direction of the lens array 506 and the optical axis direction of the lenses) of the holding member 505, and the second inner wall surface 508 is provided on the other side with respect to the perpendicular direction (direction perpendicular to both of the longitudinal direction of the lens array 506 and the optical axis direction of the lenses) of the holding member 505. That is, when the lens array 506 is dismounted from the lens mounting portion 701, the first inner wall surface 507 and the second inner wall surface 508 oppose each other with respect to the left-right direction. During assembling of the optical print head 105, the lens array 506 is inserted between the first inner wall surface 507 and the second inner wall surface 508. Then, an adhesive is applied between the first inner wall surface 507 and a side wall surface (first side wall surface) of the lens array 506 opposing the first inner wall surface 507, and is applied between the second inner wall surface 508 and a side wall surface (second side wall surface) of the lens array 506 opposing the second inner wall surface 508. By this, the lens array 506 is fixed to the holding member 505. The exposure unit 500 is provided on a side below a rotational axis of the photosensitive drum 103 with respect to a vertical direction, and LEDs 503 of the optical print head 105 expose the photosensitive drum 103 to light from below. Incidentally, the exposure unit 500 may also have a constitution in which the exposure unit 500 is provided on a side above the rotational axis of the photosensitive drum 103 with respect to the vertical direction, and the LEDs 503 of the optical print head 105 expose the photosensitive drum 103 to light from above. Further, the adhesive referred to herein may also be an adhesive having a function of a sealing agent for preventing power such as toner or dust from entering an inside of the holding member 505. That is, the adhesive in this embodiment may also be an adhesive which principally aims at sealing a gap between the lens array 506 and the holding member 505 and which adhesively bonds the lens array 506 and the holding member 505 to each other as an auxiliary function thereof.

Next, the substrate 502 held by the holding member 505 will be described. Part (a) of FIG. 4 is a schematic perspective view of the substrate 502. Part (b1) of FIG. 4 is a schematic view showing an arrangement of a plurality of LEDs 503 provided on the substrate 502, and Part (b2) of FIG. 4 is an enlarged view of part (b1) of FIG. 4.

On the substrate 502, LED chips 539 are mounted. As shown in part (a) of FIG. 4, on one surface of the substrate 502, the LED chips 639 are provided, and on the back surface side of the substrate 502, a connector 504 is provided. On the substrate 502, electrical wiring for supplying signals to the respective LED chips 639 is provided. To the connector 504, one end of an unshown flexible flat cable (FFC) is connected. In the image forming apparatus 1 main assembly, a substrate is provided. The substrate 502 includes a controller and a connector. The other end of the FFC is connected to the connector. To the substrate 502, a control signal is inputted from the controller of the image forming apparatus 1 main assembly through the FFC and the connector 504. The LED chips 639 are driven by the control signal inputted to the substrate 502.

The LED chips 639 mounted on the substrate 502 will be described further specifically. As shown in parts (b1) and (b2) of FIG. 4, on one surface of the substrate 502, a plurality of LED chips 639-1 to 639-29 (29 LED chips) where having a plurality of LEDs 503 are disposed. On each of the LED chips 639-1 to 639-29, 516 LEDs (light emitting elements) are arranged in a line along a longitudinal direction of the LED chips 639. With respect to the longitudinal direction of the LED chips 639, a center distance k2 between adjacent LEDs corresponds to resolution of the image forming apparatus 1. The resolution of the image forming apparatus 1 is 1200 dpi, and therefore, in the longitudinal direction of the LED chips 639-1 to 639-29, the LEDs are arranged in a line so that the center distance of the LEDs is 21.16 μm. For that reason, an exposure range of the optical print head 105 in this embodiment is about 316 mm. A photosensitive layer on the photosensitive drum 103 is formed with a width of 316 mm or more. A long-side length of A4-size recording paper and a short-side length of A3-size recording paper are 297 mm, and therefore, the optical print head 105 in this embodiment has the exposure range in which the image can be formed on the A4-size recording paper and the A3-size recording paper.

The LED chips 639-1 to 639-29 are alternately disposed in two lines along the rotational axis direction of the photosensitive drum 103. That is, as shown in part (b1) of FIG. 4, odd-numbered LED chips 639-1, 639-3, ... 639-29 counted from a left side are mounted on the substrate 502 in a line with respect to the longitudinal direction, and even-numbered LED chips 639-2, 639-4, ... 639-28 counted from the left side are mounted on the substrate 502 in a line with respect to the longitudinal direction. By disposing the LED chips 639 in such a manner, as shown in part (b2) of FIG. 4, with respect to the longitudinal direction of the LED chips 639, a center distance k1 between one end of one (e.g., 639-1) of adjacent (different) LED chips 639 and the other end of the other one (e.g., 639-2) of the adjacent LED chips 639 can be made equal to the center distance k2 between the adjacent LEDs on one (e.g., 639-1) of LED chips 639.

Incidentally, in this embodiment, a constitution using the LEDs as an exposure light source is described as an example, but as the exposure light source, an organic EL (electro luminescence) device may also be used.

Next, a lens array 506 will be described. Part (c1) of FIG. 4 is a schematic view of the lens array 506 as seen from the photosensitive drum 103 side. Further, part (c2) of FIG. 4 is a schematic perspective view of the lens array 506. As shown in part (c1) of FIG. 4, a plurality of lenses are arranged in two lines along an arrangement direction of the plurality of LEDs 503. The respective lenses are alternately disposed so that with respect to an arrangement direction of the lenses arranged in one line, one of the lenses arranged in the other line contacts both of adjacent lenses arranged in the arrangement direction of the lenses arranged in the above-described one line. Each of the lenses is a cylindrical rod lens made of glass, and has an incident surface in which light emitted from the LEDs 503 enters and has an emergent surface from which the light entering from the incident surface is emitted. Incidentally, a material of the lens is not limited to glass, but may also be plastics. Also, a shape of the lens is not limited to the cylindrical shape, but may also be a polygonal prism shape such as a hexagonal prism shape.

A broken line Z shown in part (c2) of FIG. 4 represents an optical axis of the lens. The optical print head 105 is moved by the above-described moving mechanism 640 in a direction roughly along the optical axis of the lens indicated by the broken line Z. The optical axis of the lens referred to herein means a line connecting a center of a light emitting (emergent) surface of the lens and a focus of the lens. As shown in FIG. 4, emitted light emitted from the LED enters the lens of the lens array 506. The light entering the lens is concentrated on the surface of the photosensitive drum 103. A mounting position of the lens array 506 relative to the lens mounting portion 701 during assembling of the optical print head 105 is adjusted so that a distance between a light emitting surface of the LED and a light incident surface of the lens and a distance between a light emitting surface of the lens and the surface of the photosensitive drum 103 are substantially equal to each other.

Next, using FIG. 5 to FIG. 8, a mounting method among the substrate 502, the lens array 506 and the holding member 505 will be specifically described.

First, the mounting method between the lens array 506 and the holding member 505 will be described.

Figure 5:
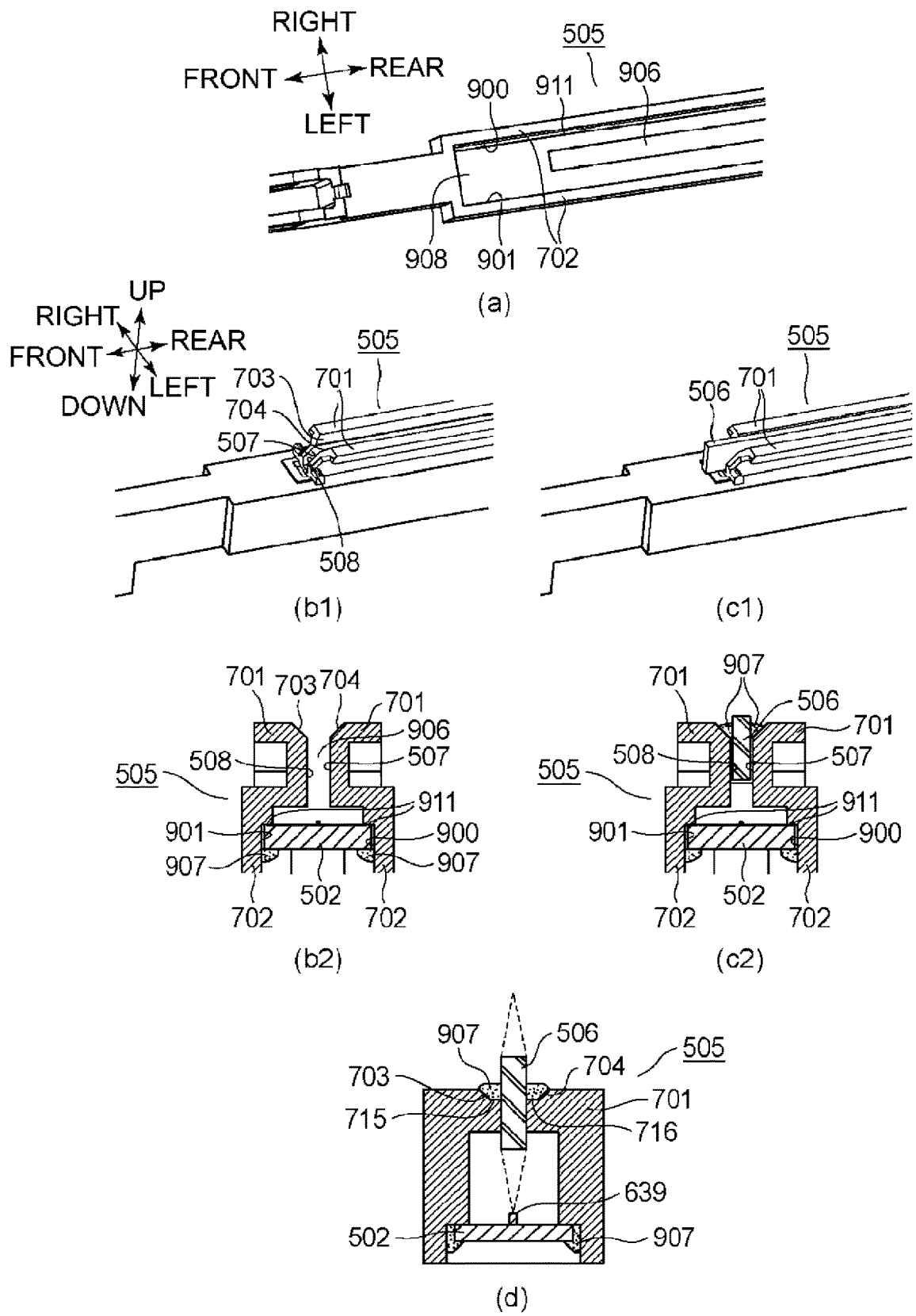
FIG. 5 includes schematic views for illustrating a holding member for which the lens array and the substrate are not shown.

Part (a) of FIG. 5 is a view of the front side of the holding member 505 seen from a lower side. The substrate 502 and the lens array 506 are not shown. As shown in part (a) of FIG. 5, in the holding member 505, a through hole 906 extending over the longitudinal direction of the holding member 505 is formed. In other words, the holding member 505 is provided with the through hole 906 in which the lens array 506 is engaged. Although described later in detail, in a state in which the lens array 506 is inserted into the through hole 906, the mounting position of the lens array 506 relative to the holding member 505 is adjusted. Thereafter, an adhesive 907 is applied onto a boundary portion between the lens array 506 and the holding member 505, so that the lens array 506 and the holding member 505 are adhesively fixed to each other. At this time, there is no need to apply the adhesive in an entire region of the boundary portion, but the lens array 506 and the holding member 505 may also be fixed by being discretely bonded at several portions.

Part (b1) of FIG. 5 is a schematic perspective view of a front side of the holding member 505 in which the lens array 506 is not shown, and part (b2) of FIG. 5 is a view of the holding member 505, in which the lens array 506 is not shown, as seen from the front side in a sectional view of the holding member 505 cut along a surface perpendicular to the rotational axis direction of the photosensitive drum 103. Further, part (c1) of FIG. 5 is a schematic perspective view of the front side of the holding member 505 in which the lens array 506 is adhesively fixed, and part (c2) of FIG. 5 is a view of the holding member 505, in which the lens array 506 is adhesively fixed, as seen from the front side in a sectional view of the holding member 505 cut along the surface perpendicular to the rotational axis direction of the photosensitive drum 103. As shown in parts (b1) and (b2) of FIG. 5, on an upper side of the holding member 505, the lens mounting portions 701 where the lens array 506 is mounted are formed. The lens mounting portions 701 are formed over the front-rear direction along edges of the through hole 906 at positions opposing each other through the through hole 906 with respect to the left-right direction. Further, as shown in parts (b1) and (b2) of FIG. 5, the lens mounting portions 701 include the first inner wall surface 507, the second inner wall surface 508, a first inclined surface 703 and a second inclined surface 704. The first inner wall surface 507 and the second inner wall surface 508 are disposed at opposing positions with respect to the left-right direction. On the other upper side of the first inner wall surface 507 and the second inner wall surface 508, the first inclined surface 703 and the second inclined surface 704 incline outwardly with respect to the left-right direction toward the upper side. As shown in parts (e1) and (c2) of FIG. 5, the lens array 506 is inserted from the upper side into the through hole 906 so that a right side (one side)-side wall surface (first side wall surface) is in an opposing position to the first inner wall surface 507 and so that a left side (the other side)-side wall surface (second side wall surface) is in an opposing position to the second inner wall surface 508. That is, both side wall surfaces of the lens array 506 with respect to the left-right direction (short side direction) oppose the first inner wall surface 507 and the second inner wall surface 508, respectively. The lens array 506 inserted into the through hole 906 is adhesively fixed in a state in which a part thereof projects upwardly from the lens mounting portions 701. Bonding between the lens array 506 and the lens mounting portions 701 of the holding member 505 is carried out by applying the adhesive 907 onto the first inclined surface 703 and the second inclined surface 704 in a state in which the lens array 506 is inserted into the through hole 906. Thus, the surfaces onto which the adhesive 907 is applied are inclined so as to approach the side wall surfaces of the lens array 506 toward the lower side, so that the applied adhesive 907 flows toward the lens array 506 along the first inclined surface 703 (the second inclined surface 704) by a self-weight thereof. Therefore, the lens array 506 and the lens mounting portions 701 of the holding member 505 are easily bonded to each other.

Here, in this embodiment, the first inner wall surface 507 (second inner wall surface 508) and the first inclined surface 703 (second inclined surface 704) are described as a continuous surface, but as shown in part (d) of FIG. 5, between the first inner wall surface 507 (second inner wall surface 508) and the first inclined surface 703 (second inclined surface 704), another surface may also be provided.

Part (d) of FIG. 5 is a view for illustrating a structure in which the lens mounting portions 701 of the holding member 505 are provided with a first bottom portion 715 between the first inclined surface 703 and the first inner wall surface 507 and a second bottom portion 716 between the second inclined surface 704 and the second inner wall surface 508. The first bottom portion 715 is a surface substantially perpendicular to the optical axis direction of the lenses, and is formed from an upper end of the first inner wall surface 507 to a lower end of the first inclined surface 703. Further, the second bottom portion 716 is also a surface perpendicular to the optical axis direction of the lenses, and is formed from an upper end of the second inner wall surface 508 to a lower end of the second inclined surface 704. In the state in which the lens array 506 is inserted into the through hole 906, the adhesive 907 is applied onto the first bottom portion 715 and the second bottom portion 716, so that the lens array 506 and the lens mounting portions 701 of the holding member 505 are adhesively fixed. Thus, by providing the first bottom portion 715 and the second bottom portion 716, compared with the case where these portions are not provided, a space in which the adhesive 907 is flowed becomes broad, and therefore, the adhesive 907 can be easily flowed into the space.

Then, the mounting method between the substrate 502 and the holding member 505 will be described using parts (a) and (b2) of FIG. 5. As shown in part (a) of FIG. 5, on a lower side of the holding member 505, an opening 908 for permitting insertion of the substrate 502 is formed. Inside the opening 908, substrate contact portions 911 where a part of the substrate 502 contacts when the substrate 502 is inserted into the opening 908 from the lower side of the holding member 505 are formed. As shown in part (b2) of FIG. 5, the substrate contact portions 911 are formed on substrate mounting portions 702 formed on the left side and the right side of the holding member 505, respectively. A width between the substrate contact portions 911 at these two portions (sides) is narrower than a width of the substrate 502 with respect to the left-right direction. Therefore, when the substrate 502 is inserted into the opening 908 from the lower side of the holding member 505, end portions of the substrate 502 on both sides with respect to the left-right direction contact the substrate contact portions 911, so that a mounting position of the substrate 502 relative to the holding member 502 is determined.

In a state in which the substrate 502 of which mounting position is determined contacts the substrate contact portions 911, the adhesive 907 is applied onto boundary portions between the substrate 502 and the substrate mounting portions 702. By this, the substrate 502 and the substrate mounting portions 702 are adhesively fixed to each other.

Next, using parts (a) to (c) of FIG. 6, an adjusting method of the mounting position of the lens array 506 relative to the lens mounting portions 701 when the lens array 506 is mounted between the lens mounting portions 701 of the holding member 505 will be described.

Parts (a) to (c) of FIG. 6 are schematic views of the holding member 505 in a state in which the lens array 506 is inserted in the through hole 906, as seen from the right side of the holding member 505.

Part (a) of FIG. 6 is a schematic view of the holding member 505 in this embodiment. From part (a) of FIG. 5, a distance from a front side-end portion to a rear side-end portion of the lens mounting portion 701 is shorter than a distance from a front side-end portion to a rear side-end portion of the lens array 506. For that reason, the lens array 506 inserted in the through hole 906 of the holding member 505 is exposed from the lens mounting portions 701 on the front side and the rear side (exposed portions 912). Further, as shown in part (a) of FIG. 6, the front side and the rear side of the lens mounting portions 701 have an inclined structure such that the lens mounting portions 701 are inclined downwardly toward the end portions. The inclined structure will be described later specifically.

The reason why the exposed portions 912 are provided is that when the lens array 506 is moved for performing positional adjustment of the lens array 506 relative to the holding member 505, a region in which the lens array 506 is reliably held is ensured. A distance from a light emitting point of the LEDs 503 provided on the substrate 502 to the incident surface in which the light of the LEDs 503 of the lens array 506 enters is determined at the time of completion of manufacturing of the lenses, and it is difficult to say that as regards a value thereof, all the lenses provide the same value when a manufacturing error or the like is taken into consideration. Accordingly, during assembling of the optical print head 105, there is a need to adjust the mounting position of the lens array 506 so that the distance from the light emitting point of the LEDs 503 to the incident surface in which the light of the LEDs 503 of the lens array 506 enters is an appropriate distance. Therefore, for example, in a state in which the exposed portions 912 of the lens array 506 are held by a holding mechanism of an assembling device or the like, the lens array 506 is inserted into the through hole 906, and the mounting position of the lens array 506 relative to the holding member 505 is adjusted. As an example of the holding mechanism, a constitution such that both side wall surfaces of the lens array 506 are nipped by being urged from the left-right direction or a constitution in which both side wall surfaces of the lens array 506 are attracted from the left-right direction exist. In the case where the lens array 506 is held by attraction, of both side wall surfaces of the lens array 506, only one side wall surface may also be held by attraction. That is, both side wall surfaces of the lens array 506 are not necessarily required to be exposed. For example, a constitution such that the side wall surface of the lens array 506 on one side is exposed from the first inner wall surface 507 but the side wall surface of the lens array 506 on the other side is not exposed from the second inner wall surface 508 may also be employed. Further, a constitution in which the side wall surface of the lens array 506 on one side is exposed from only the front side-end portion, of the front side-end portion and the rear side-end portion, of the first inner wall surface 507, and the side wall surface of the lens array 506 on the other side is exposed from only the rear side-end portion, of the front side-end portion and the rear side-end portion, of the second inner wall surface 508 may also be employed.

In the following, a manufacturing method of the optical print head 105 will be specifically described. First, the exposed portions 912 of the lens array 506 are nipped from the left-right direction by the holding mechanism (holding step). The nipped lens array 506 is inserted into the through hole 906 of the holding member 505 from the upper side (arrangement step). At this time, the exposed portions 912 are exposed from both the front and rear ends of the lens mounting portions 701, and therefore, the holding mechanism and the holding member 505 do not contact each other. Then, in the state in which the lens array 506 is inserted in the through hole 906, the LEDs 503 provided on the substrate 502 disposed at the position contacting the substrate contact portions 911 emit light. The light emitted from the lens array 506 is received by a light receiving device or the like (light receiving step), and on the basis of a light receiving result, an interval (gap) between the lens array 506 and the substrate 502 is adjusted while moving the lens array 506 in the up-down direction, i.e., the mounting position of the lens array 506 relative to the holding member 505 is adjusted (adjusting step). After an end of the adjustment, the lens array 506 and the holding member 505 are adhesively fixed to each other with the adhesive 907.

Incidentally, the exposed portions 912 are not limited to the portions shown in part (a) of FIG. 6, but may also be portions indicated by dotted lines in part (b) of FIG. 6.

In part (b) of FIG. 6, both the front and rear end sides of the lens mounting portions 701 are in a stepped portion shape, and upper surfaces of the lens mounting portions 701 are more spaced from the photosensitive drum 103 at positions closer to the end portions. By this, a part of the lens array 506 is exposed on each of both the front and rear end sides of the lens mounting portions 701 (exposed portions 922). The exposed portions 922 are gripped from the left-right direction by a holding mechanism, and the mounting position of the lens array 506 relative to the holding member is finely adjusted. Thereafter, the lens array 506 and the holding member 505 are adhesively fixed to each other with the adhesive 907.

Further, part (c) of FIG. 6 is constitution in which recessed portions are formed along the left-right direction on the upper surface of the lens mounting portions 701. By this, as shown in part (c) of FIG. 6, side wall surfaces of the lens array 506 on both the left and right sides are exposed from the recessed portions (exposed portions 932). The exposed portions 932 are held from the left-right direction by the holding mechanism, so that the mounting position of the lens array 506 relative to the holding member 505 is finely adjusted. Thereafter, the lens array 506 and the holding member 505 are adhesively fixed to each other by the adhesive 907. Here, the recessed portions are not necessarily formed on both the first inner wall surface 507 and the second inner wall surface 508. For example, a plurality of recessed portions may also be formed on only the first inner wall surface 507. The side wall surface of the lens array 506 exposed from the recessed portions is held by the holding mechanism through attraction.

Next, an application method of the adhesive 907 when the lens array 506 is mounted between the lens mounting portions 701 will be described using FIG. 7.

Figure 7:
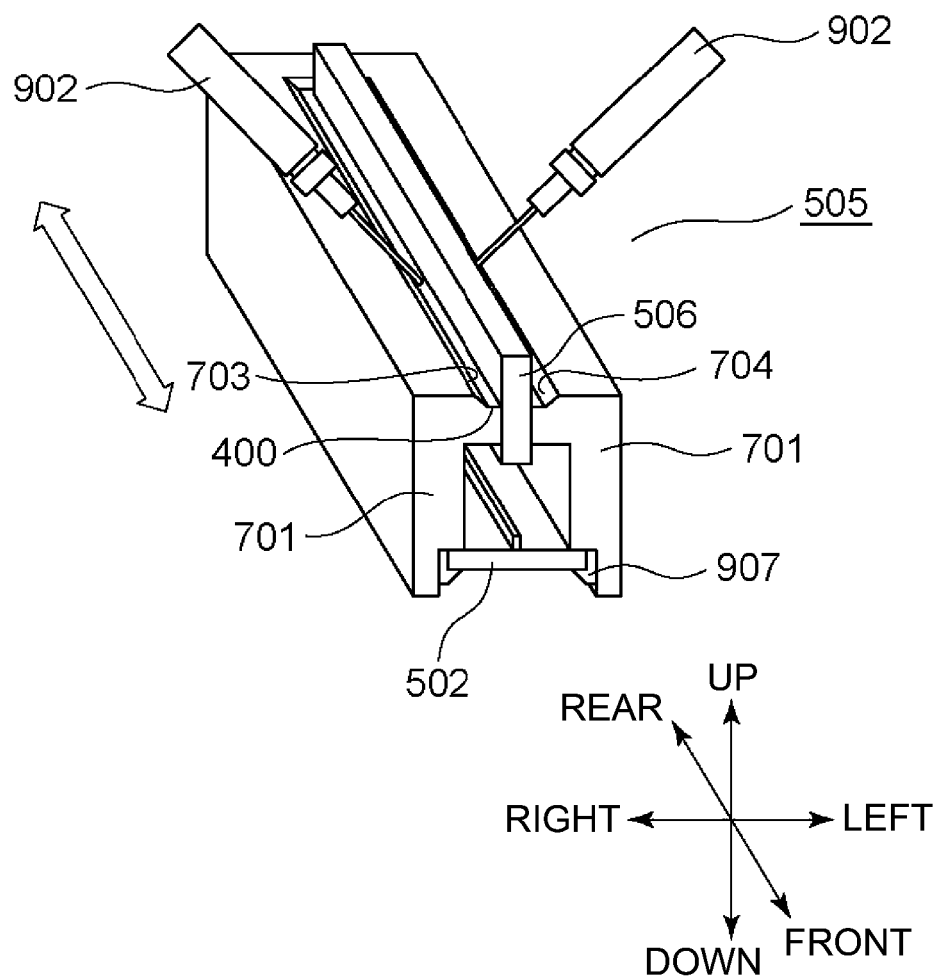
FIG. 7 is a schematic view for illustrating an application method of an adhesive onto the holding member.

FIG. 7 is an example of a state in which the lens array 506 is inserted into the through hole 906 of the holding member 505. As shown in FIG. 7, when the lens array 506 is adhesively fixed between the lens mounting portions 701, tips of a dispenser 902 for ejecting (discharging) the adhesive 907 are pointed between the lens array 506 and the first inclined surface 703 and between the lens array 506 and the second inclined surface 704. Incidentally, as in the example of the holding member 505 shown in FIG. 7, in the case of the holding member 505 including the first bottom portion 715 and the second bottom portion 716, the tips of the dispensers 902 may also be pointed at the first bottom portion 715 and the second bottom portion 716. In this state, the dispensers 902 move along the longitudinal direction (arrow direction in the figure) of the lens array 506 while ejecting the adhesive. By this, the adhesive 907 is caused to flow between the side wall surface of the lens array 506 and the first inclined surface 703 and between the side wall surface of the lens array 506 and the second inclined surface 704. Incidentally, movement of the dispensers 902 may be automatically performed by the assembling device or may also be manually performed by an assembling operator.

In a state in which the lens array 506 is inserted between the first inner wall surface 507 and the second inner wall surface 508, a gap of about 0.2 mm can be formed between the first inner wall surface 507 and the side wall surface (first side wall surface) of the lens array 506, and a gap of about 0.2 mm can also be formed between the second inner wall surface 508 and the side wall surface (second side wall surface) of the lens array 506. That is, the holding member 505 is designed so that a difference between a width of an interval, between the first inner wall surface 507 and the second inner wall surface 508, and a thickness of the lens array 506 is about 0.4 mm. In other words, the first inner wall surface 507 and the side wall surface (first side wall surface) oppose each other with the gap of 0.2 mm. Further, the second inner wall surface 508 and the side wall surface (second side wall surface) of the lens array 506 oppose each other with the gap of 0.2 mm. As described above, the first inner wall surface 507 and the side wall surface (first side wall surface) of the lens array 506, and the second inner wall surface 508 and the side wall surface (second side wall surface) of the lens array 506 are close to and oppose each other, respectively. By this, the adhesive ejected between the lens array 506 and the first inclined surface 703 and between the lens array 506 and the second inclined surface 704 does not drop downwardly in the vertical direction from between the first inner wall surface 507 and the side wall surface (first side wall surface) of the lens array 506 and between the second inner wall surface 508 and the side wall surface (second side wall surface) of the lens array 506.

Part (a) of FIG. 8 is an enlarged view of the front side of the lens mounting portions 701 of the holding member 505 in this embodiment. As described above, the front side of the lens mounting portions 701 is inclined downwardly toward the end portion (inclined portion 904). Although not shown in part (a) of FIG. 8, the rear side of the lens mounting portions 701 also has the same structure. By providing the inclined portions 904, the adhesive 907 flows along inclination of the inclined portions 904 by a self-weight thereof. By this, on the front side and the rear side of the lens mounting portions 701, an effect of preventing application (coating) failure of the adhesive 907 can be expected.

Further, as shown in part (b) of FIG. 8, of the upper surface of the holding member 505, at a portion overlapping with the exposed portion 912 of the lens array 506, a groove portion 903 is formed. The groove portion 903 is formed and extended in a direction crossing the front-rear direction of the holding member 505. The groove portion 903 is provided immediately below the inclined portion 904, so that the adhesive 907 flowed and dropped along the inclination is accumulated in the groove 903. By this, the adhesive 907 can be prevented from flowing and dropping from the holding member 505 toward a periphery thereof.

Figure 9:
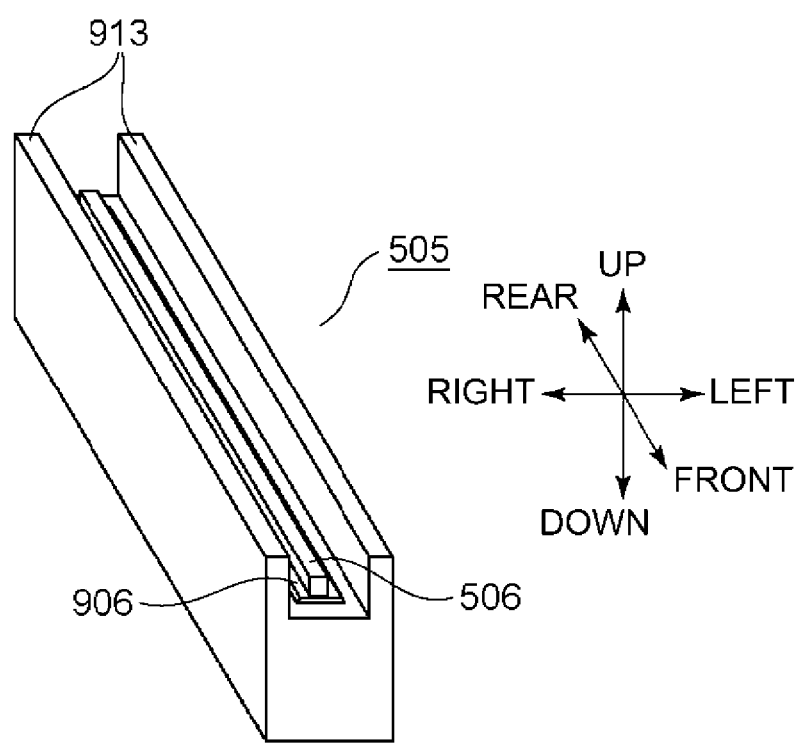
FIG. 9 is a view for illustrating projections for retaining the adhesive of the holding member.

Further, as a constitution in which the adhesive 907 is retained on the holding member 505, a constitution shown in FIG. 9 can also be considered. As shown in FIG. 9, on the upper side surface of the holding member 505, on the right side and the left side of the through hole 906, projections 913 projecting upwardly are formed. The adhesive 907 overflowing between the lens array 506 and the first inclined surface 703 (second inclined surface 704) stays between the lens array 506 and the projections 913. In order to cause the adhesive 907 overflowing between the lens array 506 and the first inclined surface 703 (second inclined surface 704) to stay on the holding member 505 with reliability, it is desirable that upper ends of the projections 913 are in positions closer to the photosensitive drum 103 than the light emitting surface of the lens array 506 is.

Figure 10:
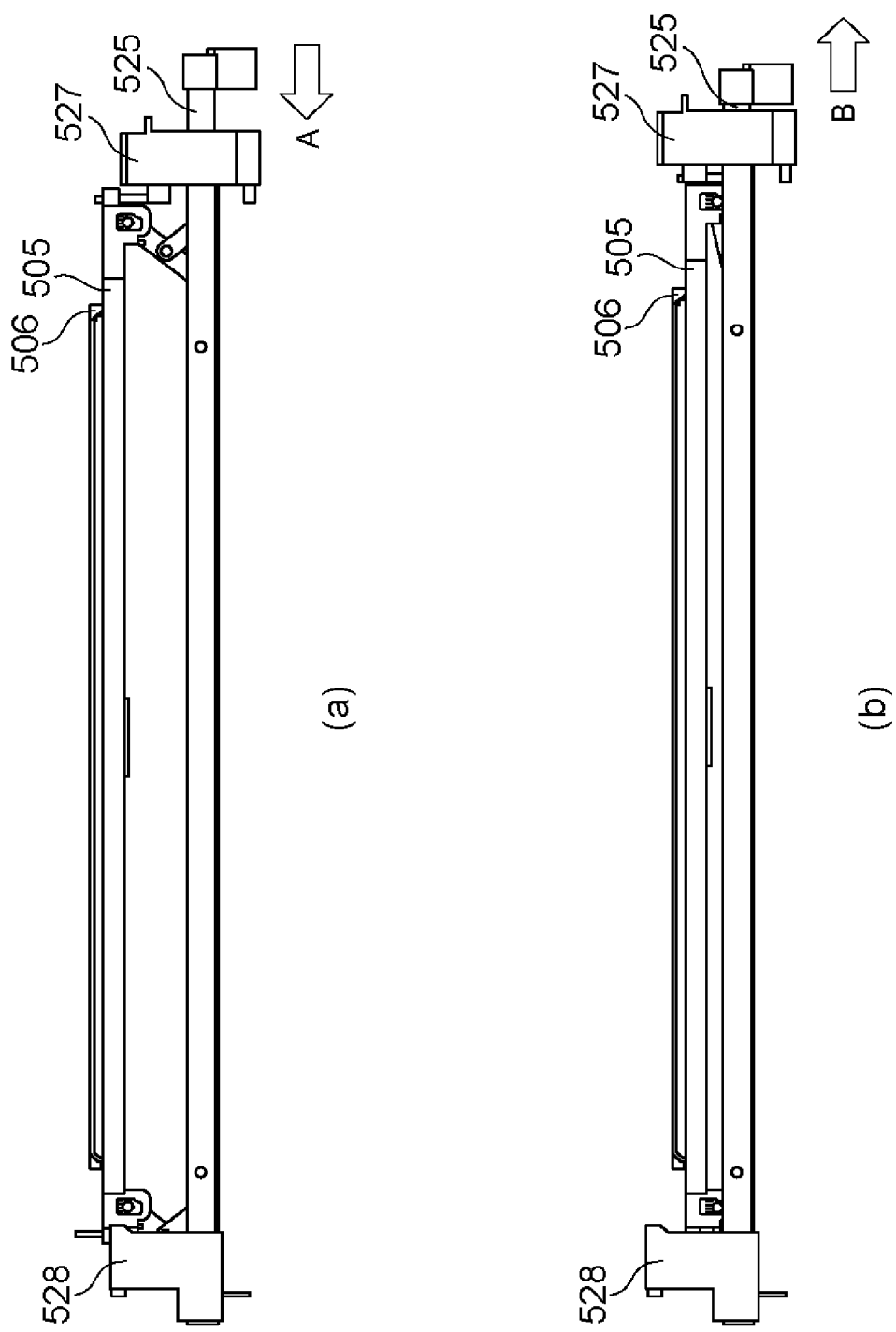
FIG. 10 includes side views of the optical print head.

From here, necessity of movement of the optical print head 105 will be described. The image forming apparatus 1 of this embodiment slides (moves) the drum unit 518 in the rotational axis direction of the photosensitive drum 103 toward the front side of the apparatus main assembly when the drum unit 518 is exchanged, as described with reference to FIG. 2. When the drum unit 518 is moved in a state in which the optical print head 105 is positioned in the neighborhood of the surface of the photosensitive drum 103, the optical print head 105 contacts the sliding (moving) photosensitive drum 103, so that the surface of the photosensitive drum 103 to be mounted is damaged. Further, the lens array 506 contacts the frame of the drum unit 518, so that the lens array 506 is damaged. For that reason, a structure is provided in which the optical print head 105 is reciprocated between an exposure position (part (a) of FIG. 10) where the photosensitive drum 103 is exposed to light and a retracted position (part (b) of FIG. 10) where the photosensitive drum 103 is further retracted from the exchange unit than the end portion position is. When the slidable portion 525 slides (moves) in an arrow A direction in a state in which the optical print head 105 is in the exposure position (part 8*a*) of FIG. 10), the optical print head 105 moves in a direction toward the retracted position (part (b) of FIG. 10). On the other hand, when the slidable portion 525 slides (moves) in an arrow B direction in a state in which the optical print head 105 is in the retracted position (part (b) of FIG. 10), the optical print head 105 moves in a direction toward the exposure position (part (a) of FIG. 10). Details will be described later.

Part (a1) of FIG. 11 is a perspective view showing the rear side of the optical print head 105 positioned at the exposure position and a bush 671 provided on the rear side of the drum unit 518. Part (a2) of FIG. 11 is a sectional view showing the second supporting portion 528 and the bush 671 provided on the rear side of the drum unit 518 when the optical print head 105 is positioned at the end portion position. Part (b1) of FIG. 11 is a perspective view showing the rear side of the optical print head 105 positioned at the retracted position and a bush 671 provided on the rear side of the drum unit 518. Part (b2) of FIG. 11 is a sectional view showing the second supporting portion 528 and the bush 671 provided on the rear side of the drum unit 518 when the optical print head 105 is positioned at the retracted position.

Using FIG. 11, a state in which the contact pin 515 provided on the rear side of the optical print head 105 contacts the bush 671 provided on the drum unit 518 side will be described. Also, on the front side of the drum unit 518, a component part corresponding to the bush 671 to which the contact pin is contacted is provided, and a structure thereof is similar to a structure of the bush 671, and a function thereof is also substantially identical to a function of the bush 671. Here, only a state in which the contact pin 515 contacts the bush 671 provided on the drum unit 518 side will be described.

From part (a1) of FIG. 11 and part (b1) of FIG. 11, a portion where the link member 652 is mounted on the holding member 505 is further on the photosensitive drum 103 side than an end portion, of both ends (end portions) of the contact pin 515 with respect to the up-down direction (direction in which the optical print head 105 moves between the exposure position and the retracted position: reciprocal movement direction), on a side opposite from the exchange unit side (side where the exchange unit 518 is disposed) is. The spring mounting portion 662 where the link member 652 is mounted is disposed so as not to cross the contact pin 515 with respect to the up-down direction. Further, although not shown in the figure here, also a portion where the link member 651 is mounted on the holding member 505 is further on the photosensitive drum 103 side than an end portion, of both ends (end portions) of the contact pin 514 with respect to the up-down direction (direction in which the optical print head 105 moves between the exposure position and the retracted position: reciprocal movement direction), on a side opposite from the exchange unit side (side where the exchange unit 518 is disposed) is. The spring mounting portion 661 where the link member 651 is mounted is disposed so as not to cross the contact pin 514 with respect to the up-down direction.

By this, upsizing of the exposure unit 500 with respect to the up-down direction is suppressed.

As shown in part (a2) of FIG. 11 and part (b2) of FIG. 11, the second supporting portion 528 includes a second bearing surface 587, a regulating portion 128, a first wall surface 588 and a second wall surface 589. The second bearing surface 587 is provided on the lower side of the holding member 505. The lower side of the holding member 505 moving from the exposure position toward the retracted position contacts the second bearing surface 587 and a first bearing surface 586 of a first supporting portion 527 described later from the upper side with respect to the vertical direction, so that the optical print head 105 is in the retracted position. The regulating portion 128 is a U-shaped recessed portion which is formed in the second supporting portion 528 and which opens toward the front side and is disposed on a side opposite from a side where the drum unit 518 is positioned relative to the holding member 505, and is engaged in the second supporting portion 528 from the rear side of the contact pin 515 so that the contact pin 515 is movable in the up-down direction. The contact pin 515 projecting from the lower side of the holding member 505 moves up and down together with the holding member 505 while moving in a gap formed by the regulating portion 128. Although not shown in the figure here, the first supporting portion 527 also includes a regulating portion 127. The regulating portion 127 is a U-shaped recessed portion which is formed in the first supporting portion 527 and which opens toward the front side and is disposed on a side opposite from a side where the drum unit 518 is positioned relative to the holding member 505, and is engaged in the second supporting portion 528 from the front side of the contact pin 514 so that the contact pin 514 is movable in the up-down direction. The contact pin 514 projecting from the lower side of the holding member 505 moves up and down together with the holding member 505 while moving in a gap formed by the regulating portion 127. The regulating portion 127 has a tapered shape in order to reduce a frictional force, to the extent possible, generated by contact with the contact pin 514. By this, the contact pin 514 can smoothly move up and down in a gap of the regulating portion 127. Accordingly, the holding member 505 integral with the contact pin 515 and the contact pin 514 is regulated (restricted) in movement in the direction crossing both the front-rear direction (rotational axis direction of the photosensitive drum 103) and the up-down direction (direction in which the optical print head 105 moves between the exposure position and the retracted position: reciprocal movement direction). Further, the regulating portion 127 may also regulated regulate movement of the contact pin 514 from the rear side toward the front side, and the regulating portion 128 may also regulate (restrict) movement of the contact pin 515 from the rear side toward the front side.

The first wall surface 588 and the second wall surface 589 are disposed at opposing positions with respect to the left-right direction and form a gap. When the optical print head 105 reciprocates between the exposure position and the retracted position, the holding member 505 moves in the up-down direction in the gap formed by the first wall surface 588 and the second wall surface 589. During the movement, the holding member 505 is regulated (restricted) in movement in a direction crossing both the front-rear direction (rotational axis direction of the photosensitive drum 103) and the up-down direction (direction in which the optical print head 105 moves from the exposure position and the retracted position: reciprocal movement direction) by the first wall surface 588 and the second wall surface 589.

By the above-described constitution, the optical print head 105 moves between the exposure position and the retracted position in a state in which the movement thereof in the direction crossing both the front-rear direction (rotational axis direction of the photosensitive drum 103) and the up-down direction (direction in which the optical print head 105 moves between the exposure position and the retracted position: reciprocal movement direction). Incidentally, at least one of the regulating portion 127 and the regulating portion 128 may be provided in the first supporting portion 527 or the second supporting portion 528. That is, it is sufficient if the regulating portion 127 is provided in the first supporting portion 527 as an example of the supporting portion or the regulating portion 128 is provided in the second supporting portion 528.

As shown in part (a1) of FIG. 11 and part (a2) of FIG. 11, positions where the opposing portion 515 contacts the bush 671 provided on the rear side of the drum unit 518 and where the contact pin 514 (not shown) contacts the component parts, corresponding to the bush 671, provided on the front side of the drum unit 518 are the exposure position of the optical print head 105. By contact of the contact pin 514 and the contact pin 515 with the bush 671 and the component part corresponding to the bush 671, respectively, a distance between the lens array 506 and the photosensitive drum 103 is a design nominal.

On the other hand, as shown in part (b1) of FIG. 11 and part (b2) of FIG. 11, a position where the contact pin 515 is retracted from the bush 671 provided on the rear side of the drum unit 518 corresponds to the retracted position of the optical print head 105. By positioning of the optical print head 105 in the retracted position shown in part (b1) of FIG. 11 and part (b2) of FIG. 11, the drum unit 518 can slide (move) for exchange and the optical print head 105 can be in a non-contact state.

Figure 12:
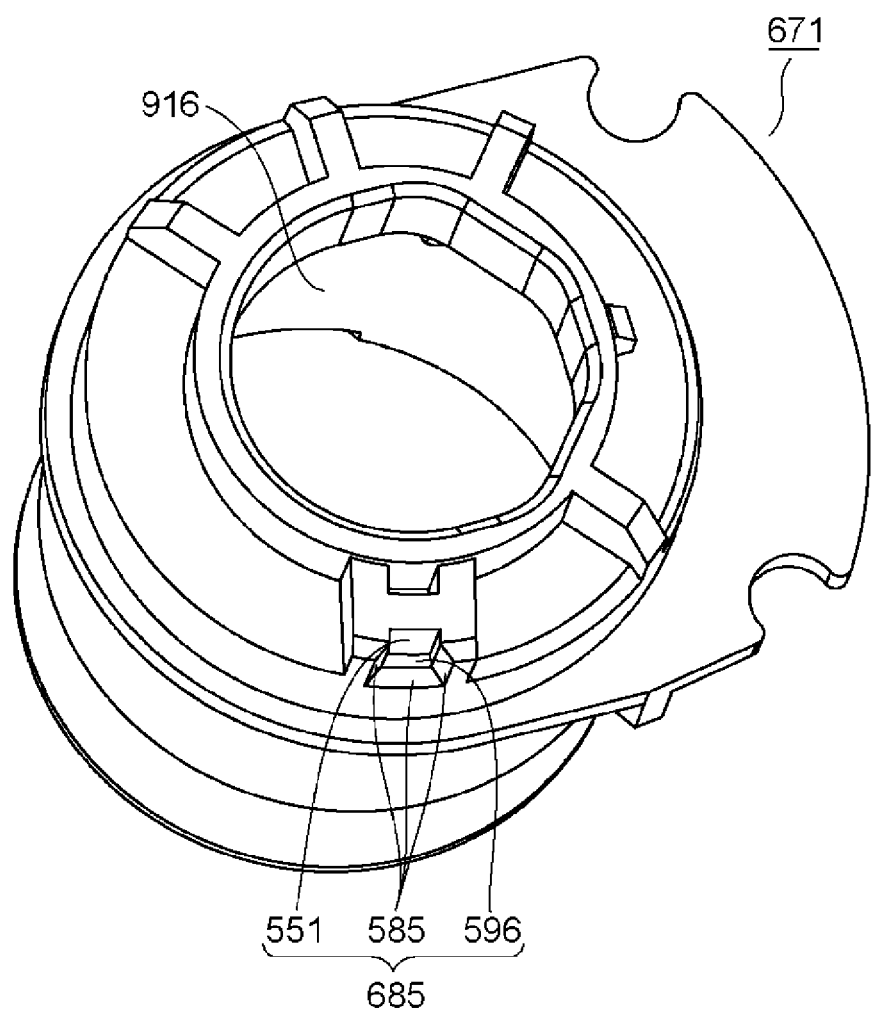
FIG. 12 is a perspective view of a bush mounted to the drum unit on a rear side.

Here, the bush 671 provided to the drum unit 518 will be described. In FIG. 12, a perspective view of the bush 671 is shown. The bush 671 is a member fixed to a casing of the drum unit 518 with a screw or an adhesive. As shown in FIG. 12, the bush 671 is provided with an opening 916. Into the opening 916, a shaft member of the photosensitive drum 103 on the other end side is rotatably inserted. That is, the bush 671 rotatably shaft-supports the photosensitive drum 103.

In the photosensitive drum 103, a photosensitive layer is formed on an outer wall surface of a hollow cylindrical aluminum tube. At both ends of the aluminum tube, flanges 673 are press-fitted. In the opening 916 formed in the bush 671, the flange 673 on the other end side of the photosensitive drum 103 is rotatably inserted. The flange 673 rotates while sliding with an inner wall surface of the opening 916. That is, the bush 671 rotatably shaft-supports the photosensitive drum 103. Further, also at a central portion, of the component part, corresponding to the bush 671 to which the contact pin 514 is contacted and which is provided on the front side of the drum unit 518, an opening is formed similarly as in the bush 671. In the opening formed in the component part corresponding to the bush 671, the flange 673 on one end side (front side) of the photosensitive drum 103 is rotatably inserted. The flange 673 rotates while sliding with an inner wall surface of the opening. That is, similarly as the rear side of the drum unit 518, also on the front side, the bush 671 rotatably shaft-supports the photosensitive drum 103.

The bush 671 includes an engaging portion 685 in which the contact pin 515 is engaged. The engaging portion 685 includes a contact surface 551, a rear side wall surface 596 and a tapered portion 585. The engaging portion 685 may be recessed relative to the bush 671 or may stand relative to the bush 671. To the contact surface 551, the contact pin 515 moving in the direction from the retracted position toward the end portion position is contacted. At a lower end edge of the engaging portion 685, the tapered portion 585 having a tapered shape is formed. The tapered portion 585 guides movement of the contact pin 515 moving in the direction from the retracted position toward the exposure position so that the contact pin 515 contacts the contact surface 551. Contact between the rear side wall surface 596 and the contact pin 515 will be described later.

The contact pin 515 contacted to the contact surface 551 of the engaging portion 685 is restricted by the engaging portion 685 in movement in the direction crossing both the front-rear direction (rotational axis direction of the photosensitive drum 103) and the up-down direction (direction in which the optical print head 105 moves between the exposure position and the retracted position: reciprocal movement direction). That is, in the optical print head 105 positioned at the exposure position (see part (a2) of FIG. 11), an upper end of the contact pin 515 is restricted in movement in the direction crossing both the front-rear direction and the up-down direction by the engaging portion 685, and a lower end of the contact pin 515 is restricted in movement in the direction crossing both the front-rear direction and the up-down direction by the regulating (restricting) portion 128. Here, a difference between a diameter of the engaging portion 685 with respect to the left-right direction and a diameter of the upper end of the contact pin 515 with respect to the left-right direction and a difference between a diameter of the regulating portion 128 with respect to the left-right direction and the lower end of the contact pin 515 with respect to the left-right direction are smaller than the difference between the gap between the first side wall surface 588 and the second side wall surface 589 with respect to the left-right direction and the holding member 505 positioned between the first side wall surface 588 and the second side wall surface 589. Accordingly, when the optical print head 105 is in the exposure position, the first wall surface 588 and the second wall surface 589 do not relate to restriction of movement of the optical print head 105 in the direction crossing both the front-rear direction and the up-down direction of the holding member 505.

(Moving Mechanism)

In the following, the moving mechanism 640 for moving the optical print head 105 will be described.

Figure 13:
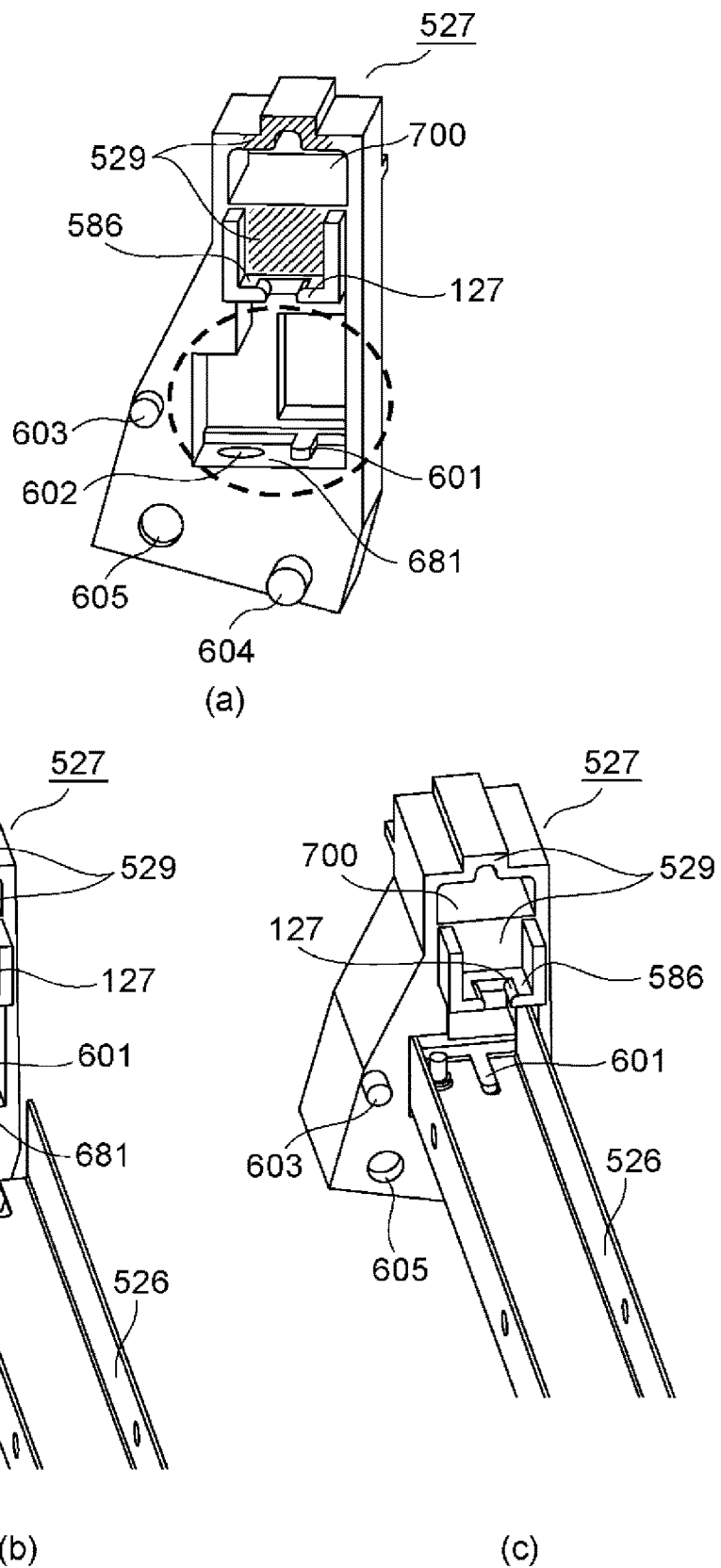
FIG. 13 includes perspective views of a first supporting portion and a third supporting portion.

First, the first supporting portion 527 will be described. Part (a) of FIG. 13 is a schematic perspective view of the first supporting portion 527. At the first supporting portion 527, the first bearing surface 586 as an example of an abutting portion (stopping mechanism), an opening 700 as an example of an inserting portion, a contact portion 529, the regulating portion 127, a projection 601, a screw hole 602, a positioning boss 603, a positioning boss 604 and a screw hole 605 are formed. Here, the first supporting portion 527 may also be molded product prepared by integrally subjecting the opening 700 and the first bearing surface 586 to injection molding or may also be separate members of these portions.

The first bearing surface 586 is a portion to which the lower side of the holding member 505 moving from the exposure position toward the retracted position is contacted from the upper side with respect to the vertical direction, and is fixed to the image forming apparatus 1 main assembly. The lower side of the holding member 505 contacts the first bearing surface 586, so that the optical print head 105 is in the retracted position.

Into the opening 700, a cleaning member 572 for cleaning the light emitting surface of the lens array 506 contaminated with the toner or the like is inserted from an outside of the image forming apparatus 1 main assembly. The cleaning member 572 is an elongated rod-like member. In this embodiment, as an example of the opening 700, a through hole through which the cleaning member 572 penetrates in the front-rear direction is shown, but the opening 700 is not limited to the through hole, but for example, a slit may also be formed at an upper portion. The contact portion 529 is a rear side surface of the first supporting portion 527 shown by a hatched line in part (b) of FIG. 13 and includes upper side and lower side regards the opening 700. As regards a function of the contact portion 529, details will be described later.

As shown in part (a) of FIG. 13, the regulating portion 127 is a U-shaped recessed portion which is formed in the regulating portion 527 and which opens toward the rear side. A part of the contact pin 514 projecting from the lower side of the holding member 505 moves up and down together with the holding member 505 in a gap formed by the regulating portion 127. The regulating portion 127 has a tapered shape for reducing a frictional force, to the extent possible, generated by contact with the contact pin 514, and a thickness with respect to the up-down direction becomes thin toward the contact pin 514. By this, the contact pin 514 can smoothly move up and down in the gap of the regulating portion 127.

The first supporting portion 527 is fixed to the front side surface of the front side plate 642. The front side plate 642 is provided with a positioning boss 603, a positioning boss 604 and a plurality of holes corresponding to fixing screws, respectively (not shown). The positioning boss 603 and the positioning boss 604 are inserted in a plurality of holes provided, and in that state, the first supporting portion 527 is fixed to the front side plate 642 by screws passed through the screw holes of the first supporting portion 527.

The third supporting portion 526 described later is a metal plate bent in a U-shape. Part (b) of FIG. 13 shows a view for illustrating a state in which one end portion of the third supporting portion 526 with respect to the longitudinal direction is to be inserted into a portion enclosed by a dotted line shown in part (a) of FIG. 13, and part (c) of FIG. 13 is a view in which the one end portion of the third supporting portion 526 with respect to the longitudinal direction is to be inserted into the portion enclosed by the dotted line shown in part (a) of FIG. 13. As shown in parts (b) and (c) of FIG. 13, the one end portion of the third supporting portion 526 is provided with a cut-away portion, and the projection 601 on the first supporting portion 527 side engages with the cut-away portion of the third supporting portion 526. By engagement of the projection 601 with the cut-away portion of the third supporting portion 526, a position of the third supporting portion 526 with respect to the left-right direction is determined relative to the first supporting portion 527. The third supporting portion 526 is pressed from a lower side of part (c) of FIG. 3 by a screw inserted through the screw hole 602 and is fixed to the first supporting portion 527 by contact thereof with a contact surface 681 of the first supporting portion 527.

Figure 14:
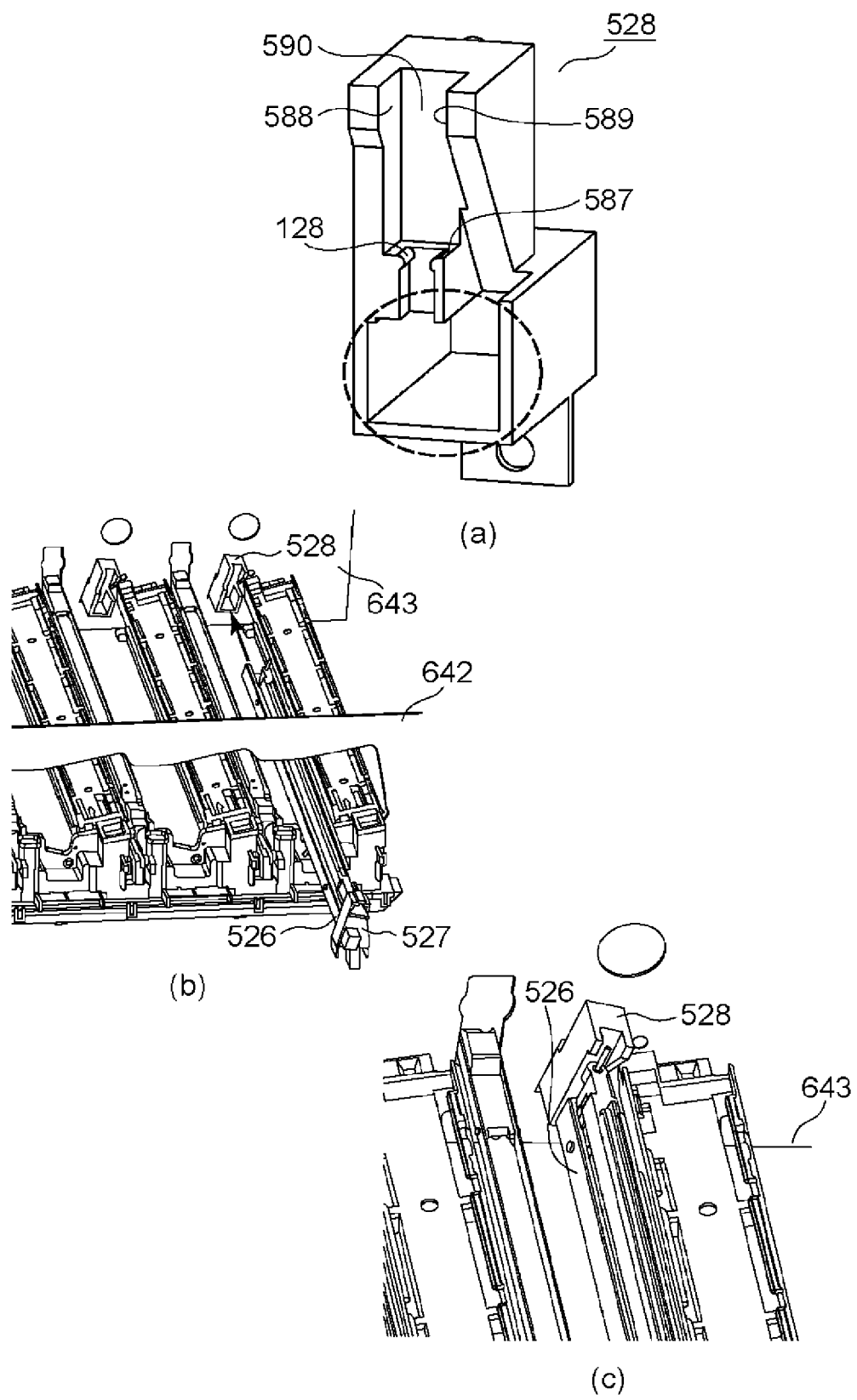
FIG. 14 includes perspective views of a second supporting portion, a rear side plate, and an exposure unit mounted to the second supporting portion.

Next, the second supporting portion 528 will be described. Part (a) of FIG. 14 is a schematic perspective view of the second supporting portion 528. At the second supporting portion 528, a second bearing surface 587, a first wall surface 588, a second wall surface 589 and the regulating portion 128 are formed.

The second bearing surface 587 is, as described above, a portion to which the lower side of the holding member 505 moving from the exposure position toward the retracted position contacts. The second bearing surface 587 is fixed to the image forming apparatus 1 main assembly. The lower side of the holding member 505 contacts the second bearing surface 587, so that the optical print head 105 is in the retracted position.

As shown in part (b) of FIG. 14, the second supporting portion 528 is fixed to the front side surface of the rear side plate 643. The second supporting portion 528 is fixed to the rear side plate 643 by positioning bosses and screws similarly as the method in which the first supporting portion 527 is fixed to the front side plate 642. Part (c) of FIG. 14 shows a state in which the other end side (rear side) of the third supporting portion 526 with respect to the longitudinal direction of the third supporting portion 526 is inserted in a portion enclosed by a dotted line shown in part (a) of FIG. 14. That is, the third supporting portion 526 is supported by the first supporting portion 527 at one end portion and is supported by the second supporting portion 528 at the other end portion, and the first supporting portion 527 and the second supporting portion 528 are fixed to the front side plate 642 and the rear side plate 643, respectively. For that reason, the third supporting portion 526 is fixed to the image forming apparatus 1 main assembly.

Incidentally, the second supporting portion 528 may also have a constitution in which the second supporting portion 526 is fixed to the third supporting portion 526 by the screws or the like and is not screwed with the rear side plate 643. In that case, for example, the second supporting portion 526 has a structure such that a recessed portion is formed and is engaged with a projection formed on the rear side plate 643, and a position of the second supporting portion 528 relative to the rear side plate 643 is determined. The first wall surface 588 and the second wall surface 589 of the second supporting portion 528 will be described later.

As shown in part (a) of FIG. 14, the regulating portion 128 is a U-shaped recessed portion which is formed in the regulating portion 528 and which opens toward the front side. A part of the contact pin 515 projecting from the lower side of the holding member 505 moves up and down together with the holding member 505 in a gap formed by the regulating portion 128. The regulating portion 128 has a tapered shape for reducing a frictional force, to the extent possible, generated by contact with the contact pin 515, and a thickness with respect to the up-down direction becomes thin toward the contact pin 515. By this, the contact pin 515 can smoothly move up and down in the gap of the regulating portion 128.

Next, the third supporting portion 526 and the slidable portion 525 will be described using FIG. 15. The third supporting portion 526 and the slidable portion 525 are disposed on a side opposite from the photosensitive drum 103 with respect to the holding member 505.

Part (a) of FIG. 6 is a schematic perspective view of the moving mechanism 640, in which the first supporting portion 527 is not shown, when a front side of the moving mechanism 640 is seen from a left side, and part (b) of FIG. 6 is a schematic perspective view of the moving mechanism 640, in which the first supporting portion 527 is not shown, when a rear side of the moving mechanism 640 is seen from a right side. The moving mechanism 640 includes the link member 651, the slidable portion 525 and the third supporting portion 526. The third supporting portion 526 includes a supporting shaft 531 and an E-shaped stopper ring 533. As shown in FIG. 15, the supporting shaft 531 is inserted through openings provided in surfaces (left side surface and right side surface) which are opposed with respect to the left-right direction of the third supporting portion 526 processed in a U-character shape. The supporting shaft 531 penetrates through the left side surface and the right side surface of the third supporting portion 526. As shown in FIG. 15, the supporting shaft 531 is retained by the E-shaped stopper ring 533 on an outside of the left side surface so as not to be disconnected through the opening of the third supporting portion 526.

On the other hand, as shown in part (a) of FIG. 15, the slidable portion 525 is provided with an elongated hole 691 extending in the front-rear direction. The supporting shaft 531 is inserted into the elongated hole 691 of the slidable portion 525 and is loosely engaged in the elongated hole 691 with a gap of, e.g., about 0.1-0.5 mm with respect to the up-down direction. For that reason, movement of the slidable portion 525 relative to the third supporting portion 526 in the up-down direction is restricted, and the slidable portion 525 is slidable (movable) relative to the third supporting portion 526 correspondingly to a length of the elongated hole 691 with respect to the front-rear direction.

Further, on one end side of the slidable portion 525, a slide assisting member 539 including an accommodating space 562 ranging from a left side to a lower side is mounted. The slide assisting member 539 is fixed to the slidable portion 525 from the left side through fastening with a screw. In the accommodating space 562, a pressing portion 561 provided in a cover 558 described later is accommodated. A relationship between the accommodating space 562 and the pressing portion 561 and structural features of these will be described together with description as to the cover 558 (described later).

In the following, the moving mechanism 640 will be described using FIG. 3, FIG. 15 and FIG. 16.

FIG. 3 is a schematic perspective view of the exposure unit 500 including the moving mechanism 640. As shown in FIG. 3, the moving mechanism 640 includes a first link mechanism 861, a second link mechanism 862, the slidable portion 525, the first supporting portion 527, the second supporting portion 528 and the third supporting portion 526. The first link mechanism 861 includes the link member 651 and the link member 653, and the second link mechanism 862 includes the link member 652 and the link member 654. As shown in FIG. 3, the link member 651 and the link member 653, and the link member 652 and the link member 654 constitute link mechanisms of a λ type, respectively.

Part (a) of FIG. 15 is a schematic perspective view of the front side of the moving mechanism 640, in which the first supporting portion 527 is not shown, as seen from a left side. Further, part (b) of FIG. 15 is a schematic perspective view of the front side of the moving mechanism 640, in which the first supporting portion 527 is not shown, as seen from a right side.

In the following, the first link mechanism 861 will be described using part (a) of FIG. 15, part (b) of FIG. 15, part (a) of FIG. 16 and part (b) of FIG. 16. Part (a) of FIG. 12 is a schematic view of a cross-sectional view of the first link mechanism 861 cut along the rotational axis direction as seen from the right side. The first link mechanism 861 includes the link member 651 and the link member 653. Each of the link member 651 and the link member 653 is a single link member, but may also be constituted by combining a plurality of link members.

Figure 16:
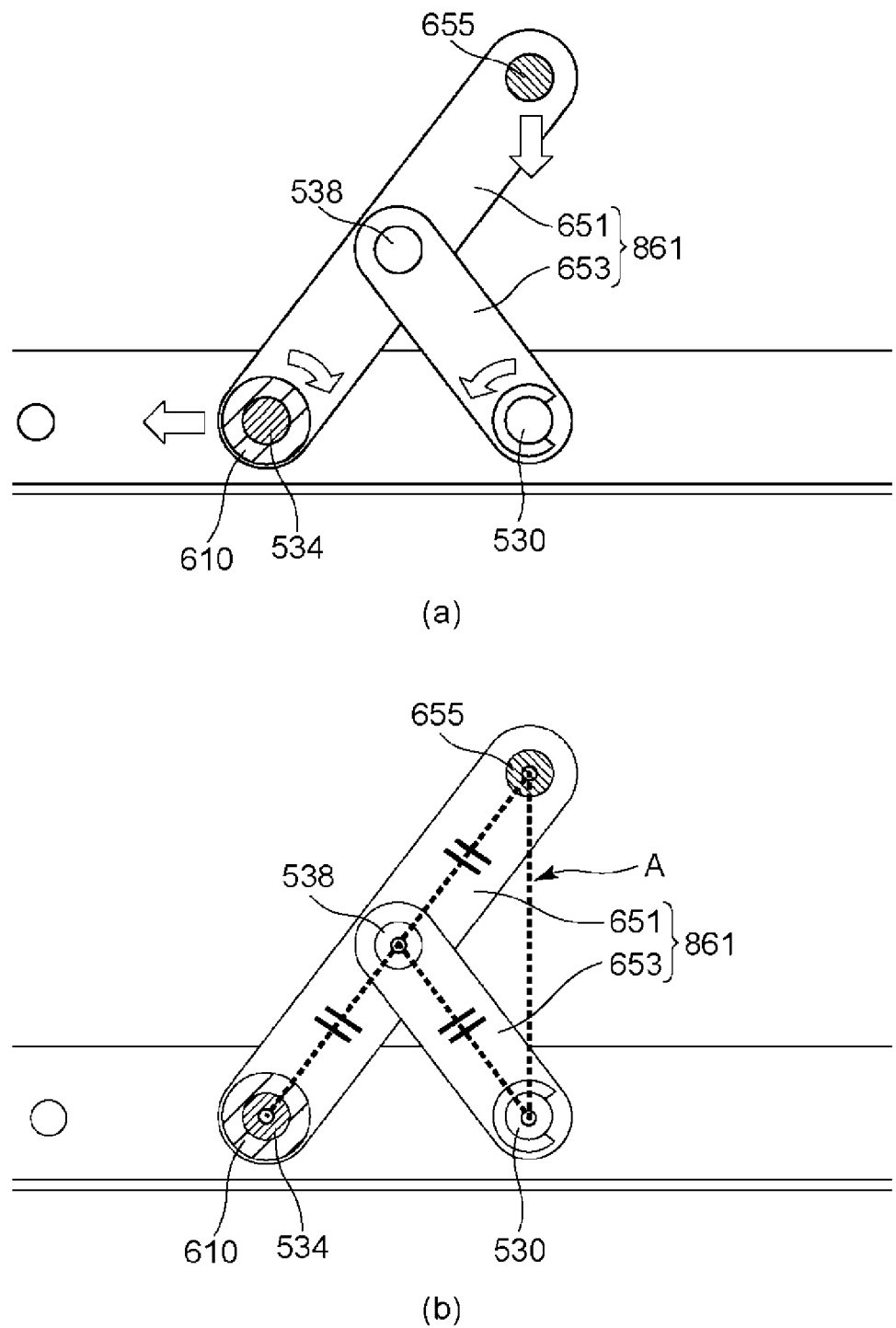
FIG. 16 includes side views of a first link mechanism of a λ type.

As shown in parts (a) and (b) of FIG. 16, a length of the link member 653 with respect to the longitudinal direction is shorter than a length of the link member 651 with respect to the longitudinal direction.

The link member 651 includes a bearing portion 610, a projection 655 and a connecting shaft portion 538. The bearing portion 610 is provided on one end side of the link member 651 with respect to the longitudinal direction. The projection 655 is a cylindrical projection provided on the other end side of the link member 651 with respect to the longitudinal direction and standing in the rotational axis direction of the link member 651, and is a projection for deforming a spring provided on the holding member 505 side of the optical print head 105. The connecting shaft portion 538 is provided between the bearing portion 610 and the projection 655 with respect to the longitudinal direction of the link member 651. Incidentally, the link member 651 is not limited to the link member including the projection 655, but may also have a structure in which the link member 651 is bent with respect to the rotational axis direction on one end side with respect to the longitudinal direction.

The bearing portion 610 is provided with a hollow hole extending in the left-right direction of part (a) of FIG. 16. The slidable portion 525 is provided with an engaging shaft portion 534. The engaging shaft portion 534 is a cylindrical projection standing from the slidable portion 525 in the left direction of part (a) of FIG. 16. The engaging shaft portion 534 forms a first connecting portion by being engaged rotatably in the hole of the bearing portion 610. That is, the link member 651 is rotatable about the first connecting portion relative to the slidable portion 525. Here, a constitution in which the engaging shaft portion 534 is formed on the link member 651 side and in which the bearing portion 610 is formed on the slidable portion 525 side may also be employed.

The link member 653 includes a connecting shaft portion 530. The connecting shaft portion 530 is provided on one end side of the link member 653 with respect to the longitudinal direction of the link member 653. The connecting shaft portion 530 is a cylindrical project standing from the link member 653 toward the left side of part (a) of FIG. 16. The connecting shaft portion 530 is inserted rotatably in a hole formed in the third supporting portion 526 and forms a second connecting portion. Here, the connecting shaft portion 530 may also be formed on the third supporting portion 526, not the link member 653. That is, in the hole provided in the link member 653, the connecting shaft portion 530 formed on the third supporting portion 526 may also be inserted.

The link member 653 is provided with a circular hole, extending in the left-right direction of part (a) of FIG. 16, formed on the other end side thereof with respect to the longitudinal direction. In the hole, the connecting shaft portion 538 of the link member 651 is rotatably inserted, so that the connecting shaft portion 538 and the hole of the link member 653 form a fourth connecting portion. That is, the link member 653 is rotatable about the third connecting portion relative to the third supporting portion 526 and is rotatable about the fourth connecting portion relative to the link member 651. Here, the connecting shaft portion 538 may also be formed on the link member 653, not the link member 651. That is, the connecting shaft portion 538 formed on the link member 653 may also be rotatably inserted in a hole formed in the link member 651.

Incidentally, a structure of the second link mechanism 862 is also similar to the above-described structure of the first link mechanism 861. The link members 652 and 654 of the second link mechanism 862 correspond to the link members 651 and 653, respectively, of the first link mechanism 651. Correspondingly to the first connecting portion, connecting portion between one end side portion of the link member 652 with respect to the longitudinal direction and the slidable portion 525 constitutes a second connecting portion. Incidentally, in the moving mechanism 640, either one of the link members 653 and 654 may also be omitted.

By the above constitution, when the slidable portion 525 is slid from the front side toward the rear side relative to the third supporting portion 526, the bearing portion 610 engaged with the engaging shaft portion 534 is slid together with the slidable portion 525 from the front side toward the rear side relative to the third supporting portion 526. By this, as shown in part (a) of FIG. 16, when the first link mechanism 861 is seen from the rear side, the first link mechanism 861 is rotated about the engaging shaft portion 534 in the clockwise direction, and the link member 653 is rotated about the connecting shaft portion 530 in the counterclockwise direction. Therefore, the projection 655 is moved from the exposure position toward a retracted position.

On the other hand, when the slidable portion 525 is slid (moved) from the rear side toward the front side relative to the third supporting portion 526, the link member 651 and the link member 653 are moved in a direction opposite to the arrow direction shown in part (a) of FIG. 16. When the slidable portion 525 is slid from the rear side toward the front side relative to the third supporting portion 526, the bearing portion 610 engaged with the engaging shaft portion 534 is slid together with the slidable portion 525 from the rear side toward the front side relative to the third supporting portion 526. As a result, as shown in part (a) of FIG. 16, when the first link mechanism 861 is seen from the rear side, the first link mechanism 861 is rotated about the engaging shaft portion 534 in the counterclockwise direction, and the link member 653 is rotated about the connecting shaft portion 530 in the clockwise direction. Therefore, the projection 655 is moved from the retracted position toward the exposure position.

Incidentally, (1) a distance between a rotation center axis of the connecting shaft portion 538 and a rotation center axis of the bearing portion 610 is L1, (2) a distance between the rotation center axis of the connecting shaft portion 538 and a rotation center axis of the connecting shaft portion 530 is L2, and (3) a distance between the rotation center axis of the connecting shaft portion 538 and a rotation center axis of the projection 655 is L3. In the moving mechanism 640, the first link member 641 forms Scott-Russel's mechanism in which L1, L2 and L3 are equal to each other (part (b) of FIG. 16). The distances L1, L2 and L3 are made equal to each other, whereby the projection 655 is vertically moved (along a dotted line A in part (b) of FIG. 16) with respect to a slide (movement) direction of the engaging shaft portion 534, and therefore, in the above-described link mechanism, the optical print head 105 can be moved substantially in an optical axis direction of the lens.

Here, a constitution, in which a structure in which the first link mechanism 861 and the second link mechanism 862 are reversed with respect to the front-rear direction, is used and when the slidable portion 525 is slid from the front side toward the rear side, the optical print head 105 is moved from the retracted position toward the exposure position, and when the slidable portion 525 is slid from the rear side toward the front side, the optical print head 105 is moved from the exposure position toward the retracted position may also be employed. In this case, the cover 558 described later pushes the slidable portion 525 from the front side toward the rear side during movement of the cover 558 from an open state toward a closed state and pulls the slidable portion 525 from the rear side toward the front side during movement of the cover 558 from the closed state toward the open state.

The mechanism for moving the optical print head 105 is not limited to the moving mechanism 640 but may also be a moving mechanism 140 shown in FIG. 17. In the following, the moving mechanism 140 will be described using FIG. 17 and FIG. 18. Incidentally, members having functions substantially similar to the members constituting the moving mechanism 640 are described by adding thereto the same reference numerals or symbols and will be omitted from redundant description in some cases.

In the following, a mechanism in which the moving mechanism 140 moves the holding member 505 will be described. Part (a) of FIG. 18 is a sectional view of the holding member 505 and the moving mechanism 140 shown in part (b) of FIG. 18, which are cut along a plane along the rotational axis of the photosensitive drum 103.

As shown in parts (a) and (b) of FIG. 17, a link member 151 includes a bearing portion 110 and a projection 155. The bearing portion 110 is provided on one end side of the link member 151 with respect to the longitudinal direction. As shown in parts (a) and (b) of FIG. 18, the projection 155 is a cylindrical projection provided on the other end side of the link member 151 with respect to the longitudinal direction and standing in the rotational axis direction of the link member 151, and is a projection for deforming a spring provided on the holding member 505 side of the optical print head 105. Here, the link member 151 is not limited to the link member including the projection 155, but may also be a structure in which the link member 151 is bent with respect to the rotational axis direction of the link member 151 on one end side with respect to the longitudinal direction of the link member 151.

The bearing portion 110 is provided with a hollow hole extending in the left-right direction. As shown in parts (a) and (b) of FIG. 18, the slidable portion 525 is provided with an engaging shaft portion 534. The engaging shaft portion 534 is a cylindrical projection standing from the slidable portion 525 in the left direction of part (a) of FIG. 16. The hole of the bearing portion 110 forms a first connecting portion by being engaged rotatably with the engaging shaft portion 534. That is, the link member 151 is rotatable about the first connecting portion relative to the slidable portion 525. Here, a constitution in which the engaging shaft portion 534 is formed on the link member 151 side and in which the bearing portion 110 is formed on the slidable portion 525 side may also be employed.

Incidentally, on the rear side of the third supporting portion 526, a shaft similar to the supporting shaft 531 is provided, and on the rear side of the slidable portion 525, an elongated hole similar to the elongated hole 691 is formed, and the rear side of the moving mechanism 140 has a structure similar to the structure of the front side. Further, a structure of the link member 152 corresponds to the structure of the link member 151. Further, correspondingly to the first connecting portion, a connecting portion between one end side of the link member 152 with respect to the longitudinal direction and the slidable portion 525 constitutes a second connecting portion.

On a side in front of one end of the holding member 505, the contact portion 529 of the first supporting portion 527 (not shown) is disposed. By this, when the slidable portion 525 slides (moves) from the rear side toward the front side relative to the third supporting portion 526, the bearing portion 110 engaging with the engaging shaft portion 534 slides (moves) together with the slidable portion 525 from the rear side toward the front side relative to the third supporting portion 526. With that, the holding member 505 on which the projection 155 is mounted will move toward the front side, but the one end of the holding member 505 contacts the contact portion 529, so that movement of the holding member 505 toward the projection side is restricted. The link member 151 is disposed so as to cross the rotational axis direction of the photosensitive drum 103 so that one end side where the projection 155 is provided is positioned further on the drum unit 518 side than the other end side where the bearing portion 110 is provided is, and therefore, when the link member 151 is seen from the right side as shown in part (a) of FIG. 18, the link member 151 is rotated (rotationally moved) counterclockwise about the engaging shaft portion 534 as a rotation center. Therefore, the holding member 505 moves from the retracted position toward the exposure position while contacting the contact portion 529 at one end thereof.

On the other hand, when the slidable portion 525 slides (moves) from the front side toward the rear side relative to the third supporting portion 526, the bearing portion 110 engaging with the engaging shaft portion 534 slides (moves) together with the slidable portion 525 from the rear side toward the front side relative to the third supporting portion 526. By this, the link member 151 rotates clockwise about the engaging shaft portion 534 as seen from the right side as shown in part (a) of FIG. 18. Therefore, the projection 155 moves in a direction from the exposure position toward the retracted position. Although specifically described later, the slidable portion 525 moves from the rear side toward the front side in interrelation with a closing operation of the cover 558 and moves from the front side toward the rear side in interrelation with an opening operation of the cover 558. That is, when the cover 558 moves from an open state to a closed state, the holding member 505 moves in the direction from the retracted position toward the exposure position, and when the cover 558 moves from the closed state to the open state, the holding member 505 moves in the direction from the exposure position toward the retracted position.

When the optical print head 105 moves in substantially the optical axis direction of the lenses, the rear side of the holding member 505 moves in the gap formed by the first wall surface 588 and the second wall surface 589 provided in the above-described second supporting portion 528. By this, inclination of the holding member 505 with respect to the left-right direction is prevented.

The link member 151 and the link member 152 may also be disposed so that the other end side is disposed further on the front side than the other end side is, and the contact portion 529 may also be disposed further on the rear side than the other end of the holding member is. That is, when the slidable portion 525 slides (moves) from the front side toward the rear side relative to the third supporting portion 526, the bearing portion 110 engaging with the engaging shaft portion 534 slides (moves) together with the slidable portion 525 from the front side toward the rear side relative to the third supporting portion 526. With that, the holding member 505 on which the projection 155 is mounted will move toward the rear side, but the other end of the holding member 505 contacts the contact portion 529, so that movement of the holding member 505 toward the projection side is restricted. When the link member 151 is seen from the right side, the link member 151 and the link member 152 are rotated (rotationally moved) clockwise about the engaging shaft portion 534 as a rotation center, so that the holding member 505 moves from the retracted position toward the exposure position while contacting the contact portion 529 at the other end thereof. In this case, the cover 558 pushes the slidable portion 525 from the front side toward the rear side during movement thereof from the open state toward the closed state and pulls the slidable portion 525 from the rear side toward the front side during movement thereof from the closed state toward the open state.

The mechanism for moving the optical print head 105 is not limited to the moving mechanism 640 and the moving mechanism 140, but may also be a moving mechanism 840 shown in FIG. 19. In the following, the moving mechanism 840 will be described using FIG. 19. Incidentally, description will be made by adding the same reference numerals or symbols to members having substantially the same functions as members constituting the moving mechanism 640 (140), and redundant description will be omitted in some cases.

Part (a1) of FIG. 19 and part (a2) of FIG. 19 are the moving mechanism 840. As shown in part (a1) of FIG. 19 and part (a2) of FIG. 19, the moving mechanism 840 includes a first link mechanism 858, a second link mechanism 859, a slidable portion 825 and a third supporting portion 526. The first link mechanism 858 includes a link member 843 and a link member 844, and the second link mechanism 859 includes a link member 845 and a link member 846. As shown in FIG. 19, the link member 843 and the link member 844, and the link member 845 and the link member 846 rotatably cross each other and constitute link mechanisms of X-type, respectively. A projection 847 of the link member 843, a projection 848 of the link member 844, a projection 849 of the link member 845, and a projection 850 of the link member 846 are rotatably mounted on an unshown holding member 805. In part (a1) of FIG. 19, when the slidable portion 825 is slid (moved) in an arrow A direction, the link members 843-846 rotate relative to the slidable portion 825, so that the projections 847-850 move toward the lower side (part (a) of FIG. 19). On the other hand, in part (a2) of FIG. 19, when the slidable portion 825 is slid (moved) in an arrow B direction, the link members 843-846 rotate relative to the slidable portion 825, so that the projections 847-850 move toward the upper side (part (a1) of FIG. 19).

Part (b) of FIG. 19 is a view showing a front side of the moving mechanism 840 and a front side of the holding member 805 in combination.

In the following, using part (b) of FIG. 19, a mechanism in which the moving mechanism 840 moves the holding member 805 will be described. Here, operations of the first link mechanism 858 and the second link mechanism 859 are substantially the same, and therefore, here, the first link mechanism 858 will be described using part (b) of FIG. 19. The first link mechanism 858 includes the link member 843 and the link member 844. Each of the link member 843 and the link member 844 which constitute the first link mechanism 858 is a single link member, but the first link mechanism 858 may also be constituted by combining a plurality of link members.

The moving mechanism 840 in part (b) of FIG. 19 includes the first link mechanism 858 and the slidable portion 825. As shown in part (b) of FIG. 19, the slidable portion 825 is provided with an elongated hole 863 which is an elongated opening penetrating in the left-right direction and extending in the front-rear direction.

The link member 843 includes a projection 810, the projection 847 and a connecting shaft portion 538. The projection 810 is provided on one end side with respect to the longitudinal direction. The projection 847 is a cylindrical projection which is provided on the other end side of the link member 843 with respect to the longitudinal direction and which stands toward the right side with respect to the rotational axis direction of the link member 843. The connecting shaft portion 538 is provided between the projection 810 and the projection 847 with respect to the longitudinal direction of the link member 843. Incidentally, the link member 843 is not limited to the link member including the projection 847, but may also have a structure such that one end side of the link member 843 with respect to the longitudinal direction is bent with respect to the rotational axis direction.

The projection 810 forms a first connecting portion by being loosely engaged rotatably relative to the elongated hole 863 of the slidable portion 825. That is, the link member 843 is rotatable relative to the slidable portion 825 about the first connecting portion. Further, the projection 810 is movable in the elongated hole 863 in the front-rear direction within a range (in the opening) of the elongated hole 863 with respect to the front-rear direction. Between the rear side edge of the elongated hole 863 and the projection 810, a coil spring 860 is provided.

The link member 844 includes a connecting shaft portion 530 and the projection 848. The connecting shaft portion 530 is provided on one end side of the link member 844 with respect to the longitudinal direction. The connecting shaft portion 530 is a cylindrical projection standing from the link member 844 toward the right side of part (b) of FIG. 19. The connecting shaft portion 530 is rotatably inserted into a hole formed in the third supporting portion 526 and forms a third connecting portion. Here, the connecting shaft portion 530 may also be formed on the third supporting portion 526, not the link member 844. That is, the connecting shaft portion 530 formed on the third supporting portion may also be inserted into a hole formed in the link member 844.

The projection 848 is a cylindrical projection which is provided on the other end side of the link member 844 with respect to the longitudinal direction and which stands toward the right side with respect to the rotational axis direction of the link member 844.

Further, between the projection 848 of the link member 844 and the third connecting portion, a circular hole extending in the left-right direction of part (b) of FIG. 19 is formed. In the hole, the connecting shaft portion 538 of the link member 843 is inserted, so that the connecting shaft portion 538 and the hole of the link member 844 form a fourth connecting portion. That is, the link member 844 is rotatable relative to the third supporting portion 526 and is rotatable relative to the link member 843 about the fourth connecting portion as a rotation center. Here, the connecting shaft portion 538 may also be formed on the link member 844, not the link member 843. That is, in the hole formed in the link member 844, the connecting shaft portion 538 formed on the link member 843 may also be inserted.

Incidentally, as regards an embodiment of the moving mechanism 840, either one of the link member 843 and the link member 844 may also be omitted.

The holding member 805 includes the lens array 506, a link mounting portion 851, a link mounting portion 852 and a pin mounting portion 855. Both the link mounting portion 851 and the link mounting portion 852 are provided between the lens array 506 and a pin 514 mounted in the holding member 805. Incidentally, although not shown in the figure, both the link mounting portion 853 and the link mounting portion 854 on which the link member 845 and the link member 846 which constitute the second link mechanism 859 are provided between the lens array 506 and a pin 515 mounted on the other end side of the holding member 805. The link mounting portion 851 is a hole which is formed in the holding member 805 between the lens array 506 and the pin mounting portion 855 and which penetrates in the left-right direction. Further, the link mounting portion 852 is an elongated hole which is formed in the holding member 805 between the lens array 506 and the link mounting portion 851 and which penetrates in the left-right direction and which extends in the front-rear direction.

On the link mounting portion 851, the projection 847 of the link member 843 is mounted rotatably, and on the link mounting portion 852, the projection 848 of the link member 844 is mounted rotatably. Further, the projection 848 is mounted movably in the front-rear direction relative to the link mounting portion 851. Accordingly, the link member 844 is slidable (movable) in the front-rear direction within a range of the link mounting portion 852 with respect to the front-rear direction while rotating about the projection 848 as a rotation center.

By the above-described constitution, when the slidable portion 825 slides (moves) from the front side toward the rear side relative to the third supporting portion 526, the projection 810 slides (moves) together with the slidable portion 825 from the front side toward the rear side relative to the third supporting portion 526. By this, when the first link mechanism 858 is seen from the right side as shown in part (a1) of FIG. 19, the link member 843 rotates clockwise about the projection 810 as a rotation center, and the projection 848 moves from the front side toward the rear side at the link mounting portion 852 while the link member 844 rotates counterclockwise about the connecting shaft portion 530. Therefore, the projection 847 and the projection 848 move in the direction from the exposure position toward the retracted position.

On the other hand, when the slidable portion 825 slides (moves) from the rear side toward the front side relative to the third supporting portion 526, the projection 810 slides (moves) together with the slidable portion 825 from the rear side toward the front side relative to the third supporting portion 526. By this, when the first link mechanism 858 is seen from the right side as shown in part (a2) of FIG. 19, the link member 843 rotates counterclockwise about the projection 810 as a rotation center, and the projection 848 moves from the rear side toward the front side at the link mounting portion while the link member 844 rotates counterclockwise about the connecting shaft portion 530. Therefore, the projection 847 and the projection 848 move in the direction from the retracted position toward the exposure position. As shown in part (b) of FIG. 19, in a state in which the contact pin 514 contacts the contact surface 550, when the slidable portion 825 further slides (moves) toward the front side, the coil spring 860 contracts by being nipped between the rear side edge of the elongated hole 863 and the projection 810. By a restoring force of the contracted coil spring 860, the projection 810 is urged toward the front side. By this, an urging force in a direction toward an upper side is imparted to the holding member 805.

Here, a constitution, in which a structure in which the first link mechanism 858 and the second link mechanism 859 are reversed with respect to the front-rear direction, is used and when the slidable portion 825 is slid from the front side toward the rear side, the optical print head 105 is moved from the retracted position toward the exposure position, and when the slidable portion 825 is slid from the rear side toward the front side, the optical print head 105 is moved from the exposure position toward the retracted position may also be employed. In this case, the cover 558 described later pushes the slidable portion 825 from the front side toward the rear side during movement of the cover 558 from an open state toward a closed state and pulls the slidable portion 825 from the rear side toward the front side during movement of the cover 558 from the closed state toward the open state.

Figure 20:
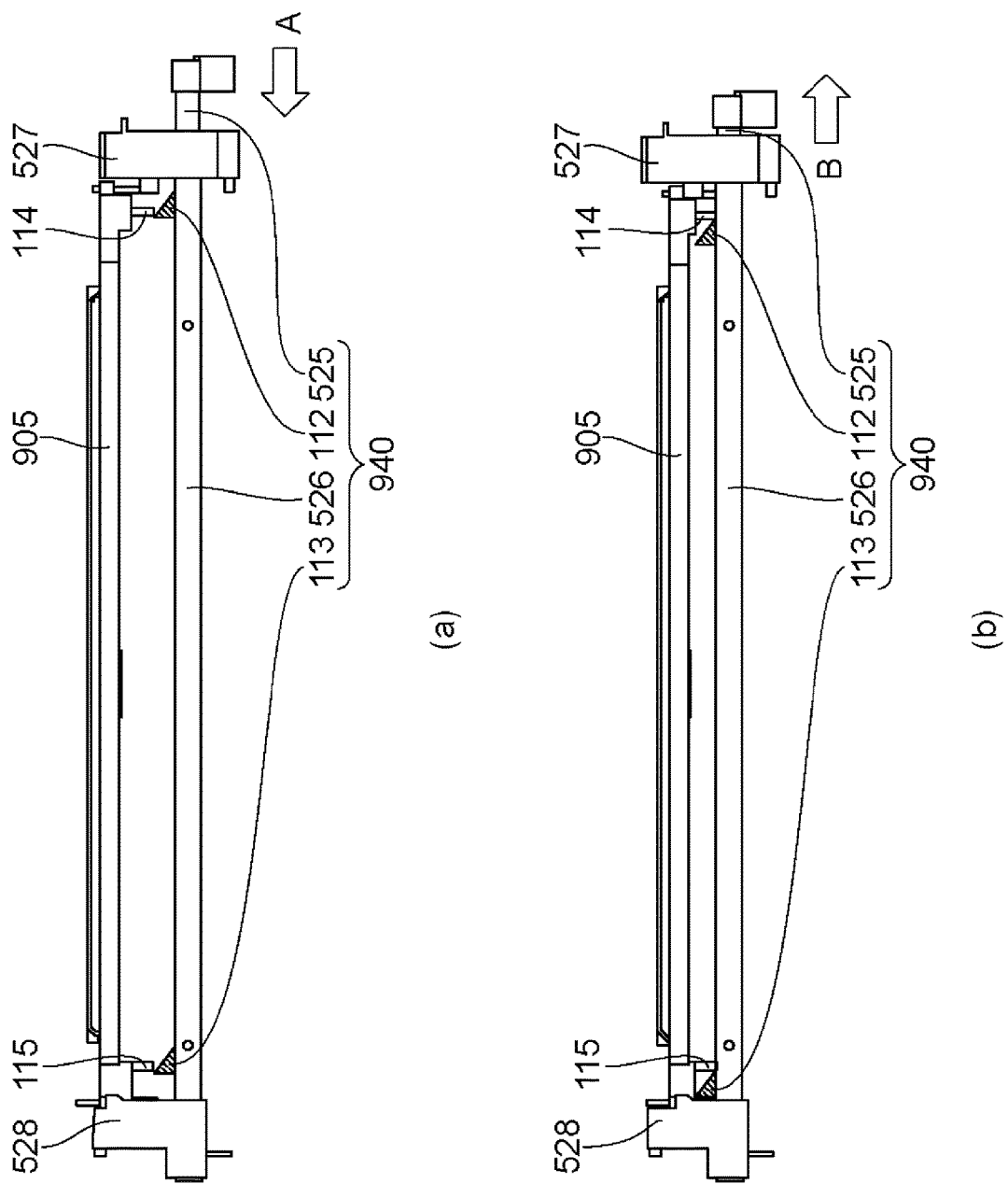
FIG. 20 includes views for illustrating a moving mechanism using a cam mechanism.

Further, the mechanism for moving the optical print head 105 is not limited to the moving mechanism 640, the moving mechanism 140 and the moving mechanism 840, but may also be a moving mechanism 940 shown in FIG. 20. In the following, the moving mechanism 940 will be described using FIG. 20. Incidentally, members having functions substantially similar to the members constituting the moving mechanisms 640 (including 140 and 840) are described by adding thereto the same reference numerals or symbols and will be omitted from redundant description in some cases.

As shown in FIG. 20, on the front side and the rear side of the slidable portion 525, a first cam portion 112 and a second cam portion 113 are provided, and on the front side and the rear side of the lower side of the holding member 905, a movement supporting portion 114 and a movement supporting portion 115 are provided. The first cam portion 112 and the second cam portion 113 have inclined surfaces on the holding member 905 side descending from the rear side toward the front side.

Part (a) of FIG. 20 is a schematic view of the optical print head 105 located in the exposure position and the moving mechanism 940 as seen from the right side. When the optical print head 105 is in the exposure position, when the slidable portion 525 is slid from the front side toward the rear side relative to the third supporting portion 526, the first cam portion 112 and the second cam portion 113 which are provided on the slidable portion 525 are moved together with the slidable portion 525 from the front side toward the rear side relative to the third supporting portion 526. By this, lower ends of the movement supporting portion 114 and the movement supporting portion 115 which are provided on the holding member 905 contact the first cam portion 112 and the second cam portion 113 and the movement supporting portion 114 and the movement supporting portion 115 are moved in a direction from the exposure position toward the retracted position along the first cam portion 112 and the second cam portion 113.

Part (b) of FIG. 20 is a schematic view of the optical print head 105 located in the retracted position and the moving mechanism 940 as seen from the right side. When the optical print head 105 is in the retracted position, when the slidable portion 525 is slid from the rear side toward the front side relative to the third supporting portion 526, the first cam portion 112 and the second cam portion 113 which are provided on the slidable portion 525 are moved together with the slidable portion 525 from the rear side toward the front side relative to the third supporting portion 526. By this, lower ends of the movement supporting portion 114 and the movement supporting portion 115 which are provided on the holding member 905 are pushed upward and moved in a direction from the retracted position toward the exposure position along the first cam portion 112 and the second cam portion 113.

Here, a constitution in which a structure in which the first cam portion 112 and the second cam portion 113 are provided and in which inclination directions of inclined surfaces are inclined downwardly from the front side toward the rear side is used and when the slidable portion 525 is slid from the front side toward the rear side, the optical print head 105 is moved from the retracted position toward the exposure position, and when the slidable portion 525 is slid from the rear side toward the front side, the optical print head 105 is moved from the exposure position toward the retracted position may also be employed. In this case, the cover 558 described later pushes the slidable portion 525 from the front side toward the rear side during movement of the cover 558 from an open state toward a closed state and pulls the slidable portion 525 from the rear side toward the front side during movement of the cover 558 from the closed state toward the open state.

Next, the cover 558 will be described using FIG. 21. The cover 558 is a member for sliding (moving) the slidable portion 525 as described above. Incidentally, a constitution for sliding (moving) the slidable portion 525 is not limited to the cover 558. For example, a constitution in which the slidable portion 525 is slid (moved) in interrelation with opening and closing of an unshown front door may also be employed. Further, a constitution in which the slidable portion 525 is slid (moved) in interrelation with rotation of a rotatable member such as a lever, not a covering member such as the cover 558 or a door may also be employed.

Part (a) of FIG. 21 is a perspective view of the cover 558. As shown in part (a) of FIG. 21, the cover 558 includes a rotation shaft portion 559 and a rotation shaft portion 560. The rotation shaft portion 559 is a cylindrical projection projecting in the right side direction of the cover 558. On the other hand, the rotation shaft portion 560 is a cylindrical projection projecting in the left side direction of the cover 558.

An enlarged view of a portion where the cover 558 is mounted on the front side plate 642 is shown in part (b) of FIG. 21. Further, part (c) of FIG. 21 is a perspective view of the cover 558 mounted on the front side plate 642. As shown in part (b) of FIG. 21, the front side plate 642 includes a bearing member 621 engageable with the rotation shaft portion 559 of the cover 558 and includes a bearing member 622 engageable with the rotation shaft portion 560 of the cover 558. As shown in part (c) of FIG. 21, the rotation shaft portion 559 of the cover 558 rotatably engages with the bearing member 621 of the front side plate 642, and the rotation shaft portion 560 of the cover 558 rotatably engages with the bearing member 622 of the front side plate 642. As shown in part (a) of FIG. 21, a rotational axis of the rotation shaft portion 559 and a rotational axis of the rotation shaft portion 560 are on a rotational axis 563. The cover 558 opens and closes about the rotational axis 563 as a rotation center relative to the image forming apparatus 1 main assembly. The closed cover 558 positions on an insertion and extraction passage of the developing unit 641. For that reason, when the cover 558 is in a closed state, the operator cannot perform the exchange operation of the drum unit 518 and the developing unit 641. The operator is capable of exchanging the drum unit 518 by opening the cover 558, and closes the cover 558 after the operation.

Next, using FIG. 22-FIG. 25, a constitution in which the slidable portion 525 slides (moves) in the rotational axis direction of the photosensitive drum 103 in interrelation with the opening and closing operation of the cover 558 will be specifically described.

Figure 22:
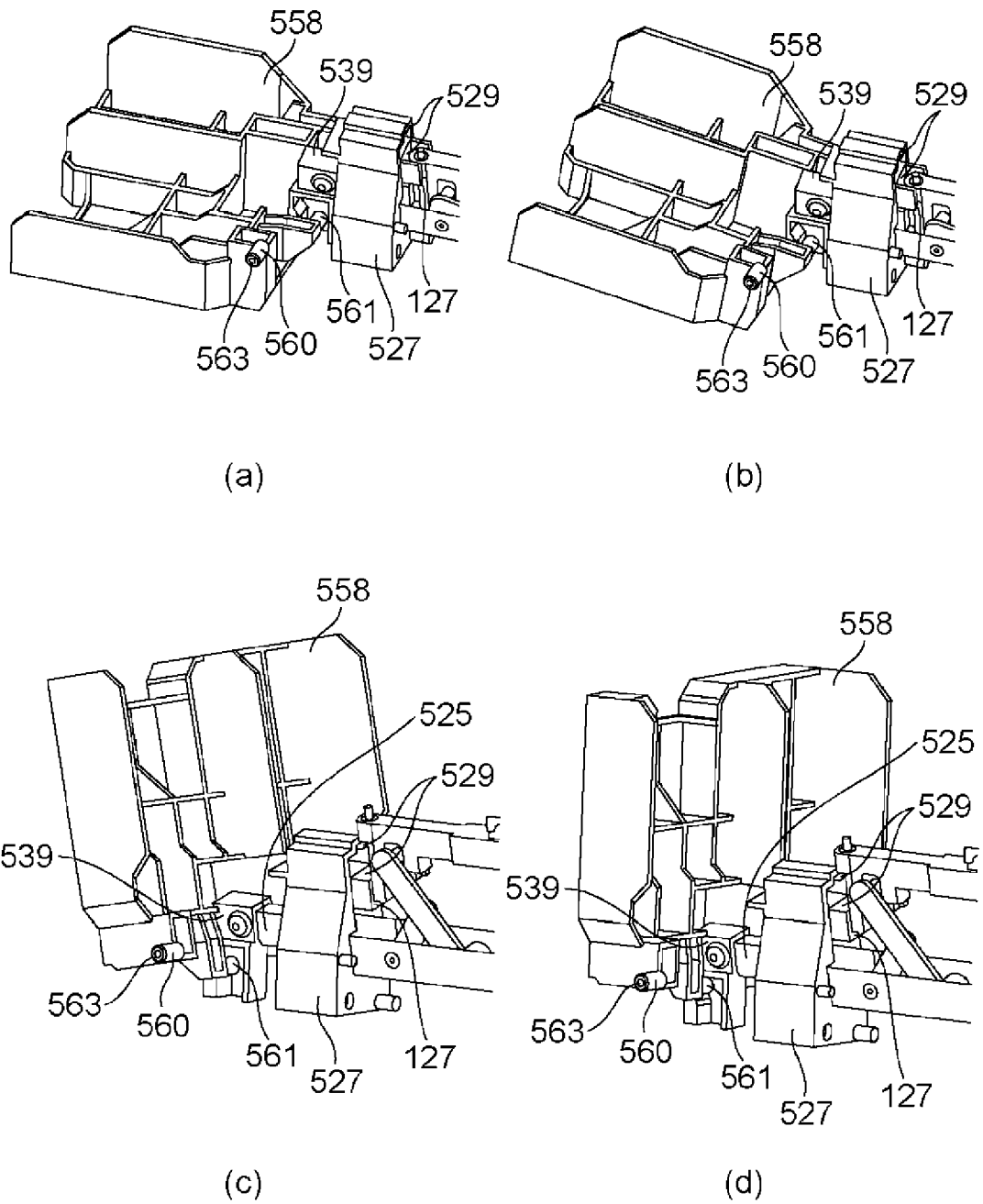
FIG. 22 includes perspective views of the cover for illustrating an operation when the cover is closed.
Figure 23:
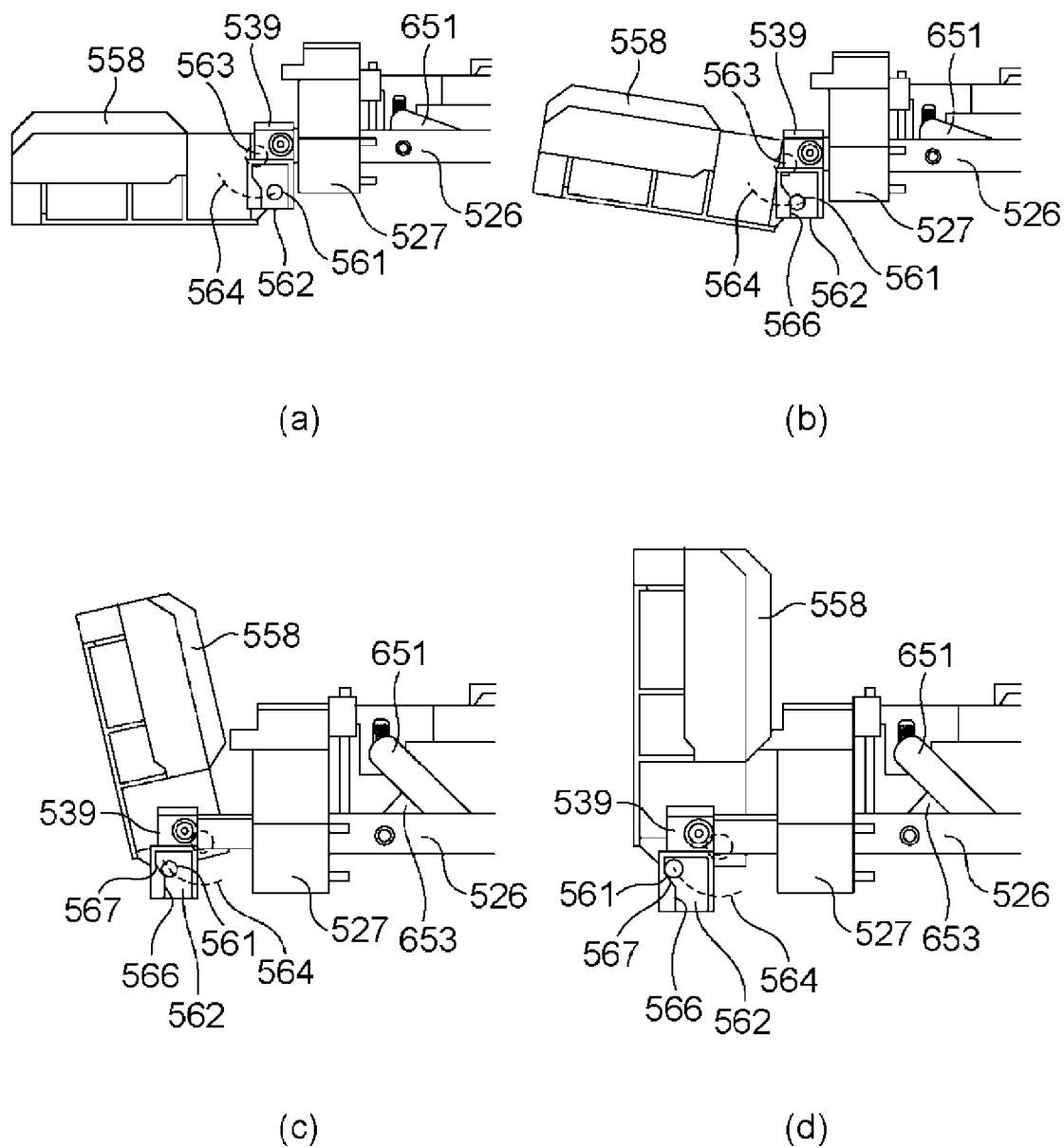
FIG. 23 includes perspective views of the cover for illustrating the operation when the cover is closed.

Parts (a)-(d) of FIG. 22 are perspective views showing the cover 558 rotating from the open state toward the closed state. Parts (a)-(d) of FIG. 23 are sectional views showing the cover 558 rotating from the closed state toward the open state. Part (a) of FIG. 22 and part (a) of FIG. 23 show the open state of the cover 558. Part (d) of FIG. 22 and part (d) of FIG. 23 show the closed state of the cover 558. Part (b) of FIG. 22 and part (b) of FIG. 23, and part (c) of FIG. 22 and part (c) of FIG. 23 are the views showing the cover 558 shifting from the open state to the closed state. Incidentally, the cover 558 in the closed state shown in part (d) of FIG. 22 and part (d) of FIG. 23 maintains the closed state by a snap-fit mechanism, a stopper for preventing rotation, or the like.

As shown in parts (a)-(d) of FIG. 22, the cover 558 rotates about the rotational axis 563 as a center relative to the image forming apparatus 1 main assembly. With that, as shown by rotation loci 564 of parts (a)-(d) of FIG. 23, the pressing portion 561 also rotates about the rotational axis 563. The cover 558 includes the cylindrical pressing portion 561 projecting from the left side toward the right side. As shown in FIG. 22, the pressing portion 561 is positioned in the accommodating space 562 mounted at one end of the slidable portion 525.

Action of the pressing portion 561 on the slidable portion 525 will be described using parts (a)-(d) of FIG. 23. When the cover 558 rotates clockwise from the state of part (a) of FIG. 23, the pressing portion 561 is positioned on the rotation locus 564 and contacts the contact surface 566 crossing the rotation locus 564 (part (b) of FIG. 24). When the cover 558 further rotates clockwise from this state, the pressing portion 561 presses the contact surface 566 toward the front side while sliding on the contact surface 566. By that, the slide assisting member 539 moves toward the front side. The slide assisting member 539 is fixed to the slidable portion 525, and therefore, the slidable portion 525 also slides (moves) toward the front side in interrelation with movement of the slide assisting member 539.

Further, when the cover 558 rotates clockwise, the pressing portion 561 moves from on the contact surface 566 to on a contact surface 567 (part (c) of FIG. 23). The contact surface 567 forms a curved surface having a shape roughly following the rotation locus 564 of the pressing portion 561. For that reason, in the case where the cover 558 further rotates clockwise from the state of part (c) of FIG. 23, the pressing portion 561 moves toward the upper side in contact with the contact surface 567, but a force for sliding (moving) the slide assisting member 539 toward further front side is not imparted from the pressing portion 561.

From part (c) of FIG. 22 and part (c) of FIG. 23, immediately after the holding member 505 is in the exposure position by rotating the cover 558 from the open state to the closed state, the pressing portion 561 contacts the front side contact surface 567 of the accommodating space 562. The contact surface 567 has a shape roughly following the rotation locus 564 of the pressing portion 561, i.e., has an arcuate shape about the rotational axis 563 as a center. For that reason, in the case where the cover 558 further rotates clockwise from the state of part (c) of FIG. 23, the pressing portion 561 moves while sliding in a state in which the pressing portion 561 contacted the contact surface 567. However, the force for sliding (moving) the slide assisting member 539 toward further front side is not imparted from the pressing portion 561. For that reason, during movement of the pressing portion 561 on the contact surface 567, the slide assisting member 539 is prevented from moving from the rear side toward the front side. That is, the moving mechanism 640 of this embodiment is constituted so that when the cover 558 is rotated in the state in which the pressing portion 561 contacted the contact surface 566, the slidable portion 525 slides (moves) in interrelation with movement of the pressing portion 561, but so that even when the cover 558 is rotated in the state in which the pressing portion 561 contacted the contact surface 567, the slidable portion 525 does not slide (move). When the cover 558 further rotate clockwise from the state of part (c) of FIG. 23, the cover 558 is in the closed state shown in part (d) of FIG. 23.

Figure 24:
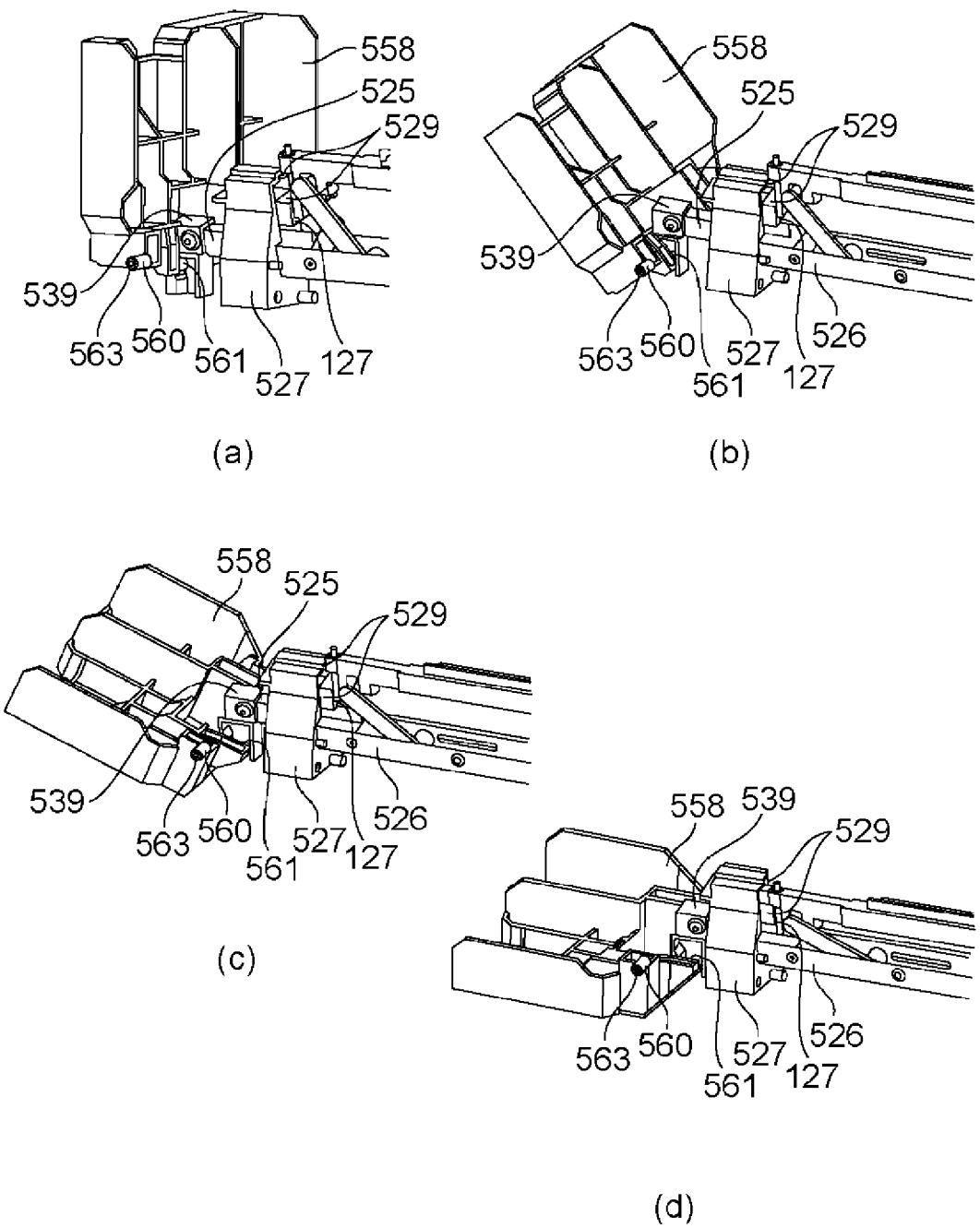
FIG. 24 includes perspective views of the cover for illustrating an operation when the cover is opened.
Figure 25:
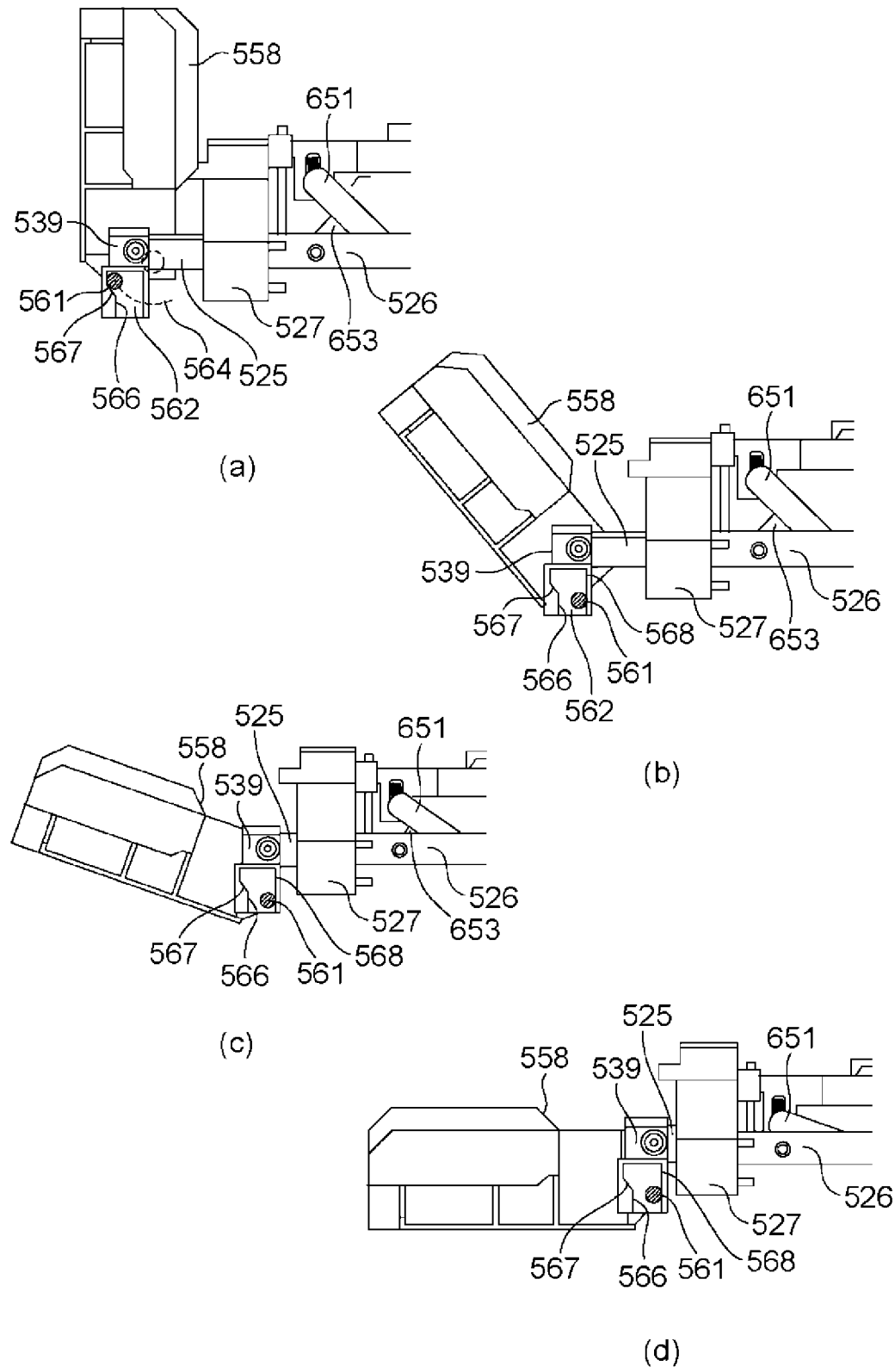
FIG. 25 includes perspective views of the cover for illustrating the operation when the cover is opened.

Parts (a)-(d) of FIG. 24 are perspective views showing the cover 558 rotating from the closed state toward the open state. Parts (a)-(d) of FIG. 25 are sectional views showing the cover 558 rotating from the open state toward the closed state. Part (a) of FIG. 24 and part (a) of FIG. 25 show the closed state of the cover 558. Part (d) of FIG. 22 and part (d) of FIG. 23 show the open state of the cover 558. Part (b) of FIG. 24 and part (b) of FIG. 25, and part (c) of FIG. 24 and part (c) of FIG. 25 are the views showing the cover 558 shifting from the closed state to the open state.

In the closed state of the cover 558 shown in part (a) of FIG. 25, by a self-weight of the optical print head 105 and a restoring force of a spring described later, a force for sliding (moving) the slidable portion 525 from the front side toward the rear side via the first link mechanism 861 and the second link mechanism 862 acts on the slidable portion 525. However, the cover 558 in the closed state is fixed to the image forming apparatus 1 main assembly so as not to rotate, and the pressing portion 561 restricts movement of the slide assisting member 539 toward the rear side, and therefore, the slidable portion 525 does not slide (move) toward the rear side.

When the cover 558 rotates counterclockwise from (a state of) part (a) of FIG. 25, the pressing portion 561 contacts a contact surface 568 as shown in part (b) of FIG. 25. When the cover 558 further rotates counterclockwise from a state of part (b) of FIG. 25, the pressing portion 561 presses the contact surface 568 from the front side toward the rear side as shown in parts (b) and (c) of FIG. 25, and therefore, the slidable portion 525 moves toward the rear side. Thereafter, when the cover 558 further rotates counterclockwise, the cover 558 is in the open state as shown in part (d) of FIG. 25.

A mechanism in which the pressing portion 561 presses the contact surface 568 is provided for the following reason. Even if movement restriction to the slide assisting member 539 by the pressing portion 561 is released by rotating the cover 558 counterclockwise from the state of part (a) of FIG. 24, when a frictional force between the respective link members, a frictional force between the link member 651 or the link member 653 and the slidable portion 525 and a frictional force between the link member 652 or the link member 654 and the third supporting portion 526 are large, the case where the slidable portion 525 does not slide (move) toward the rear side would be considered. That is, the case where even when the cover 558 is opened, the slidable portion 525 does not slide (move) would be considered. On the other hand, in order to move the slidable portion 525 toward the rear side by opening the cover 558, the moving mechanism 640 of this embodiment includes a mechanism in which the pressing portion 561 presses the contact surface 568.

By the above-described constitution, the operator for performing maintenance opens and closes the cover 558, so that the slidable portion 525 slides (moves) relative to the third supporting portion 526 in interrelation with movement of the cover 558.

Figure 26:
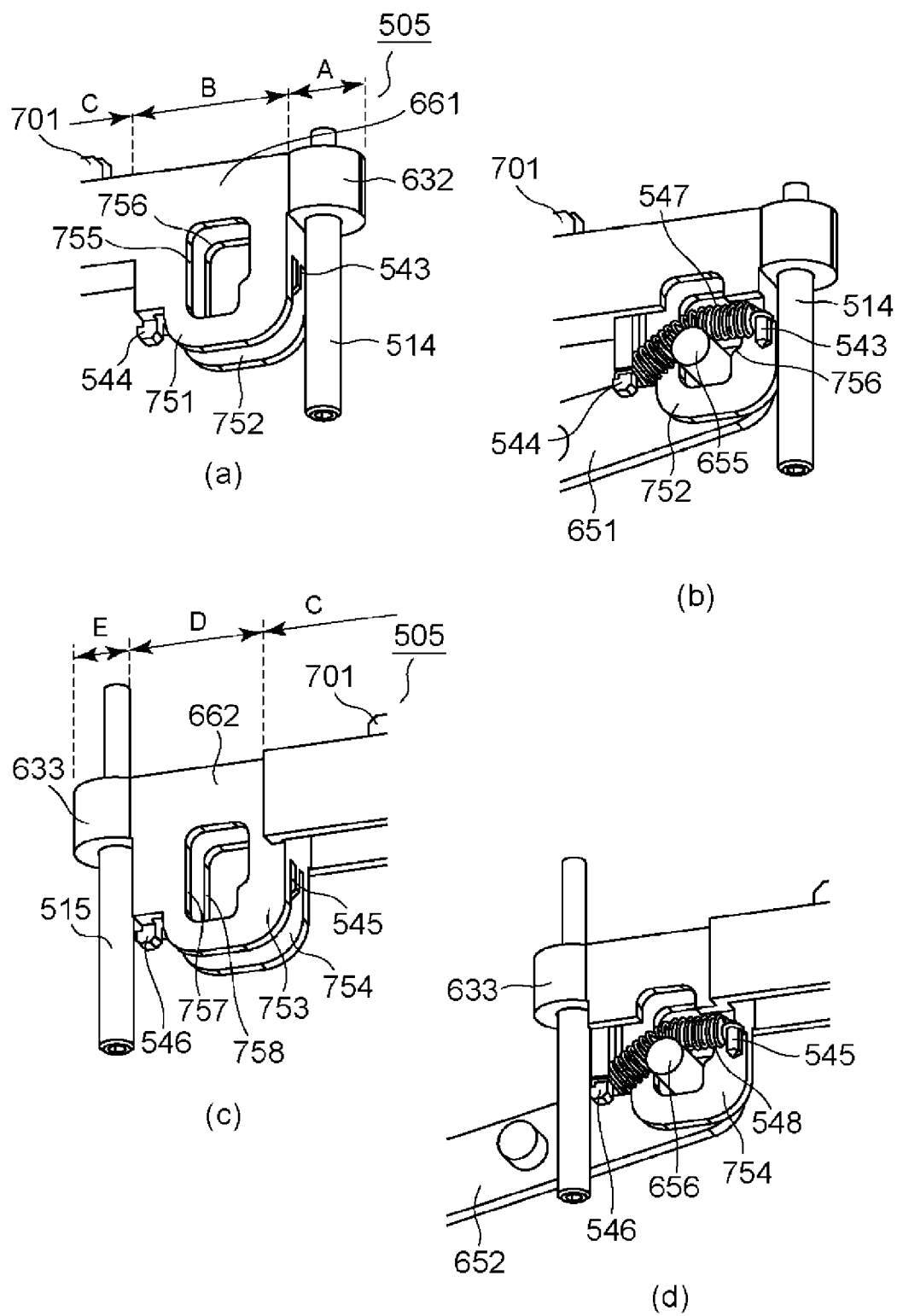
FIG. 26 includes perspective views for illustrating a structure of a holding member on both ends.

Next, a connecting mechanism between the holding member 505 and the link member 651 will be described. Parts (a) and (c) of FIG. 26 are perspective views showing one end side of the holding member 505 with respect to the front-rear direction. Parts (b) and (d) of FIG. 26 are perspective views showing the other end side of the holding member 505 with respect to the front-rear direction.

As shown in part (a) of FIG. 26, the holding member 505 includes the lens mounting portion 701 on which the lens array 506 is mounted, the spring mounting portion 661 in which the coil spring 547 is mounted, the spring mounting portion 662 in which the coil spring 548 is mounted, the pin mounting portion 632 in which the contact pin 514 is mounted, and the pin mounting portion 633 in which the contact pin 515 is mounted. The holding member 505 is a molded product which is obtained by integrally injection-molding the lens mounting portion 701, the substrate mounting portion 702 (not shown), the spring mounting portion 661 and the spring mounting portion 662 and which is made of a resin material. With respect to the front-rear direction, the spring mounting portion 661 is disposed on one end side of the lens mounting portion 701, and the pin mounting portion 632 is disposed on a further end portion side of the holding member 505 than the spring mount portion 661 is. Further, with respect to the front-rear direction, the spring mounting portion 662 is disposed on the other end side of the lens mounting portion 701, and the pin mounting portion 632 is disposed on a further end portion side than the spring mounting portion 662 is. In the holding member 505, when portions where the lens mounting portion 701, the spring mounting portion 661 and the pin mounting portion 632 are formed are shown in the figure, in part (a) of FIG. 26, the portions are portions shown by a region of C, a region of B and a region of A. To the holding member 505, on a side in front of the lens array 506 and in rear of the contact pin 514, an urging force is imparted from a lower side toward an upper side by the projection 655 of the link member 651 via the coil spring 547. Further, using part (c) of FIG. 26, when portions where the lens mounting portion 701, the spring mounting portion 662 and the pin mounting portion 633 are formed are shown in the figure, the portions are portions shown by the region of C, a region of D and a region of E, respectively. To the holding member 505, on a side in rear of the lens array 506 and in front of the contact pin 515, an urging force is imparted from a lower side toward an upper side by the projection 656 of the link member 652 via the coil spring 548.

First, the spring mounting portion 661 will be described. The spring mounting portion 661 includes a first wall portion 751, a second wall portion 752, a first engaging portion 543 and a second engaging portion 544. The first wall portion 751 is disposed on one end side of the holding member 505 with respect to the left-right direction, and the second wall portion 752 is disposed on the other end side of the holding member 505 with respect to the left-right direction. In this embodiment, with respect to the left-right direction, the first wall portion 751 and the second wall portion 752 are disposed on both sides of the contact pin 514. As shown in part (a) of FIG. 26, the first wall portion 751 and the second wall portion 752 include inner wall surfaces opposing each other. In the first wall portion 751, an opening 755 is formed, and in the second wall portion 752, an opening 756 is formed. The opening 755 and the opening 756 are elongated holes extending in the up-down direction. In the opening 755 and the opening 756, the projection 655 is inserted. The projection 655 is not engaged with the opening 755 and the opening 756, and is inserted with a gap of about 0.5 mm at a narrowest portion with respect to the front-rear direction. For this reason, a movement direction of the projection 655 is guided with respect to the up-down direction by the opening 755 and the opening 756 without receiving a large frictional force from the inner wall surfaces of the opening 755 and the opening 756.

Part (b) of FIG. 26 is a drawing in which the first wall portion 751 is removed from part (a) of FIG. 26. With respect to the left-right direction, between the first wall portion 751 and the second wall portion 752, the first engaging portion 543 and the second engaging portion 544 are disposed. Further, this first engaging portion 543 and this second wall portion 544 are disposed between the opening 755 and the opening 756. In this embodiment, the first engaging portion 543 is disposed further on an end portion side of the holding member 505 than the second engaging portion 544 is. The first engaging portion 543 and the second engaging portion 544 are projections projecting downwardly from connecting portions connecting the first wall portion 751 and the second wall portion 752 of the holding member 505. With the first wall portion 543, one end of the coil spring 547 is engaged, and with the second wall portion 544, the other end of the coil spring 547 is engaged. The first engaging portion 543 and the second engaging portion 544 are disposed on the spring mounting portion 661 so that the coil spring 547 engaged with the first engaging portion 543 and the second engaging portion 544 crosses the opening 755 and the opening 756.

With respect to the up-down direction, the first engaging portion 543 and the second wall portion 544 are disposed at different positions. In this embodiment, the first engaging portion 543 is disposed further on the photosensitive drum 103 side than the second engaging portion 544 is. Incidentally, the first engaging portion 543 and the second engaging portion 544 may be provided at the same level with respect to the up-down direction, and the second engaging portion 544 may be disposed further on the photosensitive drum 103 side than the first engaging portion 543 is.

As shown in part (b) of FIG. 26, the projection 655 is inserted from an outer wall surface side of the second wall portion 752 into the opening 756 and passes under the coil spring 547 bridged between the first engaging portion 543 and the second engaging portion 544, and is inserted into the opening 755 of the first wall portion 751.

Next, the spring mounting portion 662 will be described. As shown in part (c) of FIG. 26, the spring mounting portion 662 includes a third wall portion 753, a fourth wall portion 754, a third engaging portion 545 and a fourth engaging portion 546. The third wall portion 753 is disposed on one end side of the holding member 505 with respect to the left-right direction, and the fourth wall portion 754 is disposed on the other end side of the holding member 505 with respect to the left-right direction. In this embodiment, with respect to the left-right direction, the third wall portion 753 and the fourth wall portion 754 are disposed on both sides of the contact pin 515. The first wall portion 751 and the third wall portion 753 are disposed on the same side with respect to the left-right direction, i.e., the first wall portion 751 and the third wall portion 753 are disposed on the right side of the holding member 505. The second wall portion 752 and the fourth wall portion 754 are disposed on the same side with respect to the left-right direction, i.e., the second wall portion 752 and the fourth wall portion 754 are disposed on the left side of the holding member 505.

As shown in part (c) of FIG. 26, the third wall portion 753 and the fourth wall portion 754 include inner wall surfaces opposing each other. In the third wall portion 753, an opening 757 is formed, and in the fourth wall portion 754, an opening 758 is formed. The opening 757 and the opening 758 are elongated holes extending in the up-down direction. In the opening 757 and the opening 758, the projection 656 is inserted. The projection 656 is not engaged with the opening 757 and the opening 758, and is inserted with a gap of about 0.5 mm at a narrowest portion with respect to the front-rear direction. For this reason, a movement direction of the projection 656 is guided with respect to the up-down direction by the opening 757 and the opening 758 without receiving a large frictional force from the inner wall surfaces of the opening 757 and the opening 758.

Part (d) of FIG. 26 is a drawing in which the third wall portion 753 is removed from part (c) of FIG. 26. With respect to the left-right direction, between the third wall portion 753 and the fourth wall portion 754, the third engaging portion 545 and the fourth engaging portion 546 are disposed. Further, this third engaging portion 545 and this fourth wall portion 546 are disposed between the opening 757 and the opening 758. In this embodiment, the fourth engaging portion 546 is disposed further on an end portion side of the holding member 505 than the third engaging portion 545 is. The third engaging portion 545 and the fourth engaging portion 546 are projections projecting downwardly from connecting portions connecting the third wall portion 753 and the fourth wall portion 754 of the holding member 505. With the third wall portion 545, one end of the coil spring 548 is engaged, and with the fourth wall portion 546, the other end of the coil spring 548 is engaged. The third engaging portion 545 and the fourth engaging portion 546 are disposed on the spring mounting portion 662 so that the coil spring 548 engaged with the third engaging portion 545 and the fourth engaging portion 546 crosses the opening 757 and the opening 758.

With respect to the up-down direction, the third engaging portion 545 and the fourth wall portion 546 are disposed at different positions. In this embodiment, the third engaging portion 545 is disposed further on the photosensitive drum 103 side than the fourth engaging portion 546 is. Incidentally, the third engaging portion 545 and the fourth engaging portion 546 may be provided at the same level with respect to the up-down direction, and the fourth engaging portion 546 may be disposed further on the photosensitive drum 103 side than the third engaging portion 545 is.

As shown in part (d) of FIG. 26, the projection 656 is inserted from an outer wall surface side of the fourth wall portion 754 into the opening 758 and passes under the coil spring 548 bridged between the third engaging portion 545 and the fourth engaging portion 546, and is inserted into the opening 757 of the third wall portion 753.

Incidentally, in this embodiment, as an example of the coil spring 547 and the coil spring 548, a coil-shaped spring is shown, but a leaf spring may also be used.

Next, action of the projection 655 provided on the link member 651 on the coil spring 547, and action of the projection 656 provided on the link member 652 on the coil spring 548 will be described using FIG. 27. The action of the projection 655 on the coil spring 547 and the action of the projection 656 on the coil spring 548 are substantially similar to each other, so that in FIG. 27, the action of the projection 656 on the coil spring 548 will be illustrated by example.

Figure 27:
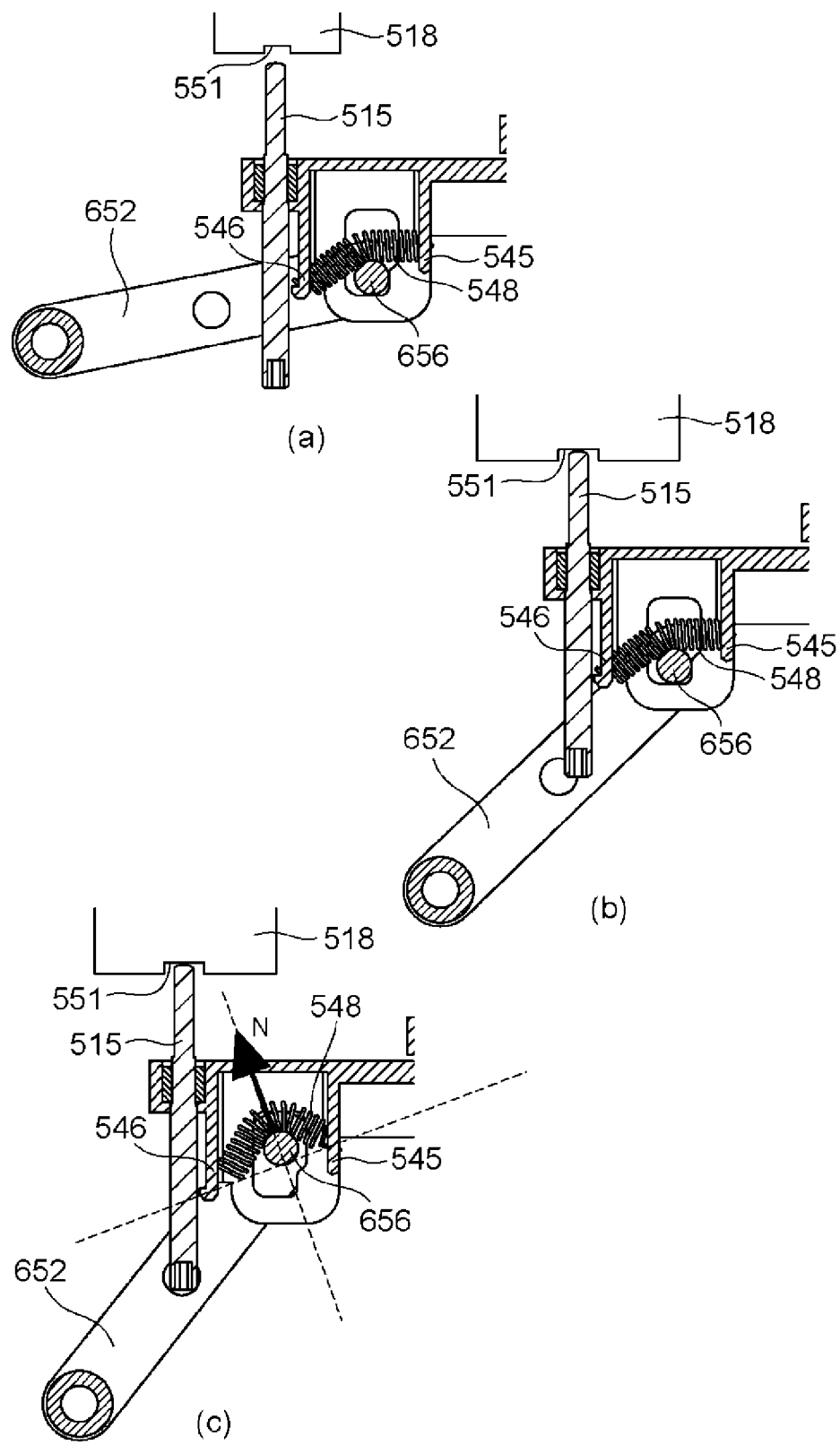
FIG. 27 includes perspective views for illustrating the structure of the holding member on the other end.

Part (a) of FIG. 27 is a view showing a state in which the contact pin 515 provided in the holding member 505 is retracted from the contact surface 551 of the drum unit 518. Part (b) of FIG. 27 is a view showing a time when the contact pin 515 contacted the contact surface 551 of the drum unit 518. Part (c) of FIG. 27 is a view showing a state in which the link member 652 is rotated counterclockwise from the state of part (b) of FIG. 27.

In the state of part (a) of FIG. 27, when the slidable portion 525 slides (moves), the link member 652 rotates counterclockwise in interrelation therewith, so that the projection 656 moves to the upper side. At this time, the projection 656 presses the coil spring 548 toward the upper side. When the projection 656 presses the coil spring 548 toward the upper side, a force acts on the holding member 505 on the upper side via the third engaging portion 545 and the fourth engaging portion 546. The contact pin 515 is non-contact with the drum unit 518. There is no force against a force, by which the projection 656 presses the coil spring 548, except for gravitation acting on the optical print head 105. For that reason, when the force acting on the third engaging portion 545 and the fourth engaging portion 546 toward the upper side becomes larger than the gravitation acting on the optical print head 105, the holding member 505 moves toward the upper side by the force acting on the third engaging portion 545 and the fourth engaging portion 546. Here, when the holding member 505 is in the retracted position, a lower end of the contact pin 515 (514) and the holding member 505 are supported by the apparatus main assembly, so that the projection 656 (655) of the link member 652 (651) may also be made in non-contact with the coil spring 548 (547).

When the holding member 505 moves to the upper side, as shown in part (b) of FIG. 27, the contact pin 515 contacts the contact surface 551 of the drum unit 518. In part (b) of FIG. 27, the optical print head 105 is disposed at the exposure position, but an urging force, acting on the optical print head 105, for urging the optical print head 105 toward the drum unit 518 is insufficient. For that reason, in order to impart the above-described urging force to the optical print head 105, the moving mechanism 640 of this embodiment has a constitution in which the link member 652 is further rotatable from the state of part (b) of FIG. 27.

Even when the link member 652 further rotates counterclockwise from the state of part (b) of FIG. 27, the contact pin 515 contacts the contact surface 551 of the drum unit 518, and therefore, the position of the holding member 505 does not change. On the other hand, the projection 656 moves in the upper side direction. For that reason, the coil spring 548 is pressed between the third engaging portion 545 and the fourth engaging portion 546 by the projection 656 and is extended by being bent as shown in part (c) of FIG. 27.

The state of part (c) of FIG. 27 corresponds to states of the cover 558 in parts (c) and (d) of FIG. 27. That is, the slidable portion 525 is in a state in which the slidable portion 525 does not further slide (move) toward the upper side. For that reason, the slidable portion 525 does not slide (move), and therefore, the link member 652 does not rotate counterclockwise from the state shown in part (c) of FIG. 27, and the projection 656 is at rest in the position of part (c) of FIG. 27 without moving toward the upper side. In this state, a contracting force of the coil spring 548 acts on the third engaging portion 545 and the fourth engaging portion 546. A component of the contracting force of the coil spring 548 acting on the third engaging portion 545 and the fourth engaging portion 546 is pointed in an upper direction, and therefore, an urging force for urging the holding member 505 toward the drum unit 518 side acts on the holding member 505 so that the holding member 505 is urged toward the drum unit 518 via the contact pin 515.

As described above, the third engaging portion 545 is disposed further on the photosensitive drum 103 side than the fourth engaging portion 546 is, and therefore, drag (reaction) in an arrow N direction acts on the coil spring 548 from the projection 656. A component of the drag in the arrow N direction acts on the holding member 505. For that reason, on the contact pin 515, a force toward the rear side with respect to the front-rear direction acts, so that the contact pin 515 contacted to the contact surface 551 is urged against and contacted to the rear side wall surface 596 on the rear side of the engaging portion 685. The reason why the first engaging portion 543 is disposed further on the photosensitive drum 103 side than the second engaging portion 544 is, is also similar to the above-described reason.

As described above, on the holding member 505 provided in the optical print head 105 according to this embodiment described above, the lens mounting portions 701 are formed, and the lens mounting portions 701 include the opposing surfaces (first inner wall surface 507 and second inner wall surface 508) opposing the side wall surfaces of the lens array 506 and the inclined surfaces (first inclined surface 703 and second inclined surface 704) which are provided further on the photosensitive drum 103 side than the opposing surfaces are and which are inclined so as to extend away from the side wall surfaces of the lens array 506 toward the photosensitive drum 103 side, and in the grooves formed by the inclined surface and the side wall surfaces of the lens array 506, a filler is filled.

INDUSTRIAL APPLICABILITY

According to the present invention, it is possible to provide an optical print head including a lens array and an image forming apparatus, in which in a state in which the lens array is gripped by a gripping mechanism, a mounting position of the lens array relative to a holding member can be adjusted.

EXPLANATION OF SYMBOLS 502 substrate
505 holding member
506 lens array
507 first inner wall surface (first opposing portion)
508 second inner wall surface (second opposing portion)
701 lens mounting portion
702 substrate mounting portion
703 first inclined surface
704 second inclined surface
906 through hole
907 adhesive

The invention claimed is:

1. An optical print head included in an image forming apparatus, comprising:
 a circuit board including a plurality of light emitting elements for emitting light for exposing a photosensitive member, the plurality of light emitting elements being arranged in a first direction which is a longitudinal direction of the optical print head;
 a lens array for concentrating the light emitted from the plurality of light emitting elements on the photosensitive member; and
 a holder provided with a substrate mounting portion on which the circuit board is mounted, and a lens array mounting portion projected by a predetermined length from the substrate mounting portion in a second direction toward the photosensitive member and on which both side wall surfaces of the lens array are mounted with respect to a third direction perpendicular to the first direction and the second direction,
 wherein the substrate mounting portion and the lens array mounting portion are integral with each other, and
 wherein in a state in which the lens array is mounted on the lens array mounting portion, one end side of both side wall surfaces in the first direction is exposed from one end of the lens array mounting portion in the first direction in a region within the predetermined length from the substrate mounting portion in the second direction, and the other end side of both side wall surfaces in the first direction is exposed from the other end of the lens array mounting portion in the first direction in a region within the predetermined length from the substrate mounting portion in the second direction.

2. The optical print head according to claim 1, wherein the lens array is mounted so as to project from the lens array mounting portion toward the photosensitive member in the second direction.

3. The optical print head according to claim 1, wherein a length of the lens array is longer than that of the lens array mounting portion.

4. The optical print head according to claim 1, wherein the lens array mounting portion is provided with a first cut-away portion at the one end of the lens array mounting portion and a second cut-away portion at the other end of the lens array mounting portion in the first direction, and wherein when viewing the lens array mounting portion in the third direction, the one end side of the lens array in the first direction is exposed from the first cut-away portion of the lens array mounting portion and the other end side of the lens array is exposed from the second cut-away portion of the lens array mounting portion.

5. The optical print head according to claim 4, wherein the lens array mounting portion is provided with a first opposing portion which opposes one side wall surface of both side wall surfaces and a second opposing portion which opposes the other side wall surface of both side wall surfaces, and wherein the lens array is mounted between the first opposing portion and the second opposing portion, and the first and second cut-away portions are formed on the first opposing portion and the second opposing portion.

6. An image forming apparatus comprising:
a photosensitive member;
a circuit board including a plurality of light emitting elements for emitting light for exposing the photosensitive member, the plurality of light emitting elements being arranged in a first direction which is a longitudinal direction of the circuit board;
a lens array for concentrating the light emitted from the plurality of light emitting elements on the photosensitive member; and
a holder provided with a substrate mounting portion on which the circuit board is mounted, and a lens array mounting portion projected by a predetermined length from the substrate mounting portion in a second direction toward the photosensitive member and on which both side wall surfaces of the lens array are mounted with respect to a third direction perpendicular to the first direction and the second direction, wherein the substrate mounting portion and the lens array mounting portion are integral with each other, and wherein in a state in which the lens array is mounted on the lens array mounting portion, one end side of both side wall surfaces in the first direction is exposed from one end of the lens array mounting portion in the first direction in a region within the predetermined length from the substrate mounting portion in the second direction, and the other end side of both side wall surfaces in the first direction is exposed from the other end of the lens array mounting portion in the first direction in a region within the predetermined length from the substrate mounting portion in the second direction.

7. The image forming apparatus according to claim 6, wherein the lens array is mounted so as to project from the lens array mounting portion toward the photosensitive member in the second direction.

8. The image forming apparatus according to claim 6, wherein a length of the lens array is longer than that of the lens array mounting portion.

9. The image forming apparatus according to 6, wherein the lens array mounting portion is provided with a first cut-away portion at the one end of the lens array mounting portion and a second cut-away portion at the other end of the lens array mounting portion in the first direction, and wherein when viewing the lens array mounting portion in the third direction, the one end side of the lens array in the first direction is exposed from the first cut-away portion of the lens array mounting portion and the other end side of the lens array is exposed from the second cut-away portion of the lens array mounting portion.

10. The image forming apparatus according to 9, wherein the lens array mounting portion is provided with a first opposing portion which opposes one side wall surface of both side wall surfaces and a second opposing portion which opposes the other side wall surface of both side wall surfaces, and wherein the lens array is mounted between the first opposing portion and the second opposing portion, and the first and second cut-away portions are formed on the first opposing portion and the second opposing portion.

* * * * *